US006677992B1

(12) United States Patent
Matsumoto et al.

(10) Patent No.: US 6,677,992 B1
(45) Date of Patent: Jan. 13, 2004

(54) IMAGING APPARATUS OFFERING DYNAMIC RANGE THAT IS EXPANDABLE BY WEIGHTING TWO IMAGE SIGNALS PRODUCED DURING DIFFERENT EXPOSURE TIMES WITH TWO COEFFICIENTS WHOSE SUM IS 1 AND ADDING THEM UP

(75) Inventors: Kanichi Matsumoto, Hino (JP); Katsuyuki Saito, Sagamihara (JP); Kotaro Ogasawara, Tokyo (JP); Kuniaki Kami, Machida (JP); Shinji Yamashita, Fuchu (JP); Noboru Kusamura, Hachioji (JP); Akihiko Mochida, Hino (JP); Wataru Ohno, Sagamihara (JP); Makoto Tsunakawa, Toda (JP); Hideki Tashiro, Yokohama (JP); Manabu Yajima, Hino (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/176,966

(22) Filed: Oct. 22, 1998

(30) Foreign Application Priority Data

| Oct. 23, 1997 | (JP) | 9-291324 |
| Nov. 12, 1997 | (JP) | 9-310774 |
| Nov. 12, 1997 | (JP) | 9-310775 |
| Nov. 18, 1997 | (JP) | 9-317401 |
| Nov. 27, 1997 | (JP) | 9-326545 |
| Dec. 1, 1997 | (JP) | 9-330439 |
| Oct. 20, 1998 | (JP) | 10-298687 |

(51) Int. Cl.$^7$ .......................... H04N 5/235; H04N 3/14; H04N 5/335
(52) U.S. Cl. ..................... 348/229.1; 348/299
(58) Field of Search ................. 348/299, 298, 348/230.1

(56) References Cited

U.S. PATENT DOCUMENTS 5,374,953 A * 12/1994 Sasaki et al. .................. 348/65

(List continued on next page.)

FOREIGN PATENT DOCUMENTS

JP 57-39673 3/1982 ............ H04N/5/30

(List continued on next page.)

*Primary Examiner*—Andrew Christensen
*Assistant Examiner*—Tia M. Harris
(74) *Attorney, Agent, or Firm*—Ostrolenk, Faber, Gerb & Soffen, LLP

(57) ABSTRACT

An object is imaged continuously during a first exposure time and a second exposure time shorter than the first exposure time. Weights, one of which decreases monotonously and the other of which increases monotonously, are applied to first and second resultant image signals under the condition that the sum of the weights is 1. The first and second image signals that have been weighted are added up, thus producing a synthetic picture signal. When a luminance level is low, the ratio of the first image signal, which has been produced during the longer exposure time, to the second image signal is increased. This results in an image demonstrating a high signal-to-noise ratio. When the luminance level is high, the ratio of the second image signal, which has been produced during the shorter exposure time, to the first image signal is increased. This results in a synthetic image that proves a wide dynamic range, depicts a smoothly varying brightness level, and exhibits a characteristic of being seen as almost natural. Moreover, the first and second image signals are produced to resemble those produced during mutually different exposure times by controlling an amount of light incident on an imaging device or by varying an amount of illumination light.

35 Claims, 50 Drawing Sheets

U.S. PATENT DOCUMENTS

| | | | |
|---|---|---|---|
| 5,430,475 A | * 7/1995 | Goto et al. | 348/65 |
| 5,455,621 A | * 10/1995 | Morimura | 348/229.1 |
| 5,517,242 A | 5/1996 | Yamada et al. | 348/254 |
| 5,638,119 A | 6/1997 | Cornuejols | 348/229.1 |
| 6,219,097 B1 | * 4/2001 | Kamishima et al. | 348/297 |
| 6,248,133 B1 | * 6/2001 | Komobuchi et al. | 348/315 |
| 6,278,490 B1 | * 8/2001 | Fukuda et al. | 348/362 |

FOREIGN PATENT DOCUMENTS

| | | | |
|---|---|---|---|
| JP | 63-306779 | 12/1988 | H04N/5/235 |
| JP | 64-60156 | 3/1989 | H04N/5/30 |
| JP | 2-174470 | 7/1990 | H04N/5/235 |
| JP | 4-196776 | 7/1992 | H04N/5/235 |
| JP | 5-30424 | 2/1993 | H04N/5/265 |
| JP | 5-153473 | 6/1993 | H04N/5/235 |
| JP | 6-141229 | 5/1994 | H04N/5/235 |

* cited by examiner

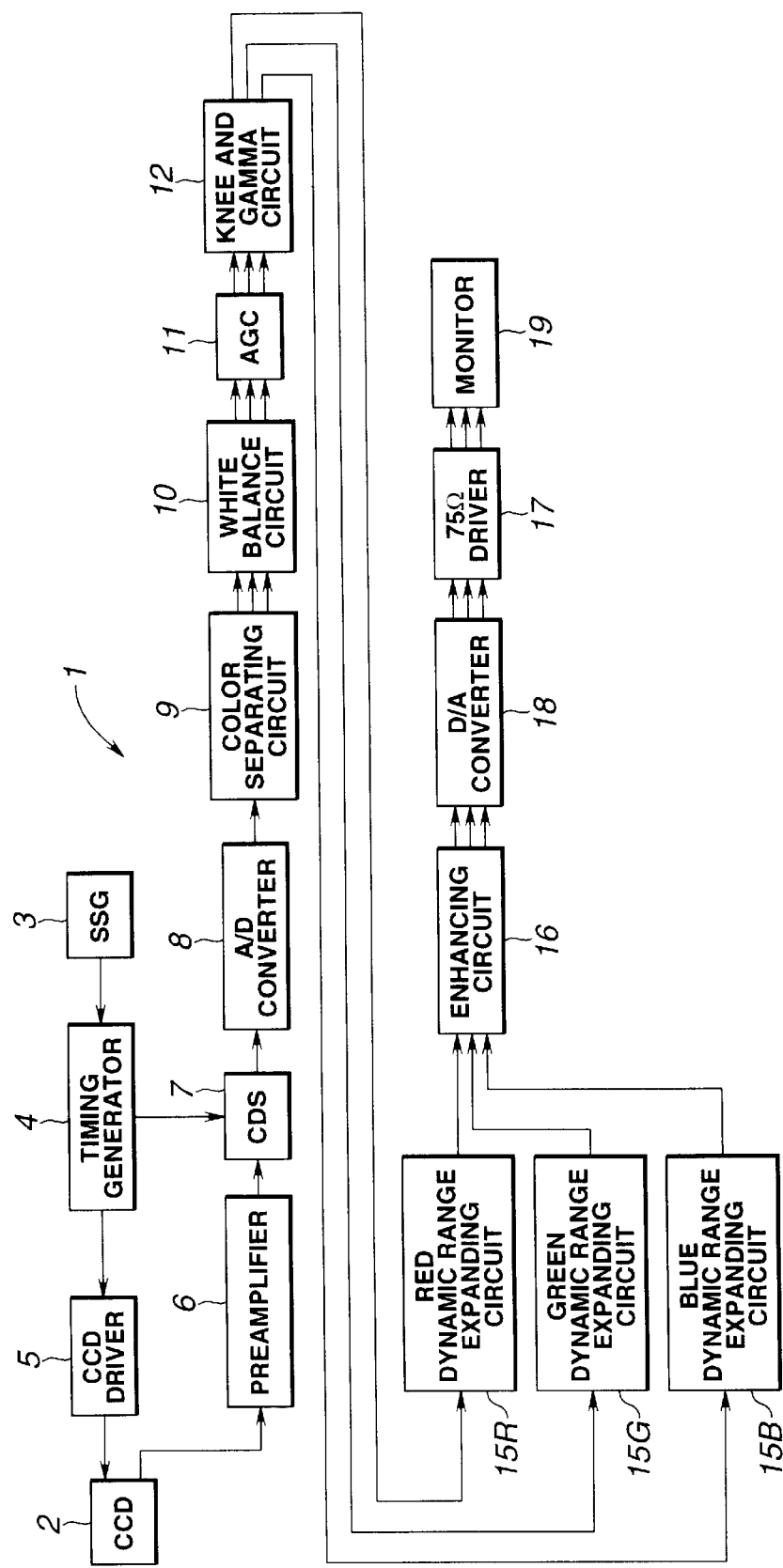

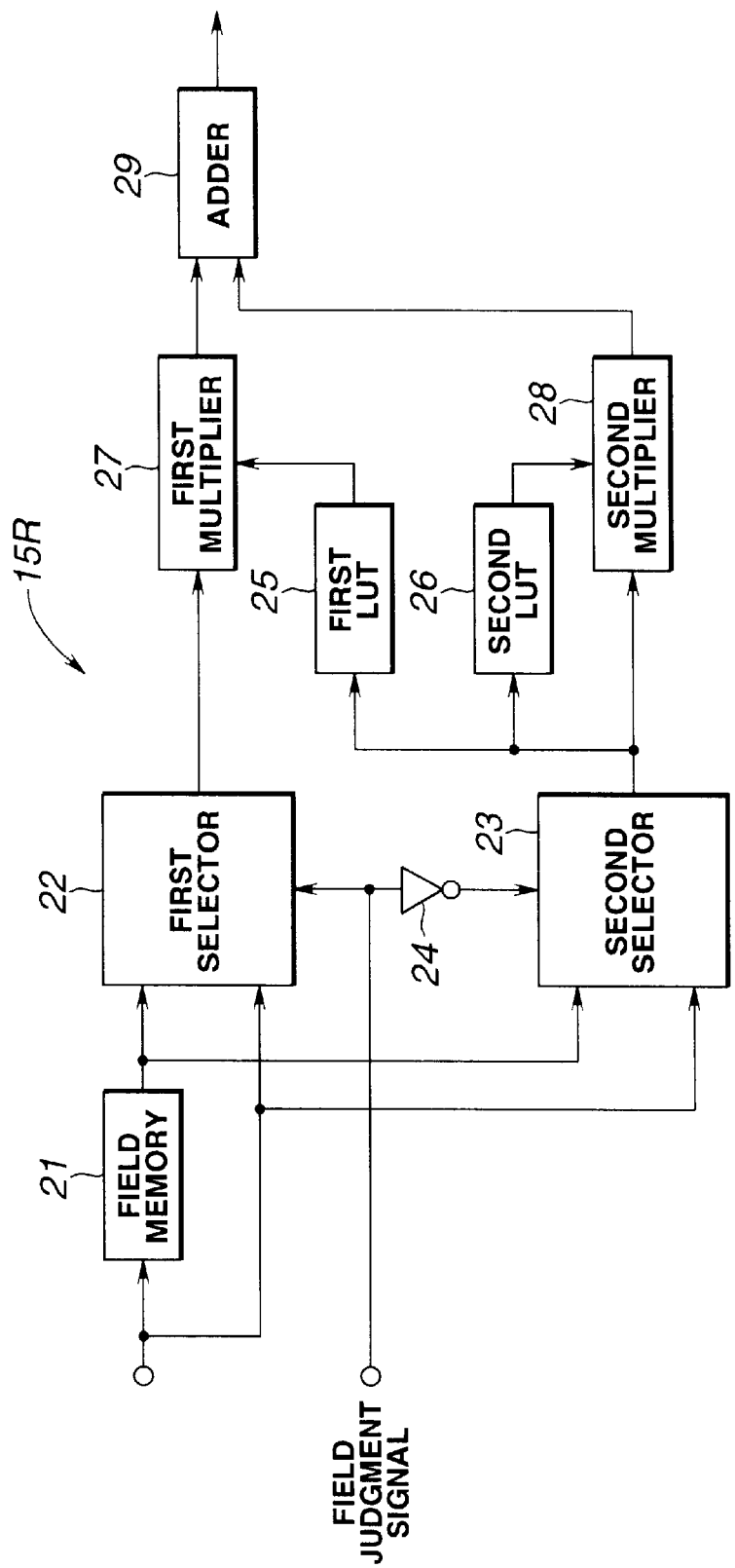

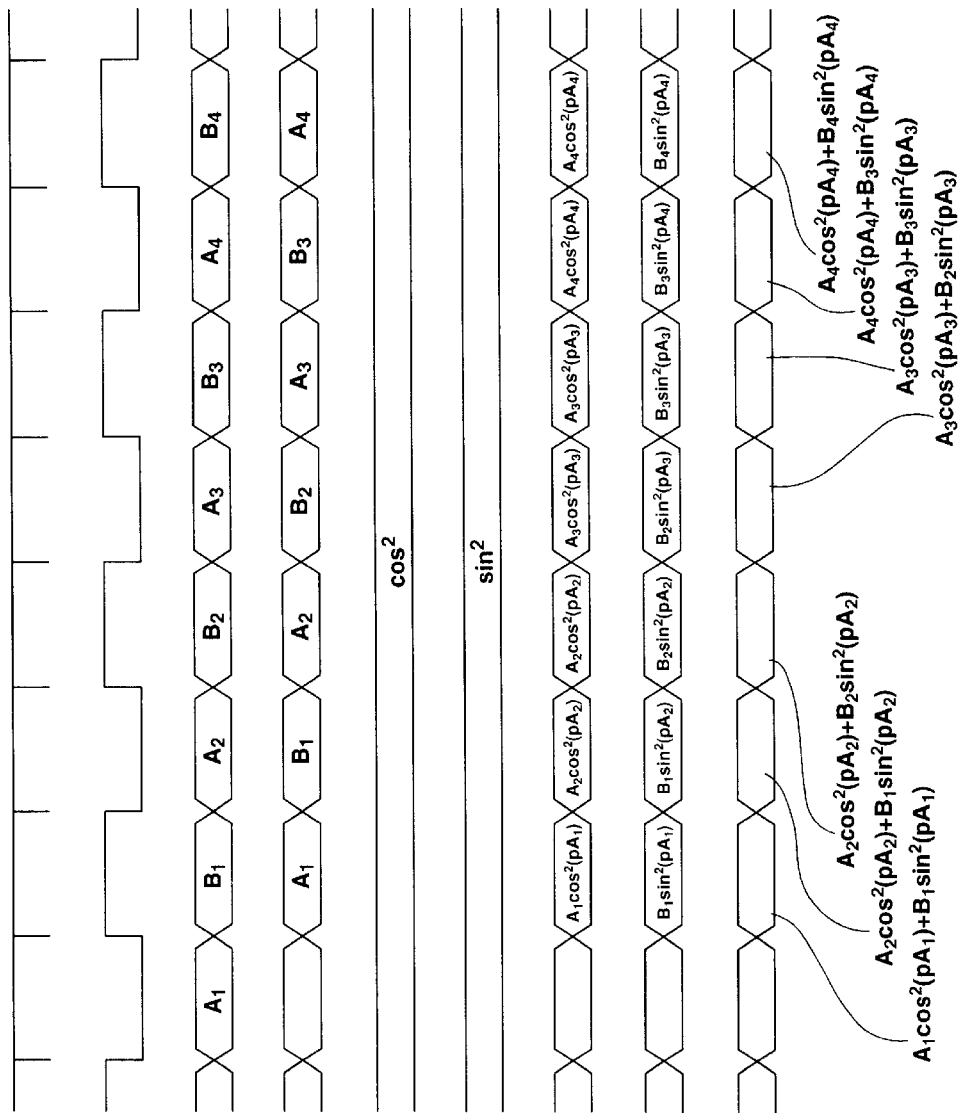

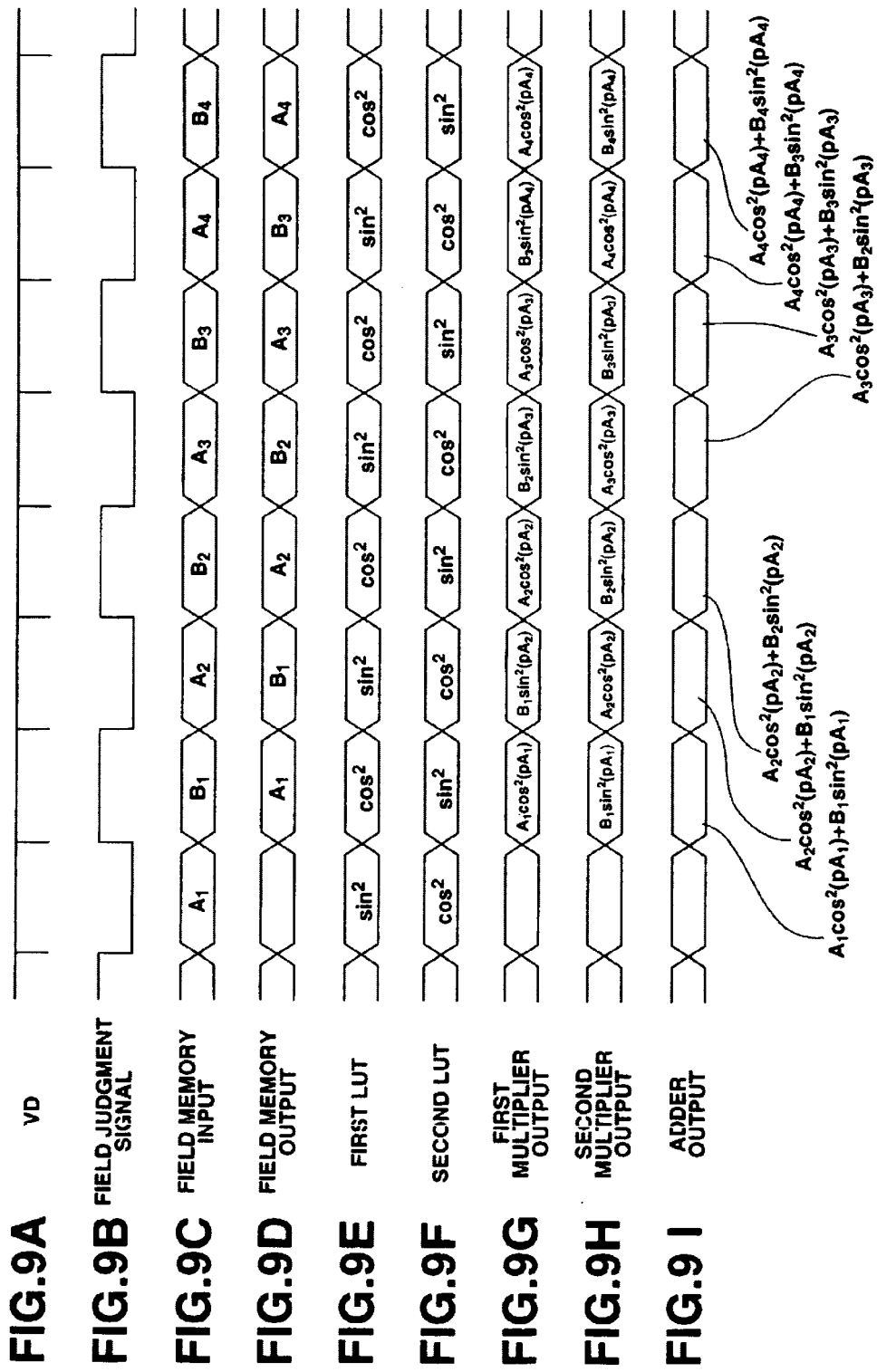

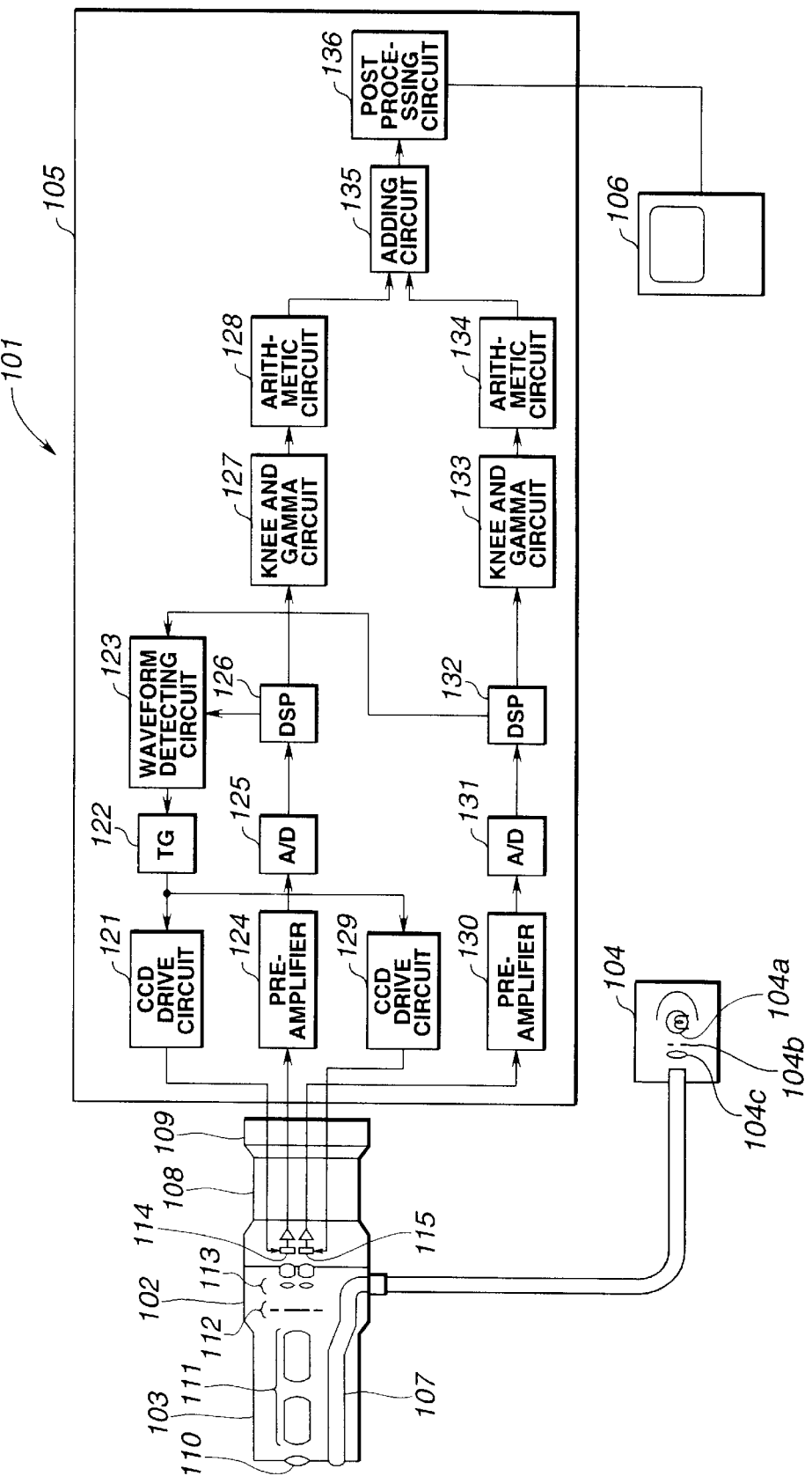

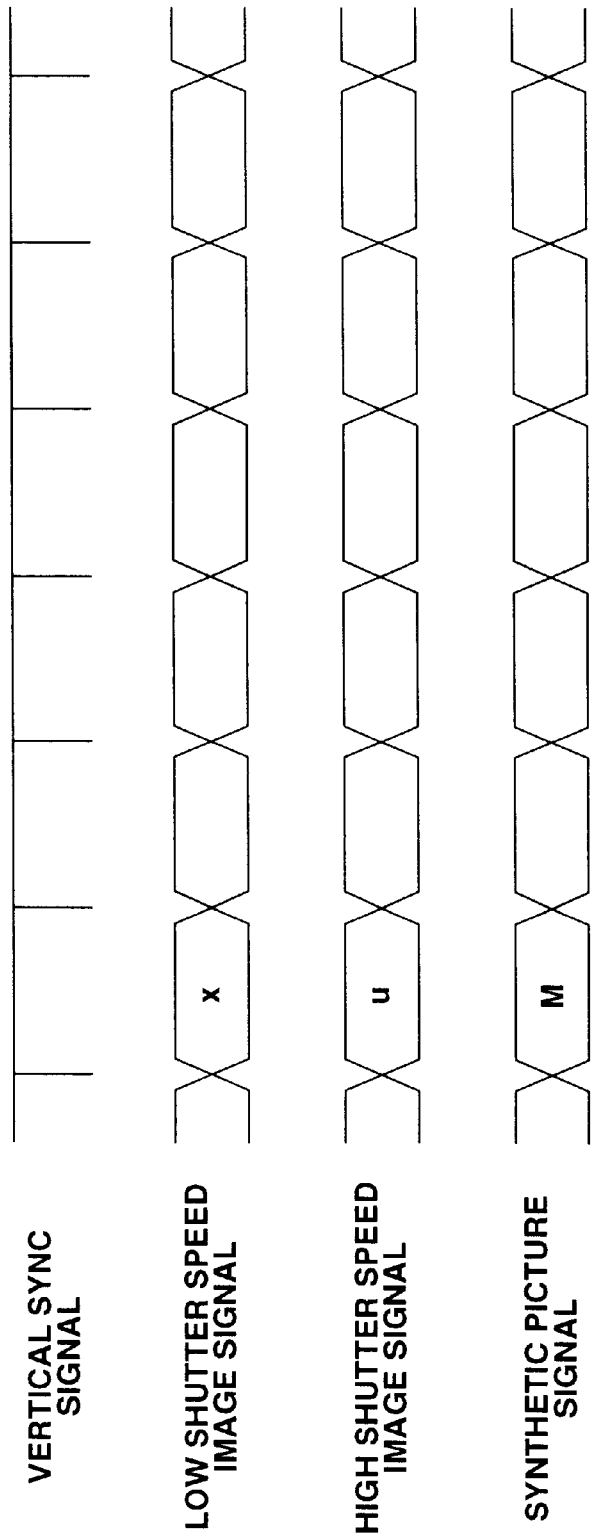

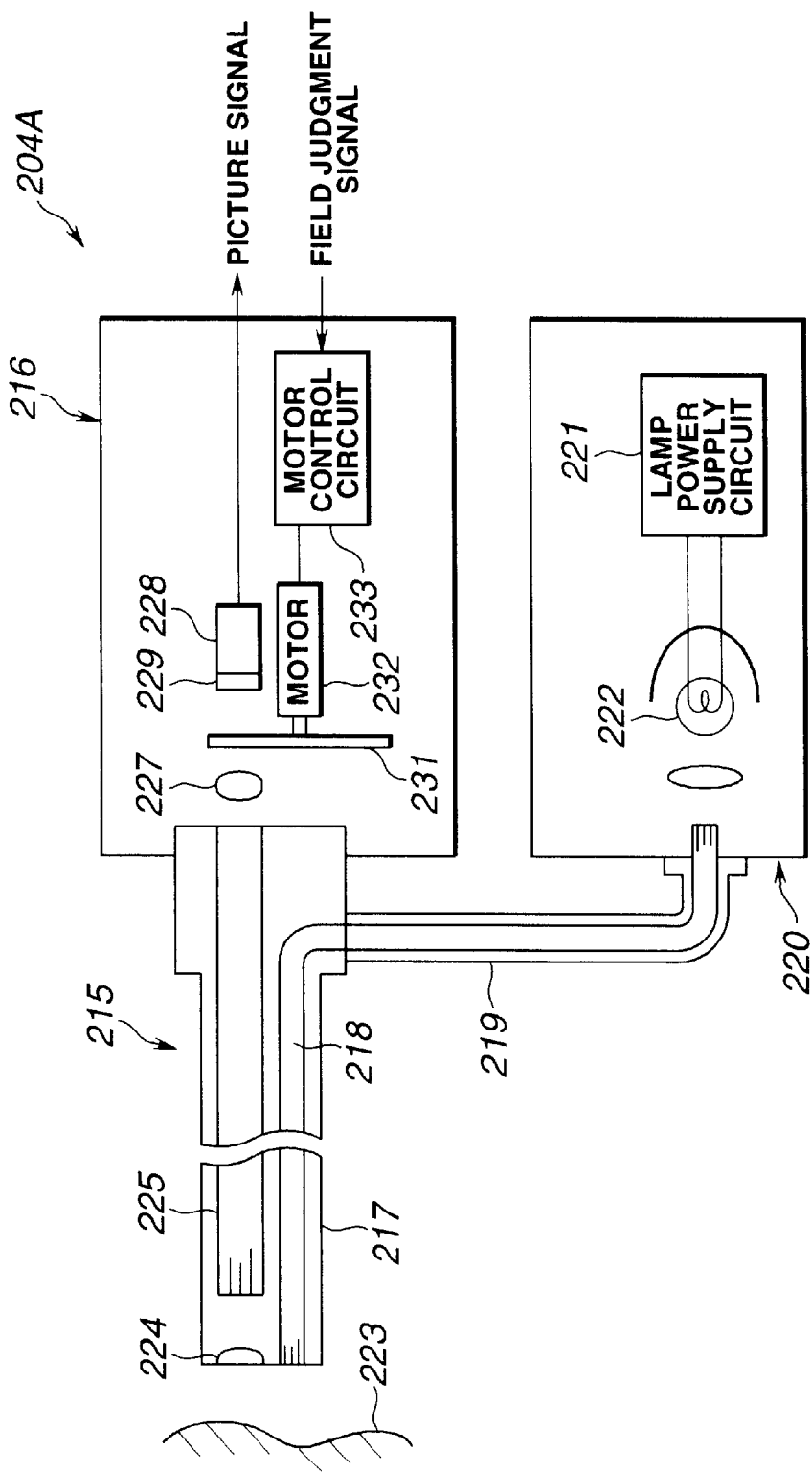

Ra TRANSMMITTANCE > Rb TRANSMMITTANCE
Ga TRANSMMITTANCE > Gb TRANSMMITTANCE
Ba TRANSMMITTANCE > Bb TRANSMMITTANCE

Ra TRANSMMITTANCE > Rb TRANSMMITTANCE
Ga TRANSMMITTANCE > Gb TRANSMMITTANCE
Ba TRANSMMITTANCE > Bb TRANSMMITTANCE

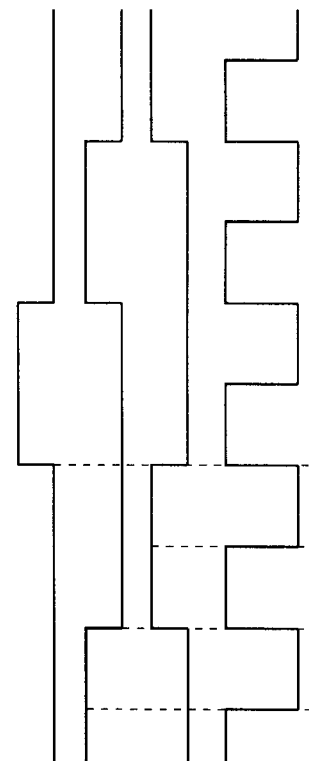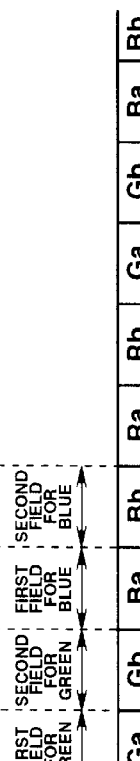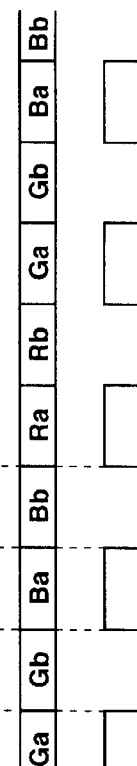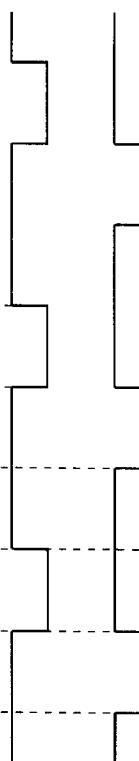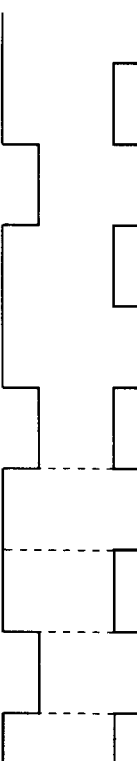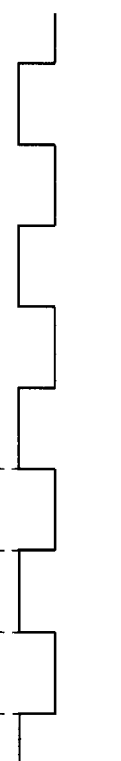
FIG.50A RED JUDGMENT SIGNAL
FIG.50B GREEN JUDGMENT SIGNAL
FIG.50C BLUE JUDGMENT SIGNAL
FIG.50D FIELD-SEQUENTIAL FIELD JUDGMENT SIGNAL
FIG.50E FILTER ON OPTICAL PATH
FIG.50F AMOUNT OF INCIDENT LIGHT
FIG.50G FIRST JUDGMENT SIGNAL
FIG.50H SECOND JUDGMENT SIGNAL
FIG.50I FIELD-SEQUENTIAL FIELD JUDGMENT SIGNAL

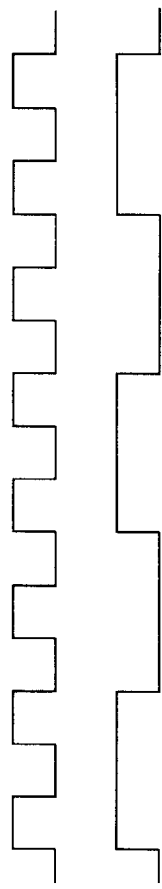
FIG.51A  FIELD-SEQUENTIAL FIELD JUDGMENT SIGNAL
FIG.51B  SYNC SIGNAL
FIG.51C  SIGNAL SELECTOR & INTERPOLATOR INPUT
FIG.51D  SIGNAL SELECTOR & INTERPOLATOR RED OUTPUT (RED FRAME MEMORY INPUT)
FIG.51E  RED FRAME MEMORY OUTPUT
FIG.51F  GREEN FRAME MEMORY INPUT
FIG.51G  GREEN FRAME MEMORY OUTPUT
FIG.51H  BLUE FRAME MEMORY INPUT
FIG.51I  BLUE FRAME MEMORY OUTPUT

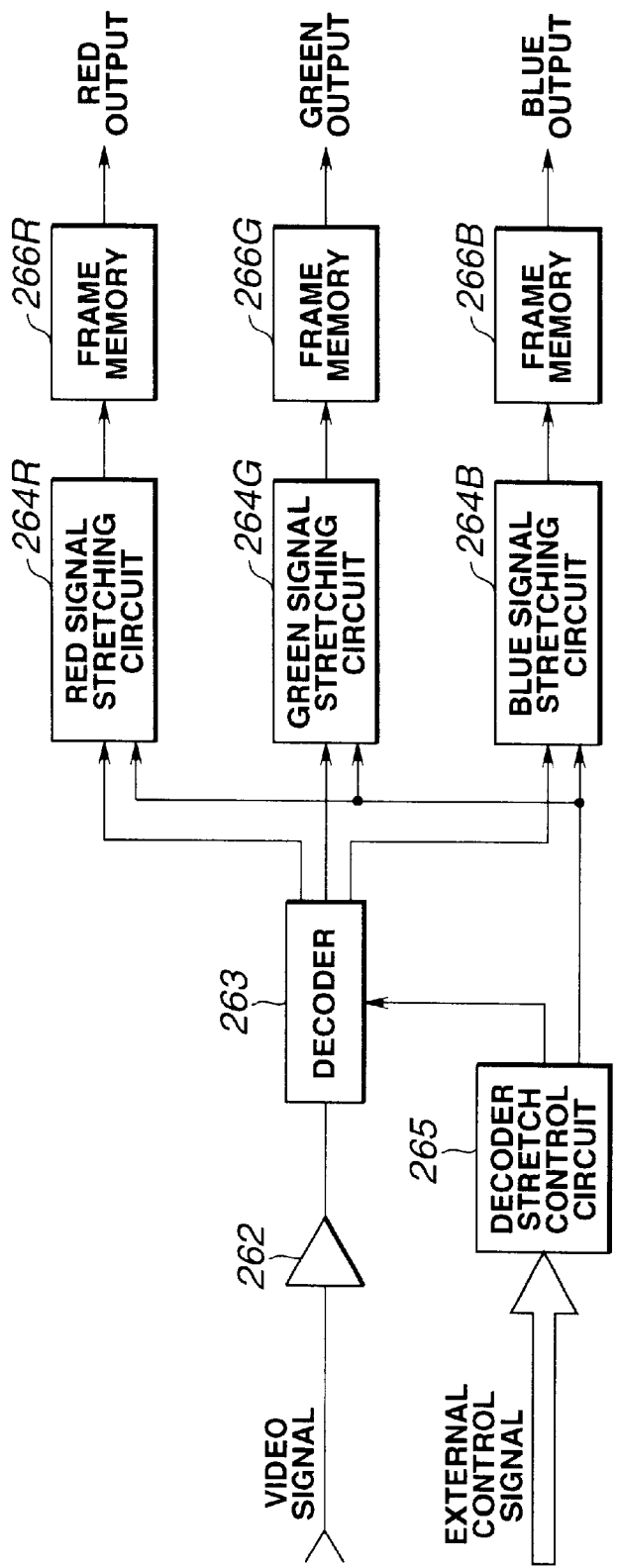

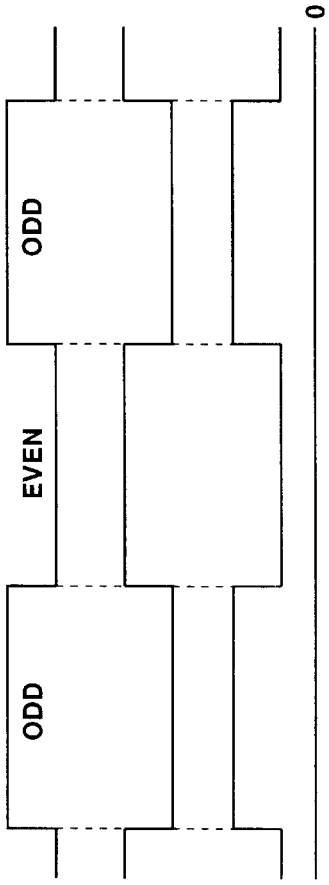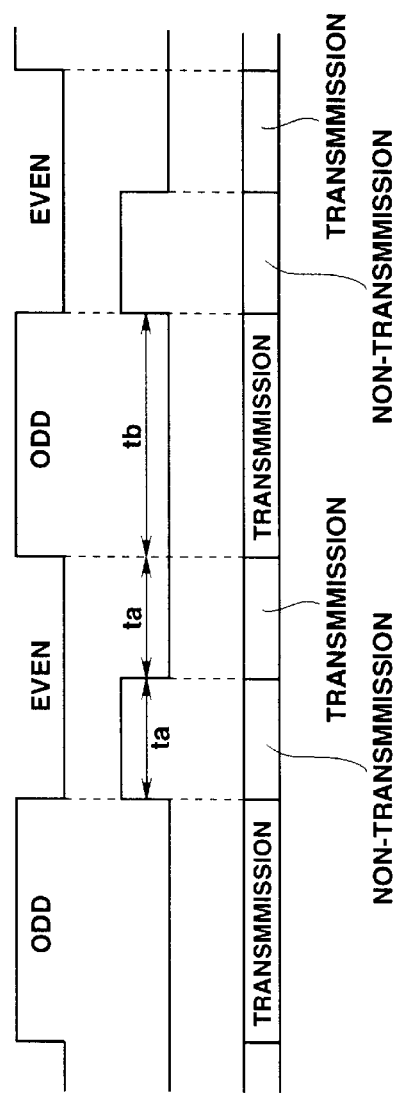
FIG.54A FIELD JUDGMENT SIGNAL
FIG.54B LCD DRIVING SIGNAL
FIG.54C LCD TRANSMITTANCE
FIG.55A FIELD JUDGMENT SIGNAL
FIG.55B LCD DRIVING SIGNAL
FIG.55C LCD ACTION

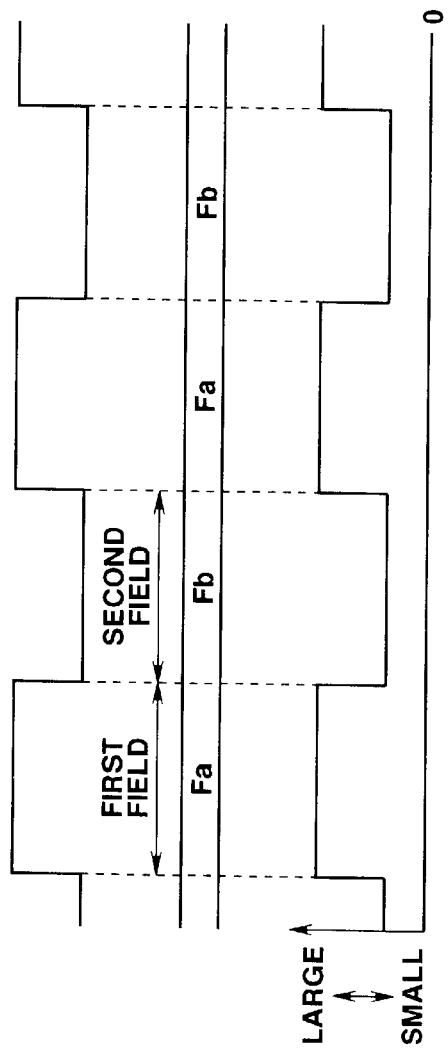

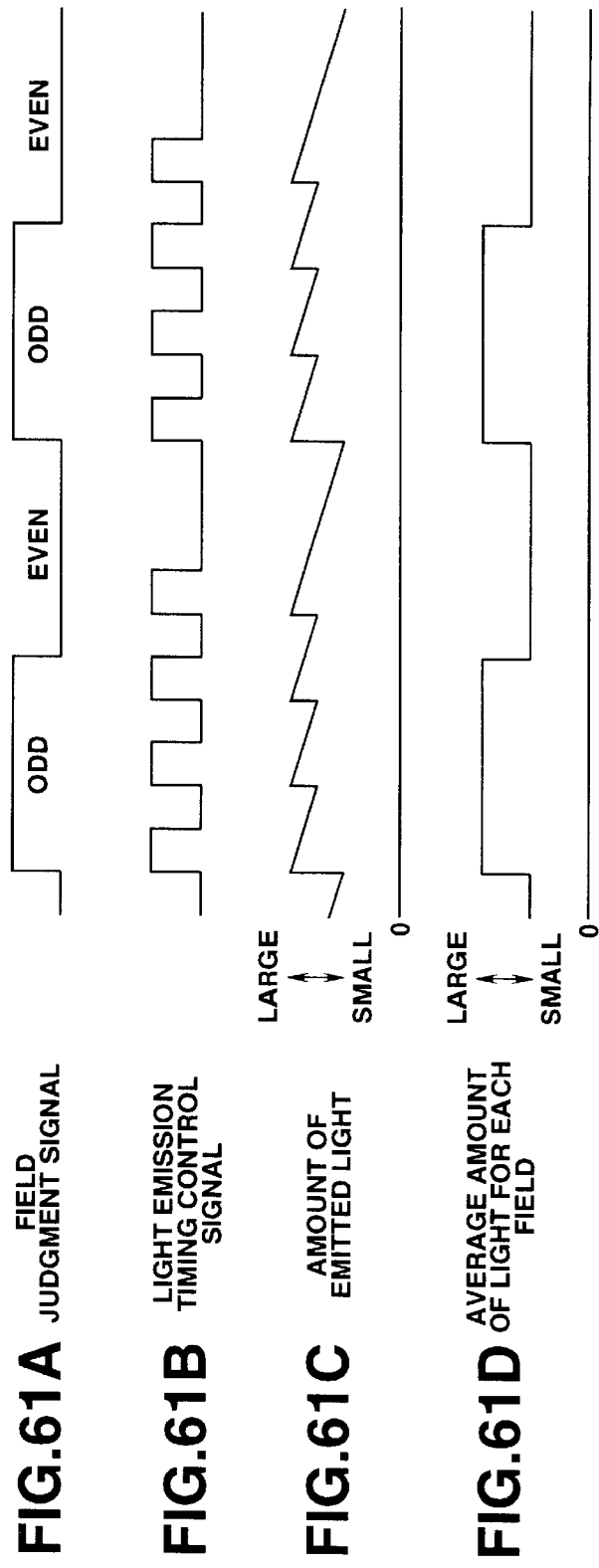

IMAGING APPARATUS OFFERING DYNAMIC RANGE THAT IS EXPANDABLE BY WEIGHTING TWO IMAGE SIGNALS PRODUCED DURING DIFFERENT EXPOSURE TIMES WITH TWO COEFFICIENTS WHOSE SUM IS 1 AND ADDING THEM UP

BACKGROUND OF THE INVENTION

1. Field of the Invention

The present invention relates to an imaging apparatus offering a dynamic range that is expandable by weighting a plurality of image signals, which are produced during different exposure times or the like, with a plurality of coefficients whose sum is 1, and adding them up.

2. Description of the Related Art

In general, a range of luminance levels within which imaging is validated by an imaging apparatus such as a TV camera is determined unconditionally with the photoelectric conversion characteristic of an imaging means, for example, a solid-stage imaging device.

Specifically, a lower limit of output levels of a solid-state imaging device is determined by a noise level. An upper limit thereof is determined by a saturation value. An operation range within which the solid-state imaging device is usable is thus defined. The slope of a characteristic curve expressing the output levels of the solid-state imaging device is fixed to a certain value. Eventually, the range of luminance levels within which imaging is validated by the solid-state imaging device is determined unconditionally.

For example, Japanese Unexamined Patent Publication No. 57-39673 has disclosed an imaging apparatus offering a dynamic range, which is expandable by synthesizing image signals produced at two different luminance levels, for an image signal produced by a solid-state imaging device.

However, according to the prior art, the dynamic range offered by the imaging apparatus is expanded merely by adding up two image signals or subtracting one image signal from another. A signal-to-noise ratio of a component of a resultant signal indicating a low luminance level deteriorates. A synthetic picture signal produced by synthesizing two image signals relative to luminance levels is plotted as joined straight lines or a graph of broken lines. This means that the synthetic image signal varies according to the graph of broken lines. Since an output level of a solid-state imaging device varies at a luminance level at which the straight lines are joined, a constructed color image does not depict a smooth color change but gives a sense of incongruity.

Moreover, according to Japanese Unexamined Patent Publication No. 6-141229, two or more image signals produced during different charge accumulation times are weighted based on the signal levels, and compressed by a compressing means. Thus, a picture signal whose components range from a component representing a dark image to a component representing a bright image will not have a saturation value that can be constructed with few noises.

In the prior art, as shown in FIGS. 4 and 9 in the patent publication, a plurality of image signals produced during different charge accumulation times are weighted by varying a weight under a boundary condition, under which one of the image signals has a saturation value, or thereabout. Resultant image signals are then synthesized by adding them up. The image signals are then compressed by a compressing means according to a frequency band. Eventually, a synthetic picture signal exhibiting a desired input/output characteristic is constructed.

However, according to the prior art, for example, two image signals are used to construct a synthetic picture signal. At this time, the synthetic picture signal is constructed using only a first image signal under conditions lower than the boundary condition under which the first image signal produced during a longer charge accumulation time has a saturation value.

The synthetic picture signal is compressed on a subsequent stage. Since one synthetic picture signal resulting from addition is compressed, the foregoing characteristic cannot be changed. For example, when an image signal represents a motion, an image reconstructed may suffer from inconsistency between contours represented by a signal component indicating a low luminance level and a signal component indicating a high luminance level. Besides, the image has a portion in which colors change unnaturally.

SUMMARY OF THE INVENTION

An object of the present invention is to provide an imaging apparatus capable of offering an expandable dynamic range without any deterioration of a signal-to-noise ratio of a signal component indicating a low luminance level, and of constructing a smooth image giving no sense of incongruity.

Another object of the present invention is to provide an endoscopic imaging apparatus capable of offering an expandable dynamic range without any deterioration of a signal-to-noise ratio of a signal component indicating a low luminance level, and of constructing an image suitable for diagnosis.

An imaging apparatus in accordance with the present invention includes, an imaging means for successively outputting a first image signal, which is produced by imaging an object during a first exposure time, and a second image signal produced by imaging the object during a time shorter than the first exposure time. The invention includes a picture signal producing means composed of first and second weighting circuits for applying a first weight, which decreases monotonously with an increase in light level, and a second weight, which increases monotonously therewith, to the first and second image signals within the range of light levels up to light levels, at which the first and second image signals have a saturation value, under the condition that the sum of the first and second weights is 1. Also included is an adding circuit for adding up first and second picture signals produced by applying the first and second weights to the first and second image signals by means of the first and second weighting circuits. In addition, a signal processing means is included for processing a picture signal output from the adding circuit to produce a video signal based on which an image can be displayed on a display means.

Owing to the above components, the ratio of the first image signal to the second image signal can be modified, and the image signals are synthesized with each other. Consequently, the dynamic range for a picture signal is expanded, and deterioration of a signal-to-noise ratio of a signal component indicating a low luminance level is prevented. This results in a natural smooth image not giving a sense of incongruity.

Moreover, when the present invention is adapted to an endoscopic imaging apparatus, an image helpful for diagnosis can be provided.

BRIEF DESCRIPTION OF THE DRAWINGS

FIGS. 1 to 7 relate to the first embodiment of the present invention;

FIG. 1 is a diagram showing a configuration of an imaging apparatus of the first embodiment;

FIG. 2 is a diagram showing a configuration of a red dynamic range expanding circuit shown in FIG. 1;

FIGS. 4A to 4I are timing charts indicating timing of each signal produced by the red dynamic range expanding circuit shown in FIG. 2;

FIG. 5 is an explanatory diagram for explaining the operation of the red dynamic range expanding circuit shown in FIG. 2;

FIG. 6 is a diagram showing a configuration of a red dynamic range expanding circuit of a variant;

FIG. 7 is a diagram showing a configuration of a red dynamic range expanding circuit in the variant;

FIGS. 8A to 10 relate to the second embodiment of the present invention;

FIG. 8A is a diagram showing a configuration of a red dynamic range expanding circuit in the second embodiment;

FIGS. 9A to 9I are timing charts indicating timing of each signal produced by the red dynamic range expanding circuit shown in FIG. 8A;

FIG. 10 is a graph showing a characteristic concerning brightness of an output that is a synthetic picture signal produced according to a variant;

FIG. 11 is a block diagram showing a configuration of an imaging apparatus of the third embodiment;

FIG. 12 is a block diagram showing a configuration of a dynamic range expanding circuit;

FIG. 13 is a graph indicating input/output characteristics relative to a low shutter speed shutter and high shutter speed, and an input/output characteristic attained by selecting a mixed function to expand a dynamic range;

FIG. 14 is a diagram showing existence of a plurality of functions in each of the look-up tables;

FIGS. 15A to 15K are timing charts for explaining actions;

FIG. 16 is a block diagram showing a configuration of a dynamic range expanding circuit in a variant of the first embodiment;

FIG. 17 is a graph showing a characteristic that can be selected to expand a dynamic range according to the variant;

FIG. 18 is a block diagram showing a configuration of an imaging apparatus of the fourth embodiment;

FIG. 19 is a diagram showing a structure of a progressive charge-coupled device;

FIG. 20 is a timing chart indicating output signals in a wide dynamic range mode;

FIG. 21 is a timing chart indicating an output in a normal mode;

FIG. 22 is a graph indicating an input/output characteristic attained by processing outputs produced at a high shutter speed shutter and low shutter speed so as to expand a dynamic range;

FIGS. 23 to 25 relate to the fifth embodiment of the present invention;

FIG. 23 is a diagram showing a configuration of an endoscopic imaging apparatus of the fifth embodiment;

FIG. 24 is a timing chart indicating an operation exerted by the endoscopic imaging apparatus;

FIG. 25 is a characteristic graph indicating the output levels of image signals produced by first and second charge-coupled devices, and the output level of a synthetic picture signal produced by an adding circuit in relation to an amount of incident light;

FIG. 26 is a block diagram showing a configuration of an imaging apparatus of the sixth embodiment;

FIG. 27 is a timing chart indicating field by field the relationships among an output of a charge-coupled device, an output of a waveform detecting circuit, and data produced by a charge-coupled device shutter;

FIG. 28 is a block diagram showing a configuration of an imaging apparatus of the seventh embodiment;

FIG. 29 is a timing chart indicating field by field the relationships among an output of a charge-coupled device, an output of a waveform detecting circuit, and data produced by a charge-coupled device shutter;

FIG. 30 is a block diagram showing a configuration of an imaging apparatus of the eighth embodiment;

FIG. 31 is a timing chart indicating field by field the relationships among an output of a charge-coupled device, an output of a waveform detecting circuit, and data produced by a charge-coupled device shutter;

FIGS. 33 to 40G relate to the ninth embodiment of the present invention;

FIG. 33 is a diagram schematically showing an endoscopic imaging apparatus of the ninth embodiment;

FIG. 34 is a diagram showing a practical configuration of an endoscopic imaging unit;

FIG. 36 is a graph indicating characteristics attained when two filters are used for imaging;

FIGS. 37A to 37C are explanatory diagrams for explaining the action of a filter or the like, which is located on an optical path, according to a field judgment signal;

FIG. 38 is a block diagram showing a configuration of a video processor serving as an image processing unit;

FIG. 39 is a block diagram showing a configuration of a dynamic range expanding unit;

FIGS. 40A to 40G are timing charts for explaining the actions of the dynamic range expanding unit;

FIGS. 41 to 52 relate to the tenth embodiment of the present invention;

FIG. 41 is a diagram showing a practical configuration of a field-sequential type endoscopic imaging unit of the tenth embodiment;

FIG. 42 is a diagram showing an RGB rotary filter;

FIG. 43 is a diagram showing a filter member;

FIG. 44 is a block diagram showing a configuration of a video processor serving as an image processing unit;

FIGS. 45A to 45F are explanatory diagrams indicating the actions of an endoscopic imaging unit;

FIG. 46 is a block diagram showing a configuration of a dynamic range expanding unit;

FIGS. 47A to 47I are explanatory diagrams indicating the actions of a signal selector interpolator;

FIGS. 48A and 48E are explanatory diagrams indicating the actions of an imaging unit in the first variant;

FIG. 49 is a diagram showing a filter member in the second variant;

FIGS. 50A to 50I are explanatory diagrams indicating the actions of an imaging unit;

FIGS. 51A to 51I are explanatory diagrams indicating the actions of a signal selector interpolator;

FIG. 52 is a block diagram schematically showing a configuration of a signal selector and interpolator;

FIGS. 53 to 55C relate to the eleventh embodiment of the present invention;

FIG. 53 is a diagram showing part of an imaging unit in the eleventh embodiment;

FIGS. 54A to 54C are explanatory diagrams indicating the actions of the imaging unit;

FIGS. 55A to 55C are explanatory diagrams for explaining the actions of an imaging unit in a variant of the eleventh embodiment;

FIGS. 56 to 59 relate to the twelfth embodiment of the present invention;

FIG. 56 is a diagram schematically showing a configuration of an endoscopic imaging apparatus of the twelfth embodiment;

FIGS. 58A to 58C are explanatory diagrams indicating the actions of a unit for controlling an amount of emitted light;

FIG. 59 is a diagram showing a configuration of a light source unit in a variant of the twelfth embodiment;

FIGS. 60 to 61D relate to the thirteenth embodiment of the present invention;

FIG. 60 is a diagram schematically showing a configuration of an endoscopic imaging apparatus of the thirteenth embodiment; and FIGS. 61A to 61D are explanatory diagrams indicating the actions of a unit for controlling an amount of emitted light.

DESCRIPTION OF THE PREFERRED EMBODIMENTS

Figure 3A:
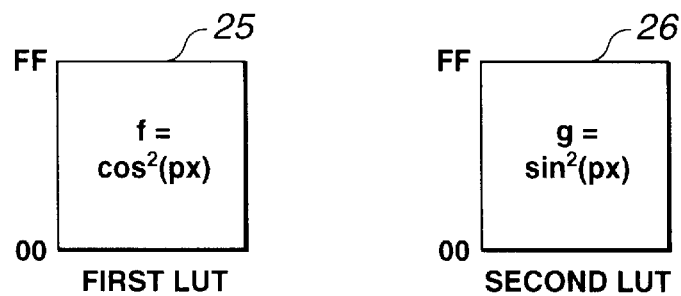
FIG. 3A is a diagram showing memory maps of first and second look-up tables shown in FIG. 2.

Referring to the drawings, embodiments of the present invention will be described below.

First Embodiment

As shown in FIG. 1, an imaging apparatus 1 of this embodiment consists of a charge-coupled device (CCD) 2, a synchronizing (hereinafter, sync) signal generating circuit (SSG) 3, a timing generator 4, and a CCD driver 5. The CCD 2 is a single-plate color imaging device for imaging an object. The SSG generates a reference signal. The timing generator 4 inputs the reference signal sent from the SSG 3 and produces a driving signal or the like used to drive the CCD 2. The CCD driver drives the CCD 2 in response to the driving signal sent from the timing generator 4.

The imaging apparatus 1 further includes a preamplifier 6, a CDS circuit 7, and an A/D converter 8. The preamplifier 6 amplifies an image signal sent from the CCD 2. The CDS circuit 7 carries out correlative double sampling (CDS) according to a sampling pulse sent from the timing generator 4. The A/D converter 8 converts an analog signal output from the CDS circuit 7 into a digital signal. After an image signal output from the CCD 2 is amplified by the preamplifier 6, the frequency of the image signal is lowered to the baseband by the CDS circuit 7. The resultant signal is converted into a digital signal by the A/D converter 8. The A/D converter 8 converts an analog signal into a digital signal of 8 bits long.

Furthermore, the imaging apparatus 1 includes a color separating circuit 9, a white balance circuit 10, an automatic gain control circuit (hereinafter, AGC circuit) 11, a knee and gamma circuit 12, a red dynamic range expanding circuit 15R, green dynamic range expanding circuit 15G, and blue dynamic range expanding circuit 15B, an enhancing circuit 16, and a D/A converter 18. Specifically, the color separating circuit 9 separates three color-signal components representing red, green and blue from a digital signal produced by the A/D converter 8. The white balance circuit 10 adjusts a white balance indicated by each of digital signals that are the color-signal components separated by the color separating circuit 9. The AGC circuit 11 adjusts a gain to be given to each of the digital signals whose white balance has been adjusted by the white balance circuit 10. The knee and gamma circuit 12 treats a knee of a curve plotted based on each of the digital signals whose gain has been adjusted by the AGC circuit 11, and corrects a gamma indicated by the digital signal. The red dynamic range expanding circuit 15R, green dynamic range expanding circuit 15G, and blue dynamic range expanding circuit 15B expand dynamic ranges for the red, green, and blue digital signals that have been processed to treat a knee and correct a gamma. The enhancing circuit 16 enhances the red, green, and blue digital signals for which dynamic ranges have been expanded by the red dynamic range expanding circuit 15R, green dynamic range expanding circuit 15G, and blue dynamic range expanding circuit 15B respectively. The D/A converter 18 converts the digital signals, which have been enhanced by the enhancing circuit 16, into analog signals, and outputs the analog signals to a monitor 19 via a 75Ω driver 17.

The red dynamic range expanding circuit 15R includes, as shown in FIG. 2, a field memory 21, and a first selector 22 and second selector 23. Specifically, the field memory 21 stores a digital signal of a red signal rendering one field and being processed to treat a knee and correct a gamma by the knee and gamma circuit 12. The first selector 22 and second selector 23 select and output either of a red signal rendering a previous field and a red signal rendering a current field, which are stored in the field memory 21, according to a field judgment signal sent from the timing generator 4. The second selector 23 is connected to the first selector 22 via an inverter 24. The second selector 23 therefore outputs a red signal rendering a field different from the previous field or current field represented by a red signal output from the first selector 22.

The red dynamic range expanding circuit 15R consists of a first look-up table (hereinafter, first LUT) 25 and second LUT 26, a first multiplier 27, a second multiplier 28, and an adder 29. Specifically, a given function, which will be described later, specified by the level of a portion of an output, that is, a red signal component of the second selector 23 is read from the first LUT 25 and second LUT 26. Herein, the red signal component renders a pixel. The first multiplier 27 multiplies the red signal component, which receives from the first selector 22 and renders a pixel, by an output of the first LUT 25. The second multiplier 28 multiplies, the red signal component, which receives from the second selector 23 and renders a pixel, by an output of the second LUT 26. The adder 29 adds up an output of the first multiplier 27 and an output of the second multiplier 28, and outputs a result to the enhancing circuit 16.

The green dynamic range expanding circuit 15G and blue dynamic range expanding circuit 15B have the same circuitry as the red dynamic range expanding circuit 15R. The description of their configurations will therefore be omitted.

The first LUT 25 and second LUT 26 are memory maps like the ones shown in FIG. 3A.

In the first LUT 25 and second LUT 26, a weight coefficient $f=\cos^2$ that decreases monotonously, and a weight coefficient $g=\sin^2$ that increases monotonously are stored at addresses 00 to FF. The addresses are each, for example, 8 bits long. The data of the weight coefficients or functions f and g is set so that the sum thereof will be 1.

Now, the addresses 00 to FF each having a length of 8 bits are associated with luminance levels indicated by a 8-bit input digital signal. More particularly, assume that an image signal produced by the CCD 2 indicates a luminance level 0, and the image signal is converted into a digital signal by the A/D converter 8. In this case, an address 00h is referenced in the first LUT 25 and second LUT 26.

As shown in FIG. 1, an output signal of the CCD 2, that is, an image signal is amplified and corrected in terms of a gamma by the AGC circuit 11 and others. The signal level is adjusted according to the dynamic range permitted by the display screen of the monitor 19.

In other words, when an output signal of the CCD 2 indicates a luminance level 0, the level of a signal input to the monitor 19 is also 0. When the CCD 2 is saturated, the level of an image signal output to the monitor is adjusted to have a saturation value (Vuse in FIG. 5).

Moreover, when an image signal that is an output signal of the CCD 2 has a saturation value (for example, Vuse in FIG. 5), the image signal is sent to the A/D converter 8 and others. An address FFh is then referenced in the first LUT 25 and second LUT 26. Incidentally, for example, 00h means 00 in hexadecimal notation.

A signal x based on which the first LUT 25 and second LUT 26 are referenced may be standardized to represent a value ranging from 0 to 1 (namely, a digital value 00h is associated with 0 and a digital value FFh is associated with 1). In this case, $\cos^2(px)$ is read from the first LUT 25 and $\sin^2(px)$ is read from the second LUT 26.

Based on a signal x based on which the first LUT 25 and second LUT 26 are referenced, data is read from an associated address. The reading is illustrated in FIG. 3B.

Figure 3B:
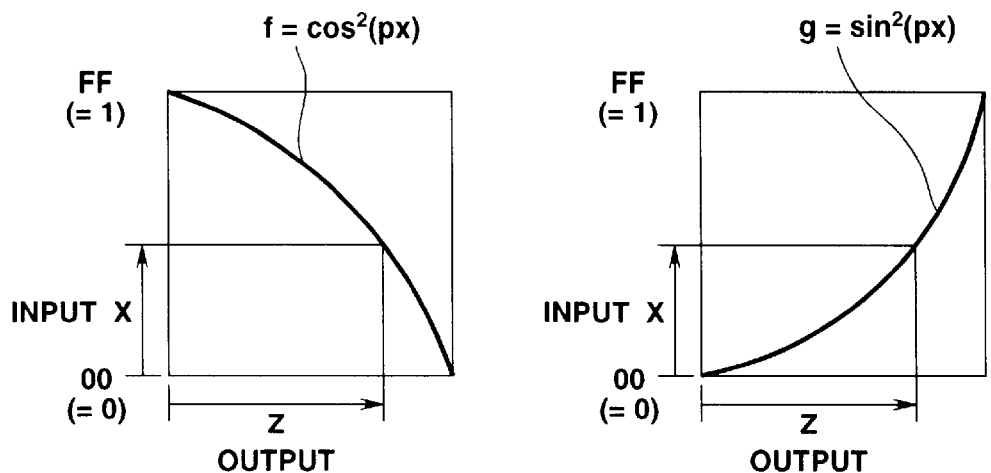
FIG. 3B is an explanatory diagram graphically showing weight coefficients output from the first and second look-up tables in relation to an input signal.

In FIG. 3B, p denotes a correction coefficient. Assume that a brightness level at which an image signal, which is produced by imaging an object during a short exposure time, has a saturation value of ys2. The correction coefficient p is set to a value causing the weight function g, that is, $\sin^2(px)$ to have 1 relative to the brightness level of ys2, for example, $p=(\pi \cdot ys2/2)$.

Next, the operations of the imaging apparatus 1 of this embodiment having the foregoing components will be described.

A driving signal is produced by the timing generator 4 according to a reference signal sent from the SSG 3. With the driving signal, the CCD driver 5 drives the CCD 2. A photoelectrically converted signal of an object produced by the CCD 2 is amplified by the preamplifier 6. The frequency of the signal is then lowered to fall within the baseband by the CDS circuit 7. The resultant signal is then converted into a digital signal by the A/D converter 8.

With the driving signal generated by the timing generator 4, the CCD driver 5 drives the CCD 2. When driven, the CCD 2 will image an object at a shutter speed that is different from field to field, for example, a first shutter speed of 1/60 sec. Otherwise, the CCD 2 will image the object using a high-speed device shutter at a second shutter speed that is, for example, a quadruple of the first shutter speed (that is, 1/240 sec).

In other words, an object image rendering field A is produced at the first shutter speed. An object image rendering field B is produced at the second shutter speed. For field B, an image signal produced by exposing an object for a period of time other than 1/240 sec during one field period (1/60 sec) is swept away quickly.

As described later, image signals produced by imaging an object at different shutter speeds are processed by the red dynamic range expanding circuit 15R, green dynamic range expanding circuit 15G, and blue dynamic range expanding circuit 15B. Thus, the dynamic ranges for red, green, and blue signals are expanded.

Thereafter, three color-signal components of red, green, and blue are separated from a digital signal, which has been converted from an analog signal, by the color separating circuit 9. On the three resultant digital signals, white balance adjustment, gain control, knee treatment, and gamma correction are performed by the white balance circuit 10, AGC circuit 11, and knee and gamma circuit 12 respectively. Thereafter, the red dynamic range expanding circuit 15R, green dynamic range expanding circuit 15G, and blue dynamic range expanding circuit 15B expand the dynamic ranges for the red, green, and blue digital signals. The enhancing circuit 16 enhances the digital signals. The D/A converter 18 converts the digital signals into analog signals. The analog signals are output to the monitor 19 via the 75Ω driver 17.

Next, dynamic range expansion processing to be performed by the red dynamic range expanding circuit 15R, green dynamic range expanding circuit 15G, and blue dynamic range expanding circuit 15B will be detailed. Referring to the timing chart of FIGS. 4A to 4I, dynamic range expansion processing will be described by taking the red dynamic range expanding circuit 15R for instance.

A field judgment signal (FIG. 4B) is synchronous with a vertical sync signal VD (FIG. 4A) contained in a video signal. The field judgment signal is output from the timing generator 4 to the second selector 23 via the first selector 22 and inverter 24 in the red dynamic range expanding circuit 15R.

Moreover, a red output of the knee and gamma circuit 12 is applied to one input terminal of the first selector 22 and second selector 23 in the red dynamic range expanding circuit 15R. An output of the field memory 21 (FIG. 4D) is applied to the other input terminal of the first selector 22 and second selector 23.

Based on the field judgment signal, a digital signal produced at the first shutter speed (1/60 sec) to render field A is output from the first selector 22. A digital signal produced at the second shutter speed (1/240 sec) to render field B is output from the second selector 23.

The digital signal rendering field A from the first selector 22 is output to the first multiplier 27. The digital signal rendering field B from the second selector 23 is output to the second multiplier 28, first LUT 25 (FIG. 4E), and second LUT 26 (FIG. 4F).

At this time, based on a signal x that is a digital image signal component rendering a pixel of field B and $\cos^2(px)$ is output from the first LUT 25 and a digital image signal component rendering a pixel of field B and $\sin^2(px)$ is output from the second LUT 26.

Figure 5:
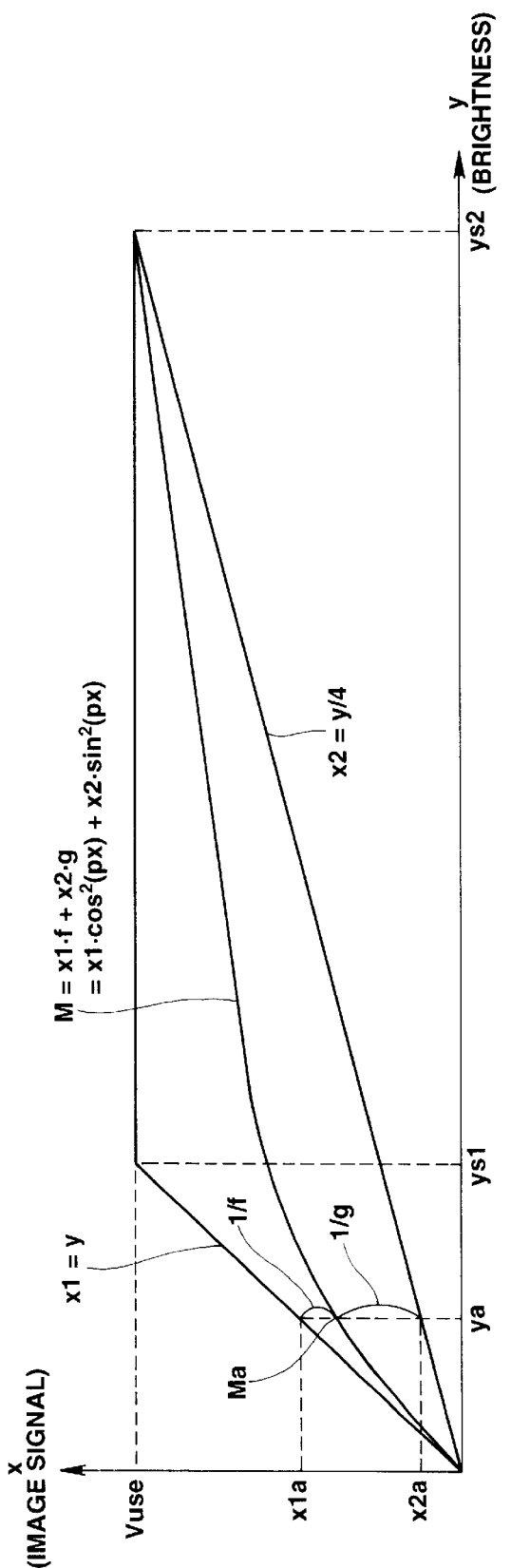

In this case, an image signal rendering field A is produced by imaging an object during an exposure time (imaging time) that is four times longer than the exposure time during which an image signal rendering field B is produced. As shown in FIG. 5, the image signal exhibits a characteristic x1=y relative to a brightness level y of the object. By contrast, an image signal rendering field B exhibits a characteristic x2=y/4.

The image signal x1 rendering field A has a saturation value Vuse relative to a brightness level ys1. The image signal x2 rendering field B has the saturation value Vuse relative to a brightness level ys2 (=4ys1).

In this embodiment, assume that an image signal x1 produced at a brightness level ya to render field A has, for example, a value x1a in FIG. 5. In this case, an image signal rendering field B has a value x2a.

As shown in FIG. 3B, the first LUT 25 and second LUT 26 are referenced based on the image signal x2 rendering field B. Weight functions of $f=\cos^2(px)$ and $g=\sin^2(px)$ are then read out.

The functions $\cos^2(px)$ and $\sin^2(px)$ are output to the first multiplier 27 and second multiplier 28. The first multiplier 27 multiplies a digital image signal component, which renders a pixel of field A, by $\cos^2(px)$ (FIG. 4G). The second multiplier 28 multiplies a digital image signal component, which renders a pixel of field B, by $\sin^2(px)$ (FIG. 4H).

The adder 29 adds up an output of the first multiplier 27 and an output of the second multiplier (FIG. 4I).

In FIGS. 4A to 4I, for brevity's sake, an output rendering each pixel of field A is denoted by An, and an output rendering each pixel of field B is denoted by Bn. Dynamic range expansion processing in this embodiment is, as mentioned above, carried out in units of a pixel. Assume that an output value that is a digital image signal component rendering each pixel of field A is x, and an output value that is a digital image signal component rendering each pixel of field B is u. An output M of the adder 29 is expressed as follows:

$$M=x\cos^2(px)+u\sin^2(px).$$

The green dynamic range expanding circuit 15G and blue dynamic range expanding circuit 15B act similarly to the red dynamic range expanding circuit 15R. The description of the expanding circuits will therefore be omitted.

According to this embodiment, as shown in FIG. 5, the digital image signal x1 is produced at the first shutter speed (1/60 sec) to render field A. The digital image signal x2 (=u) is produced at the second shutter speed (1/240 sec) to render field B. When a luminance level is low, the output M of the red dynamic range expanding circuit 15R is dominated by the digital image signal x1 weighted with $\cos^2(px)$. When a luminance level is high, the output M is dominated by the digital image signal x2 weighted with $\sin^2(px)$. Thus, a dynamic range can be expanded without any deterioration of a signal-to-noise ratio of a picture signal component indicating a low luminance level.

For more details, referring to FIG. 5, the output M corresponding to a synthetic picture signal produced by weighting two picture signals and adding them up will be studied. When a brightness level is, for example, higher than 0 and much lower than ys1, the weight f for the picture signal rendering field A is larger. The weight g for the picture signal rendering field B is smaller. That is to say, f>g>0 is established. The synthetic picture signal is a synthetic picture signal produced by slightly mixing the picture signal rendering field B in the picture signal rendering field A with pixel locations matched.

Moreover, when a brightness level is higher than ys1, the picture signal rendering field A has a saturation value. The weight f for the picture signal having the saturation value is smaller. By contrast, the weight g for the picture signal rendering field B is larger. Namely, g>f>0 is established. The synthetic picture signal is therefore produced by slightly mixing the saturation value of the picture signal rendering field A in the picture signal rendering field B. The synthetic picture signal exhibits a characteristic of indicating a luminance level that increases smoothly with an increase in brightness level of an object.

In other words, according to the first embodiment, a first image signal that has a saturation value relative to a first brightness level ys1 is weighted with a weight coefficient f that decreases monotonously. A second image signal that has a saturation value relative to a second brightness level ys2 higher than the first brightness level ys1 (four times higher than ys1 in FIG. 5) is weighted with a weight coefficient g that increases monotonously. Resultant picture signals are added up by an adder. Thus, a synthetic picture signal is produced.

In this embodiment, the sum of the weight coefficients f and g is retained at 1. It is thus prevented that the level of a synthetic picture signal resulting from addition gets larger after passing through a dynamic range expanding circuit, and thus exceeds the level of a picture signal to be output to the monitor 19 which is a saturation value. In other words, when the sum exceeds 1, a compression circuit must be installed on a stage succeeding the dynamic range expanding circuit. This embodiment obviates the necessity of the compression circuit.

Moreover, referring to FIG. 5, the output Ma corresponding to a synthetic picture signal is produced by weighting the image signal x1a, and the image signal x2a with the weight coefficients f and g, and adding them up. Herein, the image signal x1a is produced at a brightness level ya in order to render field A. The image signal x2a renders field B. The level of the output Ma is determined by adopting the levels of the signals x1a and x2a according to a ratio proportional to the ratio of the inverse value of the weight coefficient f, 1/f, to the inverse value of the weight coefficient g, 1/g.

Moreover, as seen from FIG. 5, the output M may be regarded as a function of a brightness level that is a variable. The derived function of the function is positive and decreases monotonously. That is to say, the gradient of the derived function is increased relative to low brightness levels. The gradient is decreased continuously with a rise in brightness level. This results in a wider dynamic range.

A thus produced synthetic picture signal can be expressed as a function that increases continuously smoothly and monotonously by setting the coefficient p properly relative to the image signal x. At this time, the function increases within the range of brightness levels up to a brightness level at which a signal produced at a second shutter speed has a saturation value. Consequently, a natural image not giving a sense of incongruity can be viewed. In other words, according to this embodiment, the synthetic picture signal M is produced by weighting two whole image signals (one image signal has a saturation value) and adding them up. This embodiment can therefore offer a wide dynamic range that is wide enough to produce a synthetic picture signal similar to a picture signal produced by performing imaging once. Moreover, a picture signal exhibiting a characteristic of indicating a luminance level that changes smoothly with an increase in brightness of an object can be produced to display a natural good-quality image. Moreover, even when an object makes a motion, inconsistency between a contour depicted by a picture signal component indicating a low luminance level and a contour depicted by another component indicating a high luminance level is minimized.

Moreover, in this embodiment, two image signals are weighted with weight coefficients and then added up. The sum of the weight coefficients f and g is set to 1. A picture signal resulting from addition enjoys a wide dynamic range ending with the signal level of an image signal rendering field B which is a saturation value. Moreover, it will not take place that the signal level is raised before and after the image signal passes through the dynamic range expanding circuit 15R or the like.

By contrast, according to the prior art disclosed in the Japanese Unexamined Patent Publication No. 6-141229, a different weight is applied under a condition close to a boundary condition under which one of two image signals has a saturation value. Image signals weighted are then added up. The signal level of a resultant picture signal relative to a condition away from the boundary condition becomes a several multiple of the signal level thereof attained under the boundary condition. A compression circuit for compressing a synthetic picture signal must therefore be installed on a succeeding stage.

Moreover, the compression circuit is used to compress a synthetic picture signal so that the signal will exhibit a characteristic that the signal level varies continuously with an increase in brightness. In this case, the compression circuit must incur a large load.

In this embodiment, the correction coefficient p is set as p≈(π·ys2/2). Aside from this, the correction coefficient p may be set to any value causing the output M to increase monotonously with an increase in brightness according to the characteristics of the CCD. Moreover, the output M is not limited to the function $x \cos^2(px)+u\sin^2(px)$. Alternatively, the output M may be a function constructing a synthetic picture signal, which is dominated by an image signal produced at a low shutter speed, relative to a low luminance level. Relative to a high luminance level, the function constructs a synthetic picture signal dominated by an image signal produced at a high shutter speed.

In FIG. 5, for brevity's sake, the signals x1 and x2 vary linearly relative to a brightness level y. This embodiment can also be adapted to an imaging apparatus in which the signals vary non-linearly.

In this embodiment, the color separating circuit 9 separates red, green, and blue color signal components. The red dynamic range expanding circuit 15R, green dynamic range expanding circuit 15G, and blue dynamic range expanding circuit 15B expand the dynamic ranges for the red, green, and blue signals. The present invention is not limited to this mode. Alternatively, the color separating circuit may separate a luminance signal and chrominance signal. The dynamic ranges for both the luminance signal and chrominance signal or the dynamic range for only the luminance signal may be expanded.

Figure 6:
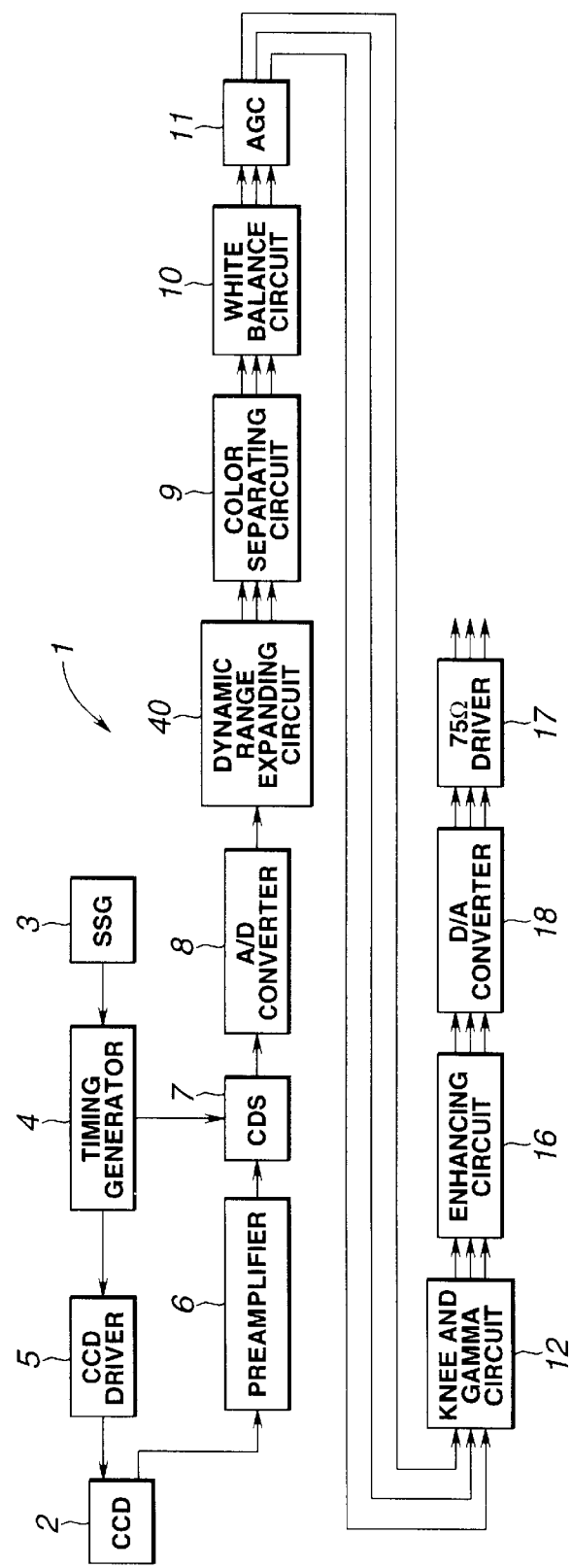

In this embodiment, after color signal components are separated, the dynamic ranges for the signals are expanded. The present invention is not limited to this mode. Alternatively, as shown in FIG. 6, the red dynamic range expanding circuit 15R, green dynamic range expanding circuit 15G, and blue dynamic range expanding circuit 15B may be unused. Instead, a dynamic range expanding circuit 40 may be installed on a stage succeeding the A/D converter 8 for converting an analog signal into a digital signal. The dynamic range for a signal that has just been digitized may be expanded. In this case, the other components are identical to those of this embodiment.

In the first embodiment, the weight coefficients f and g are determined with an image signal rendering field B. Alternatively, they may be determined with both image signals rendering fields A and B. In this case, the red dynamic range expanding circuit 15R has a configuration shown in FIG. 7.

Figure 7:
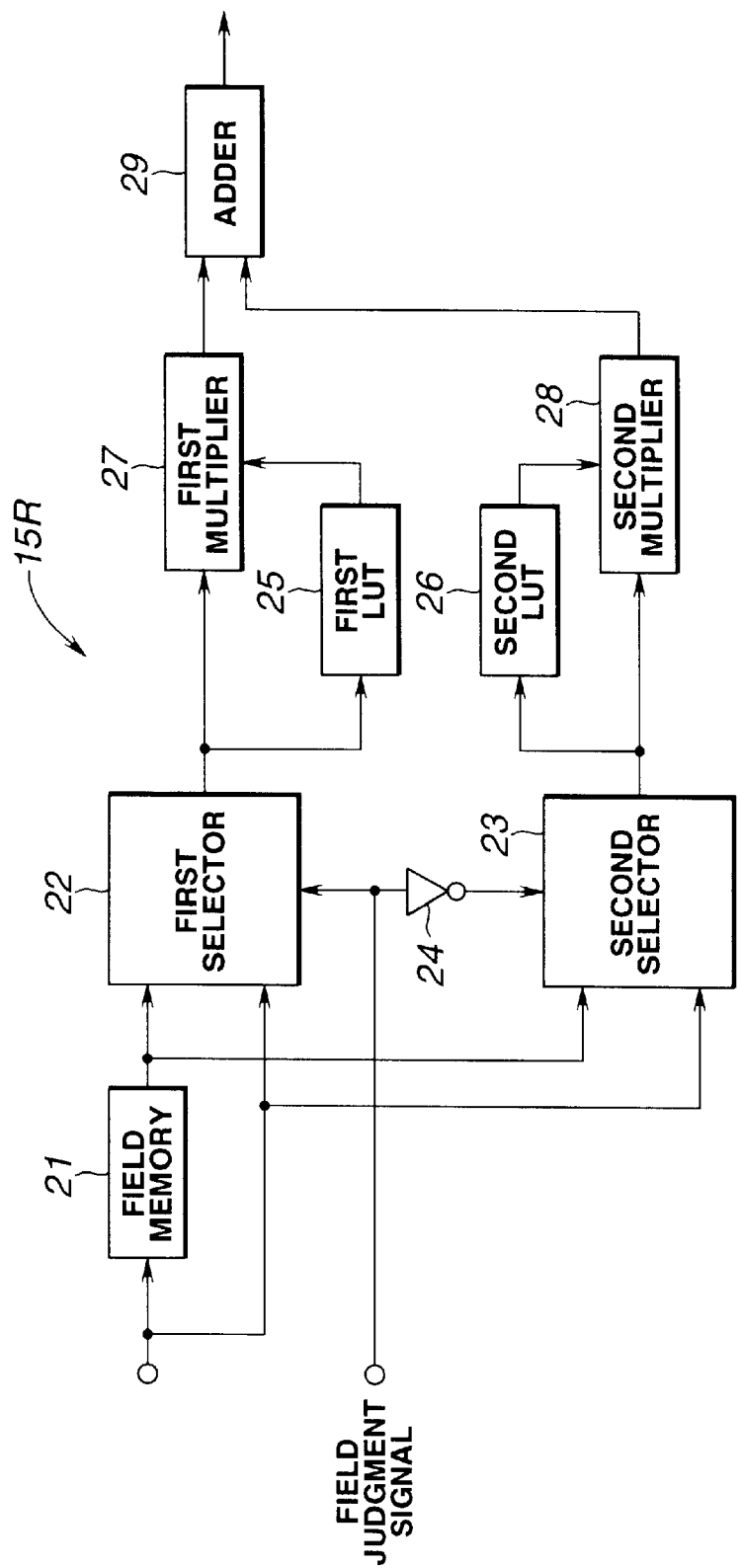

In FIG. 2, an output of the second selector 23 is input to the first and second LUTs 25 and 26. In FIG. 7, an output of the first selector 22 is input to the first LUT 25, and an output of the second selector 23 is input to the second LUT 26. The other connections are identical to those shown in FIG. 2.

In FIG. 7, a weight coefficient f is read from the first LUT 25 according to an image signal rendering field A. A weight coefficient g is read from the second LUT 26 according to an image signal rendering field B.

Even in this variant, the weight coefficients f and g are $f=\cos^2(px)$ and $g=\sin^2(px)$. Herein, px is defined within a range of brightness levels ys2 associated with a range from a level 0 of the second image signal x2 to a level of a saturation value thereof.

In this variant, when an imaging condition becomes different between fields A and B (for example, a brightness level of an object becomes different between fields A and B), the sum of the weight coefficients f and g may not be 1. Herein, the weight coefficient f is read based on the level of the first image signal x1 rendering field A. The weight coefficient g is read based on the level of the second image signal x2 rendering field B. In this case, therefore, f+g=1 is established. By contrast, in the first embodiment, the two weight coefficients f and g are determined based on the level of one image signal. f+g=1 can be satisfied.

Second Embodiment

The second embodiment is substantially identical to the first embodiment. Only a difference will be described. The same reference numerals will be assigned to the same components. The description of the components will be omitted.

Figure 8A:
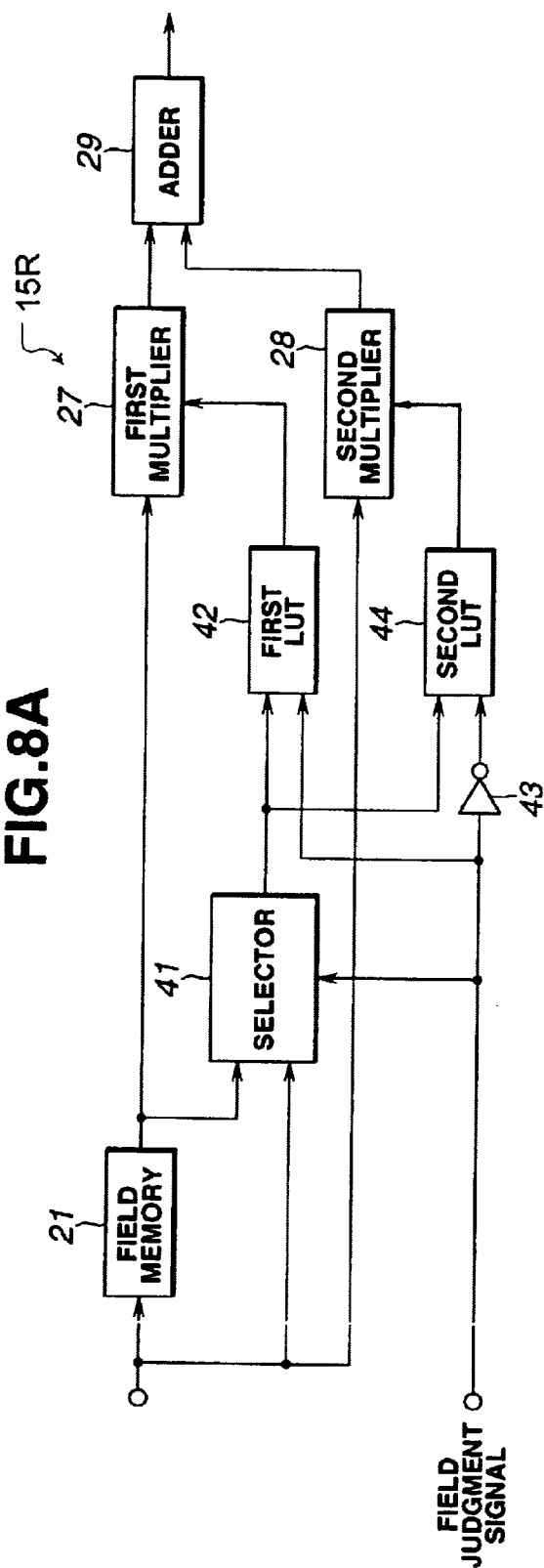

The red dynamic range expanding circuit 15R in this embodiment includes, as shown in FIG. 8A, the field memory 21, a selector 41, a first LUT 42, and a second LUT 44. Specifically, the field memory 21 stores a digital red signal rendering one field and having been processed to treat a knee and correct a gamma by the knee and gamma circuit 12. The selector 41 selects and outputs either of a red signal rendering a previous field and a red signal rendering a current field, which are stored in the field memory 21, according to a field judgment signal sent from the timing generator 4. The field judgment signal is input as a high-order address bit into the first LUT 42. A given function that will be described later is output from the first LUT 42 according to the level of an output signal rendering a pixel. The field judgment signal is input as a high-order address bit into the second LUT 44 via an inverter 43. A given function that will be described later is output from the second LUT 44 according to the level of an output signal rendering a pixel. The first multiplier 27 multiplies the red signal output from the field memory 21 by the output signal rendering a pixel and an output of the first LUT 42. The second multiplier 28 multiplies the red signal output from the knee and gamma circuit 12 by the output signal rendering a pixel and an output of the second LUT 44. The adder 29 adds up outputs of the first multiplier 27 and second multiplier 28, and outputs a resultant signal to the enhancing circuit 16.

When an image signal produced at the first shutter speed (1/60 sec) to render field A is output from the field memory 21, the selector 41 selects an image signal rendering field B which is output from the knee and gamma circuit 12. The field judgment signal is input as a high-order address bit "0" to the first LUT 42. The field judgment signal is input as a high-order address bit "1" to the second LUT 44 via the inverter 43.

When an image signal produced at the second shutter speed (1/240 sec) to render field B is output from the field memory 21, the selector 41 selects the image signal rendering field B. The field judgment signal is input as a high-order address bit "1" to the first LUT 42. The field judgment signal is input as a high-order address bit "0" to the second LUT 44 via the inverter 43.

The green dynamic range expanding circuit 5G and blue dynamic range expanding circuit 15B have the same circuitry as the red dynamic range expanding circuit 15R of this embodiment. The description of the circuits will be omitted.

Figure 8B:
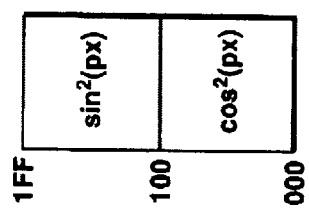
FIG. 8B is a diagram showing a memory map of first and second look-up tables shown in FIG. 8A.

The foregoing first LUT 42 and second LUT 44 are, as shown in FIG. 8B, defined in a common memory map. When the high-order address bit "0" is input, $\cos^2(px)$ where x denotes the level of the output signal rendering a pixel is output. When the high-order address bit "1" is input, $\sin^2(px)$ where x denotes the level of the output signal rendering a pixel is output.

The other components are identical to those of the first embodiment.

Next, the operations of this embodiment will be described with reference to the timing charts of FIGS. 9A to 9I.

A field judgment signal (FIG. 9B) synchronous with a video signal VD (FIG. 9A) is output from the timing generator 4 to the selector 41 and first LUT 42 in the red dynamic range expanding circuit 15R. The field judgment signal is also output to the second LUT 44 via the inverter 24 therein.

A red output of the knee and gamma circuit 12 is input to the field memory 21 (FIG. 9C), selector 41, and second multiplier 28 in the red dynamic range expanding circuit 15R. An output of the field memory (FIG. 9D) is input to the selector 41 and first multiplier 27.

Assume that a digital image signal rendering field A is stored in the field memory 21. In this case, a digital image signal rendering field B is output from the knee and gamma circuit 12 to the first LUT 42 and second LUT 44 via the selector 41 in response to the field judgment signal. At this time, a high-order address bit "0" is input into the first LUT 42. $\cos^2(px)$ where x denotes the level of an output rendering a pixel is output (FIG. 9E). A high-order address bit "1" is input into the second LUT 44. $\sin^2(px)$ where x denotes the level of an output rendering a pixel is output (FIG. 9F).

The first multiplier 27 multiplies the digital image signal rendering a pixel of field A by $\cos^2(px)$ (FIG. 9G). The second multiplier 28 multiplies the digital image signal rendering a pixel of field B by $\sin^2(px)$ (FIG. 9H).

Assume that a digital image signal rendering field B is stored in the field memory 21. In this case, the digital image signal rendering field B is output from the field memory 21 to the first LUT 42 and second LUT 44 via the selector 44 in response to a field judgment signal. At this time, a high-order address bit "1" is input into the first LUT 42. $\sin^2(px)$ where x denotes the level of an output rendering a pixel is output (FIG. 9E). A high-order address bit of "0" is input into the second LUT 44. $\cos^2(px)$ where x denotes the level of an output rendering a pixel is output (FIG. 9F).

The multiplier 27 multiplies the digital image signal rendering a pixel of field B by $\sin^2(px)$ (FIG. 9G). The second multiplier 28 multiplies the digital image signal rendering a pixel of field A by $\cos^2(px)$ (FIG. 9H).

The adder 29 adds up an output of the first multiplier 27 and an output of the second multiplier 28 (FIG. 9I).

The other components are identical to those of the first embodiment.

Even in this embodiment, the same advantages as those provided by the first embodiment can be provided.

As mentioned above, according to the first and second embodiments and variant, a picture signal producing means changes the ratio of a first image signal to a second image signal according to a light level incident on an imaging means. The picture signal producing means then synthesizes a first picture signal based on the first image signal with a second picture signal based on the second image signal. The dynamic range for an image signal can be expanded, and it can be prevented that the signal-to-noise ratio of a signal component indicating a low luminance level deteriorates. Moreover, a picture signal whose input/output characteristic changes smoothly and which renders a natural image not giving any sense of incongruity can be produced.

In the aforesaid embodiments, a first image signal represents a first image projected during a long exposure time and a second image signal represents a second image projected during a short exposure time. The first image signal and second image signal are weighted with two weight coefficients f and g that are determined relative to brightness levels ranging up to a brightness level at which the second image signal has a saturation value. The resultant image signals are added up, thus producing a synthetic picture signal representing a synthetic image.

Alternatively, when a brightness level is higher than the brightness level at which the first image signal has a saturation value, a weight coefficient G specified with the level of the second image signal may be used to produce the output M having the characteristic like the one expressed with the curve in FIG. 5.

Even in this case, the same configuration as the first embodiment is adopted. However, data stored in the first LUT 25 and second LUT 26 is different from that shown in FIG. 2.

For example, as long as a brightness level ranges from 0 to ys1, an output M1 is identical to that in the first embodiment. The output M1 corresponding to a synthetic picture signal is expressed as follows:

$$M1 = x1\cos^2(px) + x2\sin^2(px) (0 \leq y < ys1)$$

When the brightness level y is equal to or larger than ys1, an output M2 is provided as follows:

$$M2 = x2 \cdot G(x2(y))$$

In this case, a boundary condition for the output M2 is defined as follows:

$$M2(ys1) = M1(ys1)$$

$$dM1/dy = dM2/dy$$

at $y = ys1$

Namely, the derived functions of M1 and M2 relative to the brightness level y that is ys1 are equal to each other.

Thus, the output M1 joins smoothly with the output M2 at the brightness level ys1. Moreover, the output M2 relative to the brightness level ys2 is defined as follows:

$$M2(ys2)=x2(ys2)(=M(ys2))$$

Figure 10:
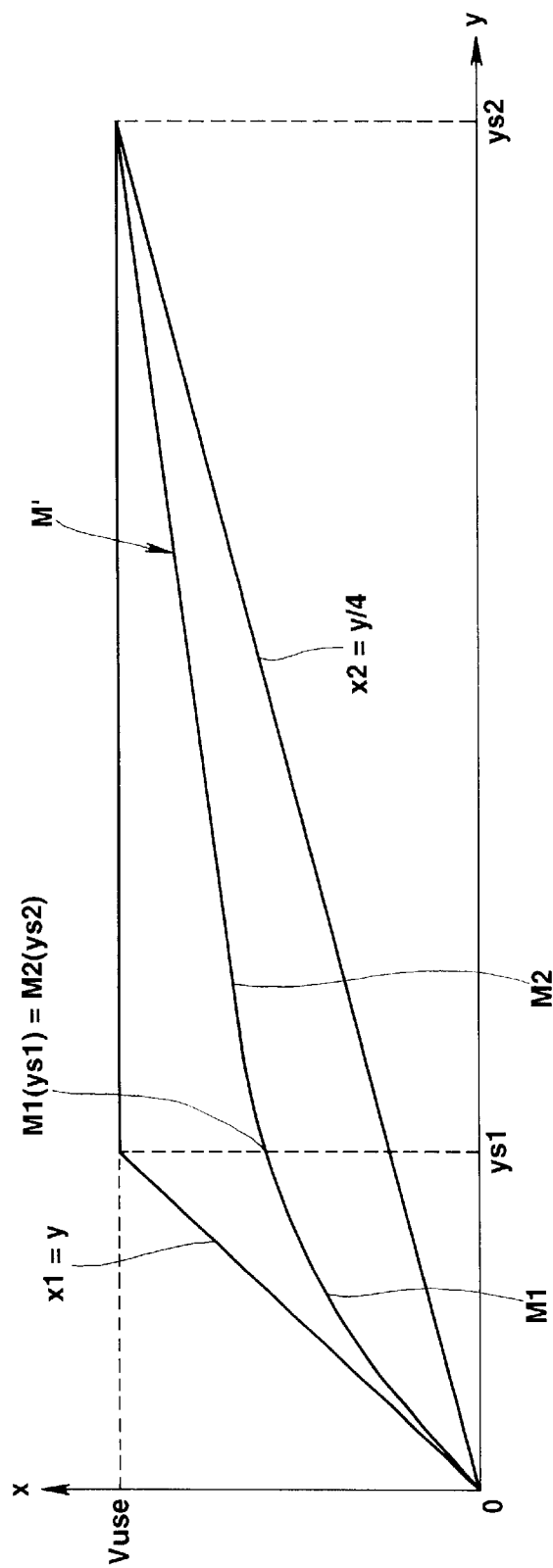
Figure 11:
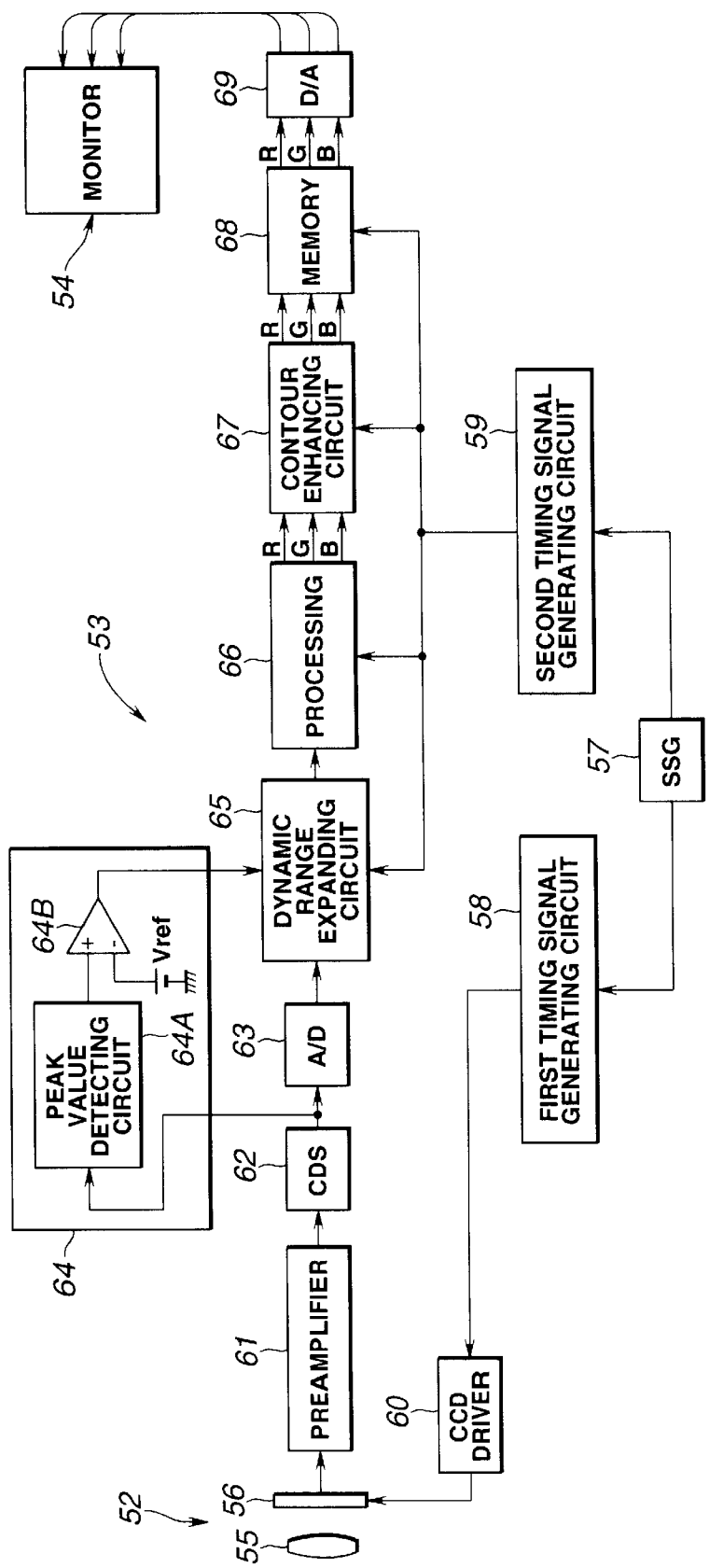
FIGS. 11 to 17 relate to the third embodiment of the present invention.

The output M2 is, as shown in FIG. 10, characterized to vary smoothly relative to brightness levels ranging from ys1 to ys2.

In this case, from the first LUT 25, a weight coefficient $\cos^2(px2)$ is read based on the image signal x2 relative to brightness levels ranging from 0 to ys1. A weight coefficient 0 is read relative to a brightness level exceeding ys1.

Moreover, from the second LUT 26, a weight coefficient $\sin^2(px2)$ is read based on the image signal x2 relative to brightness levels ranging from 0 to ys1. When the brightness level exceeds ys1, the weight coefficient is set to a value satisfying the aforesaid condition.

FIG. 10 graphically shows a characteristic of an output M', which is a synthetic picture signal in this case, relative to a brightness level y. The characteristic is fundamentally identical to that shown in FIG. 5. That is to say, as described above, when the brightness level of an object is equal to or higher than a brightness level at which the first image signal has a saturation value, a synthetic picture signal is characterized by the weight coefficient G specified by the second image signal.

In the example shown in FIG. 10, the weight coefficient G decreases monotonously relative to the brightness level y. The weight coefficient G associated with the brightness level ys1 is given as G(ys1)>1. The weight coefficient G associated with the brightness level ys2 is given as G(ys2)=1.

Even in this variant, almost the same advantages as those of the first embodiment are provided.

As described above with reference to, for example, FIG. 1, the dynamic range expanding circuits 15R, 15G, and 15B are arranged on the output stage of the knee and gamma circuit 12. The dynamic range expanding circuits 15R, 15G, and 15B may be designed to have the capability of the knee and gamma circuit 12.

Moreover, the dynamic range expanding circuit 40 in FIG. 6 may be designed to have the capability of an amplifier for amplifying an output of the CCD 2. Herein, the output is amplified so that the saturation value of the output level will be equal to that of a picture signal output to the monitor 19. In this case, the sum of the weight coefficients f and g may be set to a given value larger than 1. The saturation value of an output level of the dynamic range expanding circuit 40 will then be equalized to that of a picture signal output to the monitor 19.

Third Embodiment

The third embodiment adopting the aforesaid first and second embodiments (including the variant) will be described below. Briefly, the third embodiment includes a brightness detecting means. A weight coefficient characterizing a synthetic picture signal is selected based on a signal output from the brightness detecting means. Otherwise, the weight coefficient can be selected manually.

The fourth embodiment adopts a progressive CCD having two horizontal transfer output circuits as an imaging device.

The fifth embodiment is adapted to an endoscopic imaging apparatus. In this embodiment, an exit pupil is divided into two portions. Two imaging devices are employed. A wide dynamic range is offered, and an image suitable for endoscopic diagnosis can be constructed.

According to the sixth, seventh, and eighth embodiments, the waveform of an output signal of an imaging device is detected. Based on the waveform, one of two different exposure times or the other thereof or both thereof are changed.

The ninth to thirteenth embodiments are endoscopic imaging apparatuses. A filter member is located in front of an imaging device. An amount of light incident on the imaging device is thus controlled to produce two images similar to images projected during different exposure times. Otherwise, field-sequential color imaging may be carried out under field-sequential illumination. An amount of illumination light used to illuminate an object may be controlled using an illuminating means, whereby two images similar to those projected during different exposure times are constructed.

Next, the third embodiment of the present invention will be described with reference to FIGS. 11 to 17. An imaging apparatus 51 shown in FIG. 11 includes an imaging unit 52, a signal processing unit 53, and a monitor 54. Specifically, the imaging unit 52 is responsible for imaging. The signal processing unit 53 processes a signal output from the imaging unit 52. The monitor 54 displays an image according to a video signal produced by the signal processing unit 53.

The imaging unit 52 includes an imaging lens 55 for forming an object image, and a CCD 56 serving as a solid-state imaging device located on the image plane of the imaging lens 55. The CCD 56 is a CCD having, for example, a photoelectric converter and transferring device. A mosaic filter for optically separating color signal components is located in front of the photoelectric converter.

The signal processing unit 53 includes a reference signal generating circuit (abbreviated to SSG) 57 for generating a reference signal. The reference signal generated by the SSG 57 is output to a first timing signal generating circuit 58 and a second timing signal generating circuit 59. A timing signal generated by the first timing signal generating circuit 58 is applied to a CCD driver 60. The CCD driver 60 applies a CCD driving signal to the CCD 56 synchronously with the timing signal.

The CCD driver 60 outputs two CCD driving signals during one frame period (for example, 1/30 sec). With the CCD driving signals, two image signals produced during different exposure times are output. One of the two image signals produced during one frame period, which renders one field (however, a frame image), is produced at a high shutter speed equivalent to a short exposure time (for example, 1/150 sec). The other image signal rendering the other field is produced at a low shutter speed equivalent to a long exposure time (for example, four times longer than the exposure time equivalent to the high shutter speed, that is, 1/37.5 sec). The sum of the two exposure times is 1/30 sec corresponding to one ordinary frame period during which a standard video signal is scanned.

The image signal (charge) produced at the high shutter speed and the image signal (charge) produced at the low shutter speed are read alternately from the CCD synchronously with a vertical sync signal (abbreviated to VD) during one field period.

An image signal is photoelectrically converted by the CCD 56, and then output from the (transferring device) CCD 56 to a preamplifier 61. After amplified, the image signal is input to a correlative double sampling (CDS) circuit 62. A reset noise and others are removed and signal components are extracted. The resultant signal is input to an A/D converting circuit 63 and brightness sensing circuit 64.

The A/D converting circuit 63 converts an analog signal into a digital signal. The digital signal is input to a dynamic range expanding circuit (D range expanding circuit in FIG. 11) for expanding a dynamic range. A selection signal output from the brightness sensing circuit 64 is also input to the dynamic range expanding circuit 65.

The brightness sensing circuit 64 detects a maximum luminance level indicated by the image signal produced at the high shutter speed. Based on the maximum luminance level, the brightness sensing circuit 64 produces a selection signal assisting in selecting a function used to expand a dynamic range by the dynamic range expanding circuit 65.

For example, depending on whether the maximum luminance level exceeds a reference value, a selection signal indicating either of dynamic range expansion modes is output. In one of the modes, the dynamic range for an image signal is expanded so that the image signal will exhibit a characteristic that even a signal component indicating a high luminance level does not have a saturation value. In the other mode, the dynamic range for an image signal is expanded so that the image signal exhibits a characteristic that a signal component indicating a lower luminance level does not have the saturation value.

The brightness sensing circuit 64 is composed of a peak value detecting circuit 64A for detecting a peak value and a comparing circuit 64B. The maximum luminance level can therefore be detected by the peak value detecting circuit 64A. An output of the peak value detecting circuit 64A is compared with a reference value Vref by the comparing circuit 64B. An output signal of the comparing circuit 64B is input as the selection signal to the dynamic range expanding circuit 65.

A signal for which dynamic range has been expanded by the dynamic range expanding circuit 65 is input to a processing circuit 66. Color signal components are then separated and converted into red, green, and blue signals. The white balance detected in each of the red, green, and blue signals is adjusted. The resultant signals are then input to a contour enhancing circuit 67.

The contour enhancing circuit 67 enhances the red, green, and blue signals in terms of the contour of an image. The resultant red, green, and blue signals are input to and stored temporarily in a memory 68. Signals read from the memory 68 are input to a D/A converting circuit 69, and then converted into analog red, green, and blue signals. The red, green, and blue signals are input to a monitor 54. An object image is displayed in colors on a monitor screen.

An output signal of the second timing generating circuit 59 is input to the dynamic range expanding circuit 65, processing circuit 66, contour enhancing circuit 67, and memory 68.

Figure 12:
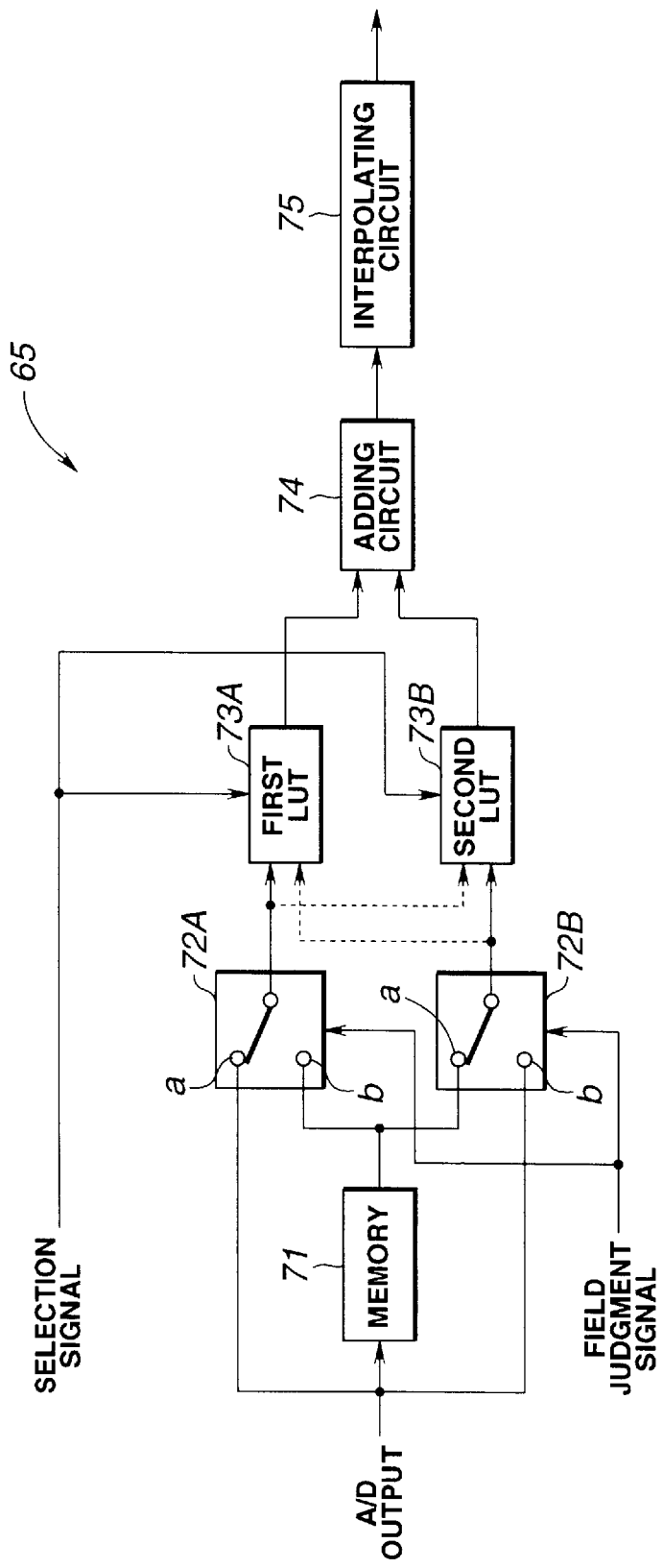

FIG. 12 shows a configuration of the dynamic range enhancing circuit 65. A digital image signal sent from the A/D converting circuit 64 is temporarily stored in a memory 71 having a storage capacity corresponding to the number of all pixels permitted by the CCD 56. The image signal is then input to a first look-up table (LUT) 73A and second LUT 73B via selectors 72A and 72B which are switched according to a field judgment signal sent from the second timing signal generating circuit 59.

Moreover, a signal read from the memory 71 is input to the first LUT 73A and second LUT 73B via the selectors 72A and 72B. A selection signal produced by sensing a brightness level by the brightness sensing circuit 65 is input to the first LUT 73A and second LUT 73B. Based on the selection signal, a synthesis function actually employed is selected from among a plurality of synthesis functions that are stored in the first LUT 73A and second LUT 73B and used to expand a dynamic range.

Signals read from the first LUT 73A and second LUT 73B are input to an adding circuit 74, and then to an interpolating circuit 75. After interpolated, a resultant signal is provided as an output signal of the dynamic range expanding circuit 65, and input to the processing circuit 66 on the succeeding stage. Color signal components are then separated.

Figure 13:
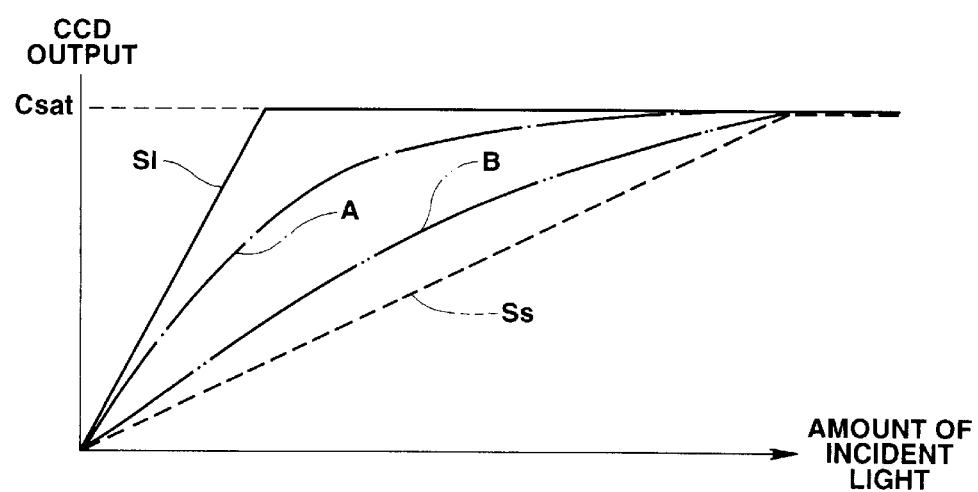

FIG. 13 is a graph showing curves expressing different input/output characteristics represented by synthesis functions one of which is selected with a selection signal output from the brightness sensing circuit 64 in order to expand a dynamic range.

When an object is image at a low shutter speed, an output of the CCD exhibits a characteristic S1 of increasing along a straight line, which has a large slope, relative to an amount of incident light. Once the output has a level of a saturation value Csat, the output remains constant. By contrast, when the object is imaged at a high shutter speed, the CCD output exhibits a characteristic Ss of increasing along a straight line, which has a small slope, relative to an amount of incident light.

Image data items produced to exhibit the characteristics S1 and Ss are weighted through the first LUT 73A and second LUT 73B, whereby a dynamic range can be expanded. In this embodiment, a selection signal is used to select a function used to expand a dynamic range. Two characteristic functions S1 and Ss are synthesized by assigning them to the selected function. Consequently, the dynamic range for a signal can be expanded so that the signal will exhibit either of input/output characteristics A and B drawn with a dot-dash line and alternate long and two short dashes line respectively.

For example, when a maximum luminance level detected in a signal is high, the dynamic range for the signal is expanded so that the signal will exhibit characteristic B. Specifically, a signal component indicating a low luminance level will be suppressed. A signal component indicating a high luminance level will not have a saturation value, and a variation of the signal component will be reflected in an image displayed. When the maximum luminance level detected in a signal is low, the dynamic range for the signal is expanded so that the signal will exhibit characteristic A. Specifically, a signal component indicating a high luminance level will be suppressed, and a variation of a signal component indicating a low luminance level will be reflected in an image displayed.

Figure 14:
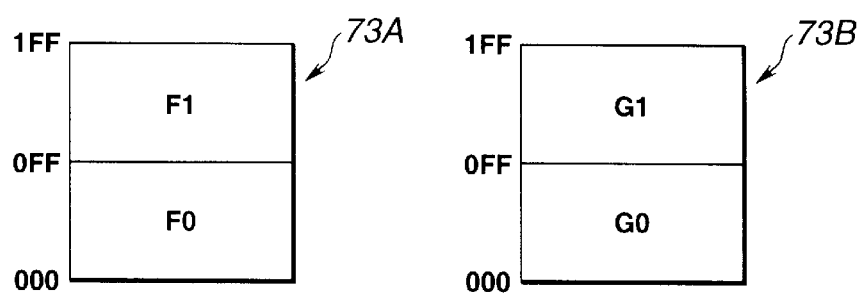
Figure 15:
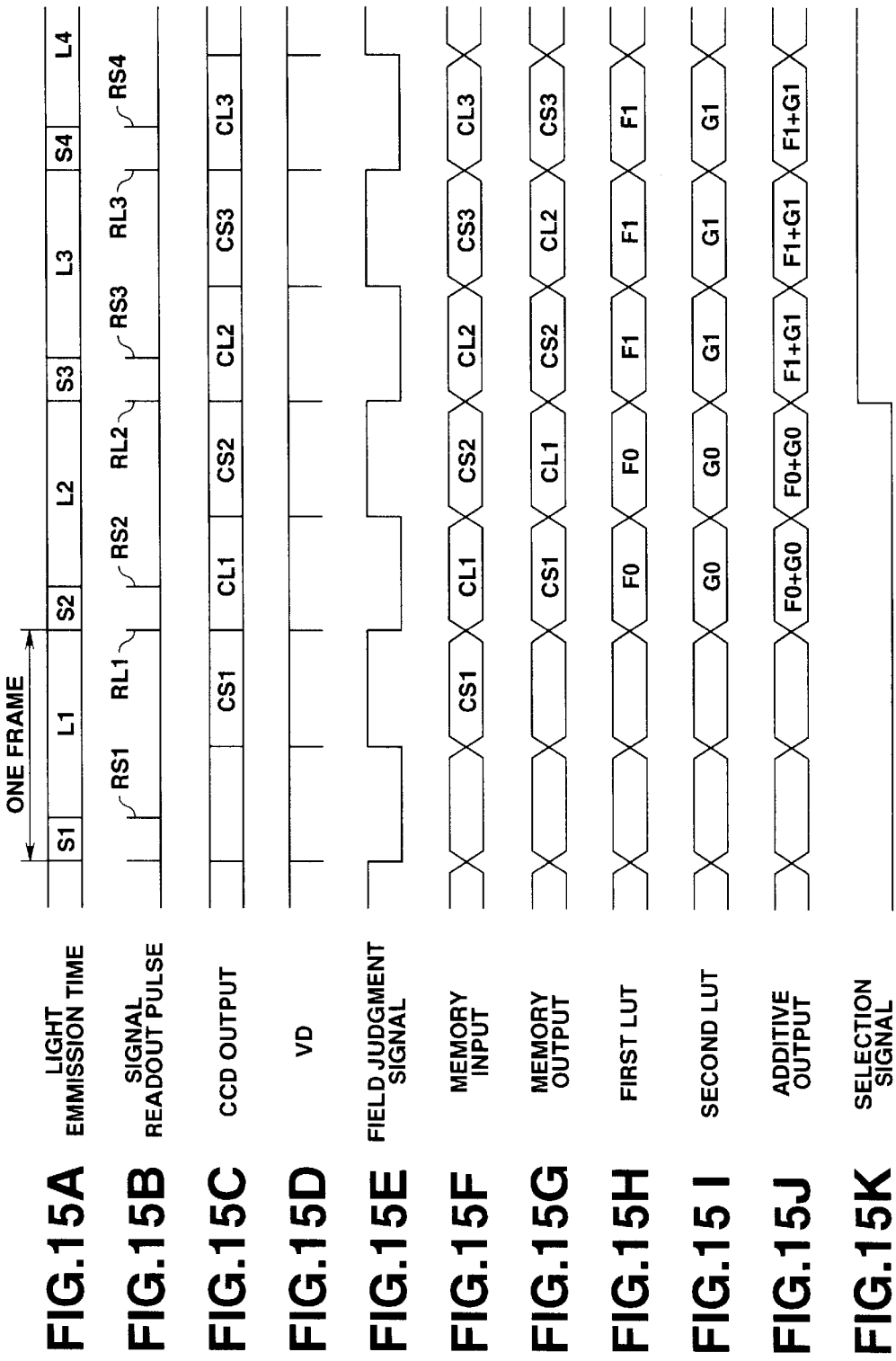

In this embodiment, the first LUT 73A and second LUT 73B store a plurality of synthesis functions used to expand a dynamic range. FIG. 14 shows data of the functions stored in the first LUT 73A and second LUT 73B respectively.

The first LUT 73A and second LUT 73B have addresses each having a length of, for example, 9 bits. Functions F0 and G0 are allocated to lower 8-bit addresses 000 to 0FF, and functions F1 and G1 are allocated to upper 8-bit addresses 100 to 1FF.

A signal passed by the A/D converting circuit 63 or a signal read from the memory 71 is applied to the lower 8-bit address terminals. A selection signal sent from the brightness sensing circuit 64 is applied to the uppermost address terminal. Based on the selection signal, any of a plurality of functions used to expand a dynamic range is selected.

For example, when the selection signal is low or 0, data of the function F0 or G0 is read out. In this case, a resultant signal exhibits the characteristic A shown in FIG. 3. When the selection signal is high or 1, data of the function F1 or G1 is read out. In this case, the resultant signal exhibits the characteristic B shown in FIG. 13.

Next, the actions of this embodiment will be described with reference to the timing charts of FIGS. 15A to 15K.

As shown in FIG. 15A, the CCD driver 60 applies signal readout pulses RSI and RLI shown in FIG. 15B to the CCD 56 at the starts of a short exposure time SI and long exposure time LI (I=1, 2, etc.). Charge of a signal photoelectrically converted by the photoelectric converter of the CCD 56 and then stored is transferred to the transfer device of the CCD 56.

When the signal charge transferred to the transfer device has been produced during the short exposure time SI, the read transferred signal is applied synchronously with a vertical sync signal VD shown in FIG. 15D during one field period. The signal is stored as a CCD output CSI shown in FIG. 15C in the memory 71 as shown in FIG. 15F, and applied to the second LUT 73A via the selector 72A.

When the signal charge transferred to the transfer device has been produced during the long exposure time LI, the read transferred signal is applied synchronously with the vertical sync signal VD immediately succeeding the signal read pulse RL1 during one field period. The signal is stored as a CCD output CLI shown in FIG. 15C in the memory 71 as shown in FIG. 15F, and applied to the second LUT 73B via the selector 73B.

The selectors 72A and 72B are switched with a field judgment signal, which is shown in FIG. 15E, output from the second timing signal generating circuit 59. For example, when the field judgment signal is high, a node a shown in FIG. 12 is selected. The CCD output CSI is input to the first LUT 73A. A signal produced during the previous frame period and stored in the memory 71, that is, a CCD output CLI-1 is input to the second LUT 73B.

Moreover, when the field judgment signal is low, a node b is selected. The CCD output CSI read from the memory 71 is input to the first LUT 73A, and the CCD output CLI is input to the second LUT 73B.

For brevity's sake, outputs of the selectors 72A and 72B are illustrated to be input to the first LUT 73A and second LUT 73B respectively as indicated with solid lines. Alternatively, they may be input to the first LUT 73A and second LUT 73B as indicated with dashed lines in FIG. 12.

In this case, the functions F0 and G0 are F0(SI, LI) and G0(SI, LI), thus expressing the characteristics of image signals produced during the short exposure time SI and long exposure time LI.

When two signals are input to each of the first LUT 73A and second LUT 73B, synthesis can be achieved more finely.

For inputting two signals, since the number of bits is very large, some high-order bits of the signals may be input. In this case, a ROM whose storage capacity is not very large may be used as the first LUT 73 and second LUT 73B.

For example, when the selection signal is, as shown in FIG. 15K, low, the function F0 is selected from the first LUT 73A as shown in FIG. 15H. Moreover, the function G0 is selected from the second LUT 73B as shown in FIG. 15I. In this case, the functions are added up by the adding circuit 74. An additive output H shown in FIG. 15J, that is, a mixed function H is therefore F0+G0. The dynamic range for a signal is expanded so that the signal will exhibit the characteristic A shown in FIG. 13.

When the selection signal is high, the function F1 in the first LUT 73A is selected for use. The function G1 in the second LUT 73B is selected for use. In this case, the functions are added up by the adding circuit 74. The mixed function H becomes F1+G1. The dynamic range for a signal is expanded so that the signal will exhibit the characteristic B shown in FIG. 13.

As mentioned above, when the maximum brightness level of an object is high, or in other words, when the maximum luminance level detected in an image signal is high, the dynamic range for an image signal is expanded so that the signal will be characterized by a signal component indicating a high luminance level. Specifically, the signal component indicating a high luminance level reflects a change in brightness of the object. When the maximum luminance level is low, the dynamic range for a signal is expanded so that the signal will be characterized by a signal component indicating a low luminance level. Specifically, the signal component indicating a low luminance level reflects a change in brightness of the object.

According to this embodiment, the dynamic range for a signal can be expanded so that the signal will exhibit a characteristic suitable for an actual use environment (or imaging environment).

Figure 16:
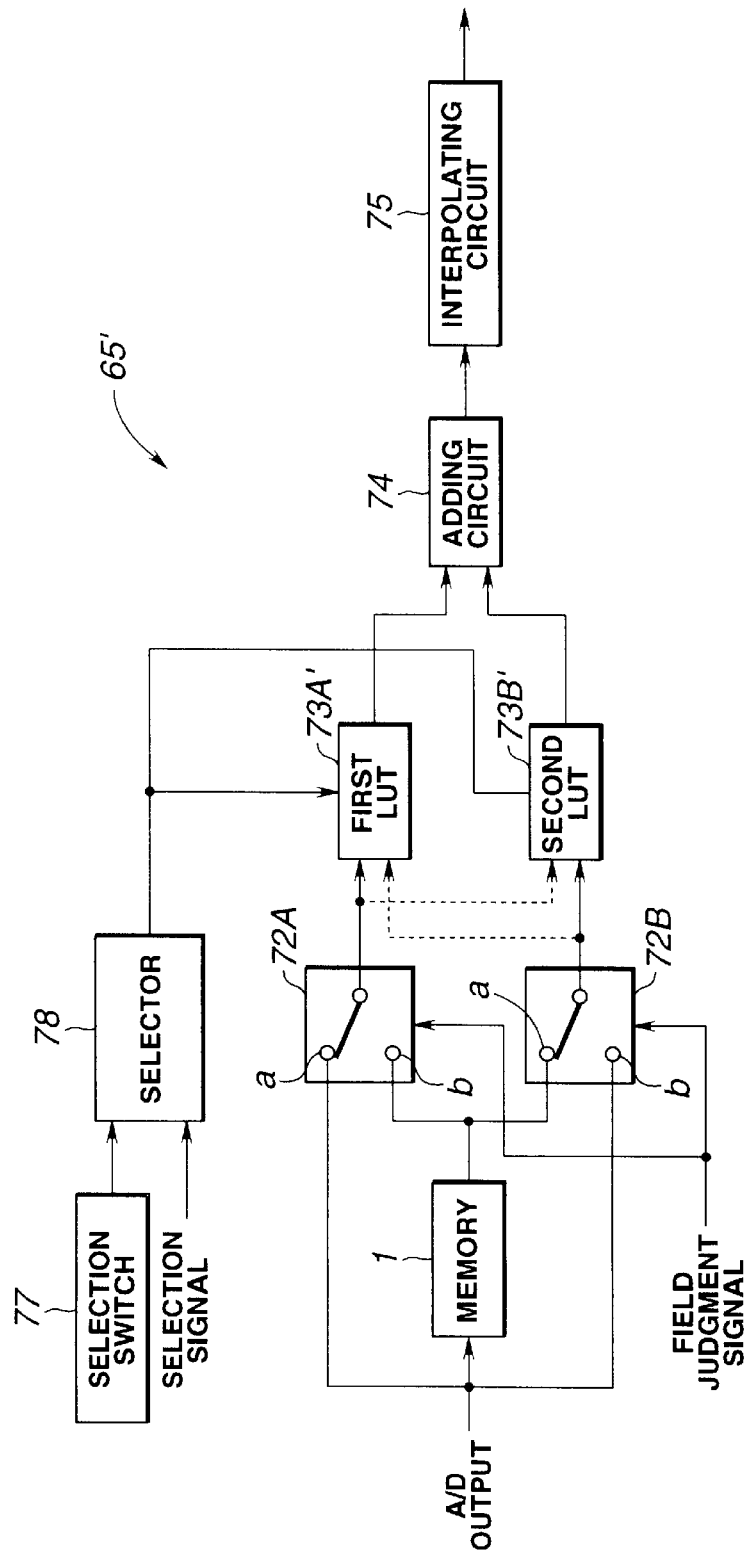

FIG. 16 shows a configuration of a dynamic range expanding circuit 65' in a variant of the third embodiment.

According to this variant, a selection signal and selection instruction signal are input to the first LUT 73A and second LUT 73B, which are included in the dynamic range expanding circuit 65 shown in FIG. 12, via a selector 78. Herein, the selection signal is sent from the brightness sensing circuit 64 and the selection instruction signal is sent from a selection switch 77 handled manually by a user.

The selector 78 can be handled manually. The selector 78 may be set to a state in which the selection signal sent from the brightness sensing circuit 64 is selected. Alternatively, the selector 78 may be set to a state in which the selection instruction signal sent from the selection switch 77 that can be handled by a user is selected.

In this variant, a first LUT 73A' and second LUT 73B' contain numerous functions F0, F1, F2, etc. and G0, G1, G2, etc. An actually used function is selected from among the numerous functions F0, F1, F2, etc., and G0, G1, G2, etc.

Figure 17:
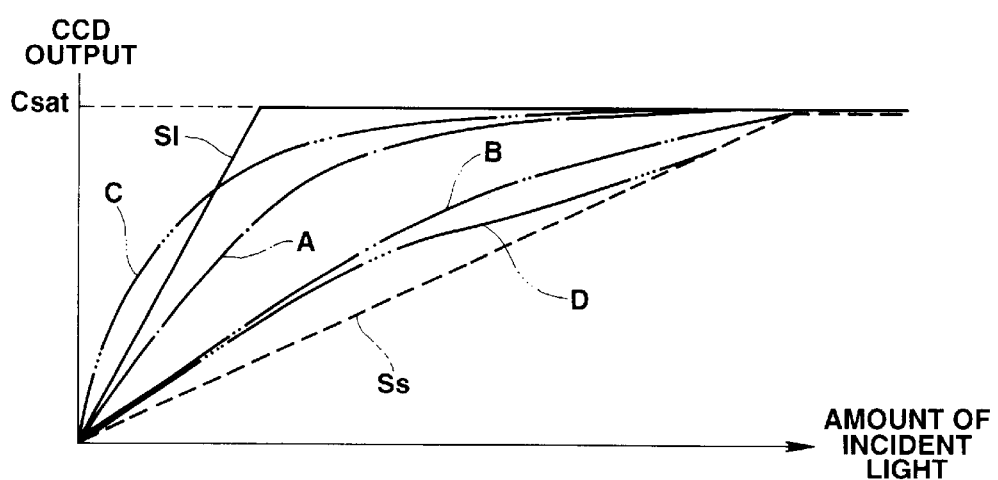

By selecting any of the functions, the dynamic range for a signal can be expanded so that the signal will exhibit any of the different characteristics A, B, C, and D shown in FIG. 17.

In this variant, three or more functions (or three or more sets of functions) can be selected. The selection signal is therefore a digital signal of two or more bits long. In this case, the brightness sensing circuit 64 detects a maximum luminance level and minimum luminance level in an image signal produced at a high shutter speed. The selection signal to be produced indicates whether the maximum luminance level and minimum luminance level are equal to or higher than reference values.

A function is selected as described below. For example, when the maximum luminance level is high, the dynamic range for a signal will be expanded by putting emphasis on a signal component indicating a high luminance level. When the maximum luminance level is low, the dynamic range for a signal will be expanded by putting emphasis on a signal component indicating a low luminance level. When the minimum luminance level is high, the signal component indicating a low luminance level will be suppressed. On the contrary, when the minimum luminance level is low, the dynamic range for a signal will be expanded so that a signal component indicating a low luminance level will not be suppressed.

To be more specific, assume that the maximum luminance level detected in a signal is high and the minimum luminance level detected therein is low. In this case, the dynamic range for the signal is expanded by putting emphasis on signal components indicating high and low luminance levels. In other words, the dynamic range for the signal is expanded so that the signal will exhibit the characteristic D shown in FIG. 17. Namely, a signal component indicting an intermediate luminance level will be suppressed and the signal components indicating high and low luminance levels will be emphasized.

Moreover, assume that the maximum luminance level detected in a signal is low and the minimum luminance level detected therein is low. In this case, the dynamic range for the signal is expanded so that a signal component indicating a high luminance level will be suppressed and a signal component indicating a low luminance level will be emphasized. In other words, the dynamic range for the signal is expanded so that the signal will exhibit the characteristic A shown in FIG. 17. Namely, the signal component indicating a high luminance level will be suppressed and the signal component indicating a low luminance level will be emphasized.

The other components are identical to those of the first embodiment. According to this variant, the dynamic range for a signal can be expanded using a mixed function suitable for a brightness level of an object sensed by the brightness sensing circuit 64.

Moreover, a user can expand the dynamic range for a signal so that the signal will exhibit a characteristic different from a characteristic selected by sensing a brightness level. That is to say, a signal component extracted from a different viewpoint will be able to be emphasized.

For example, assume that a change in luminance in a normal image must be observed by putting emphasis on, especially, a dark portion. In this case, the characteristic function C shown in FIG. 17 is selected. Consequently, the dynamic range for a signal is expanded so that a change in luminance indicated by a signal component indicating a low luminance level will be reflected and a signal component indicating a high luminance level will be suppressed.

Fourth Embodiment

Next, the fourth embodiment of the present invention will be described with reference to FIGS. 18 to 22.

Figure 18:
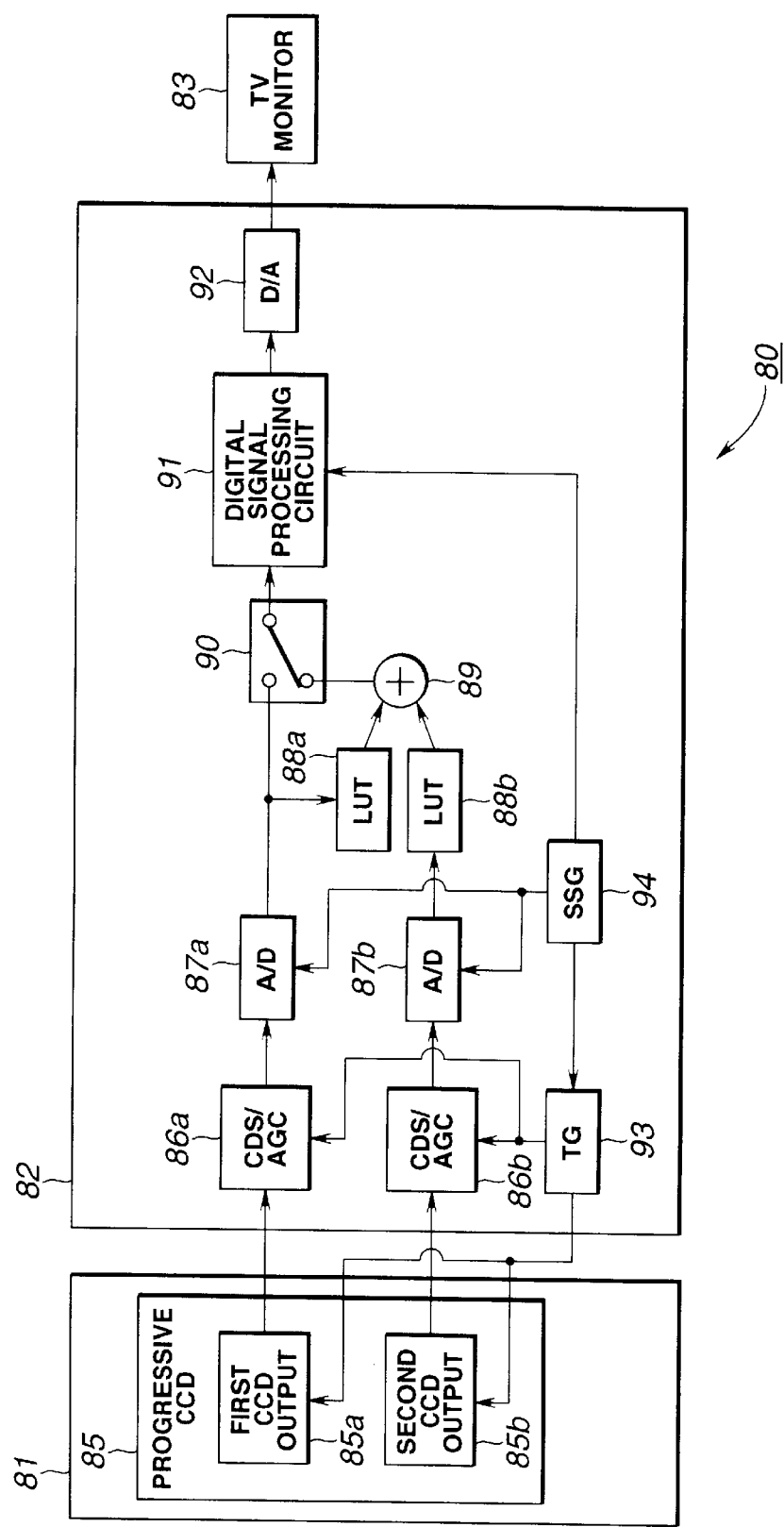
FIGS. 18 to 22 relate to the fourth embodiment of the present invention.

An imaging apparatus 80 shown in FIG. 18 consists of a camera head 81, a camera control unit (hereinafter, CCU) 82, and a TV monitor 83. Specifically, the CCU 82 controls the camera head 81 and processes an output of the camera head. The TV monitor 83 is an interlacing type display for displaying an image whose data has been processed by the CCU 82. The camera head 81 is mounted on an eyepiece unit of, for example, a rigid endoscope.

The camera head 81 includes a CCD 85 that is a progressive scanning type imaging device (hereinafter, progressive CCD). The progressive CCD 85 photoelectrically converts an object image formed on the image plane of an image formation lens that is not shown, and outputting an analog image signal. The progressive CCD 85 has two output systems; that is, a first output system for providing a first CCD output 85a and a second output system for providing a second CCD output 85b.

An output of the camera head 81, that is, the first CCD output 85a and second CCD output 85b are routed to the CCU 82 over signal cables that are not shown.

The CCU 82 includes CDS/AGC circuits 86a and 86b, A/D converting circuits 87a and 87b, LUTs 88a and 88b, an adder 89, a switching means 90, a digital signal processing (DSP) circuit 91, a D/A converting circuit 92, a timing generator (TG) 93, and a sync signal generating circuit (SSG) 94. Specifically, the CDS/AGC circuits 86a and 86b amplify the first CCD output 85a and second CCD output 85 (control gains autonomously), and carry out correlative double sampling and others. The A/D converting circuits 87a and 87b convert outputs of the CDS/AGC circuits 86a and 86b into digital signals. The LUT 88a and 88b are referenced in order to convert data nonlinearly according to the outputs of the A/D converting circuits 87a and 87b, and output resultant data. The adder 89 adds up outputs of the LUTs 88a and 88b. The switching means 90 selects an output of the adder 89 in a wide dynamic range mode. In a normal mode, the switching means 90 selects an output of the A/D converting circuit 87a. The DSP circuit 91 digitally processes an output of the switching means 90. The D/A converting circuit 92 converts a digitized signal into an analog signal. The TG 93 supplies a driving pulsating signal to the progressive CCD 85 and CDS/AGC circuits 86a and 86b. The SSG 94 supplies a reference signal to the TG 93, A/D converting circuits 87a and 87b, and DSP 91.

The LUTs 88a and 88b and the adder 89 constitute a dynamic range expanding means.

An output of the D/A converting circuit 92 is output to the TV monitor 83 connected over a signal cable that is not shown. An operator handles the rigid endoscope in various manners while viewing the TV monitor 83.

Figure 19:
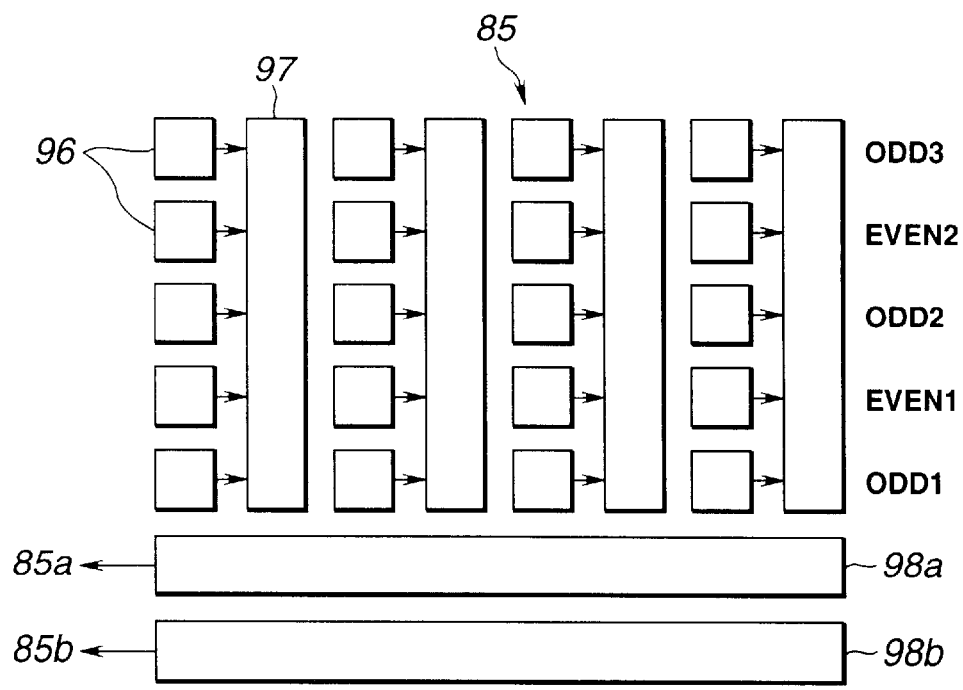

Next, a configuration of the progressive CCD 85 will be described with reference to FIG. 19. For brevity's sake, only a small number of pixels are shown in FIG. 19. In reality, the progressive CCD includes a larger number of pixel locations.

The progressive CCD 85 consists of a plurality of photodiodes 96, vertical shift registers 97, and two systems of horizontal shift registers 98a and 98b. Specifically, the plurality of photodiodes 96 is arranged two-dimensionally. The vertical shift registers 97 transfer charges accumulated in the photodiodes 96 in a vertical direction. The two systems of horizontal shift registers 98a and 98b transfer charges, which are sent from the vertical shift registers 97, in a horizontal direction. Outputs of the horizontal shift registers 98a and 98b are the first CCD output 85a and second CCD output 85b.

Readout by the progressive CCD 85 will be described with reference to FIGS. 19, 20, and 21.

To begin with, readout in a wide dynamic range mode will be described.

Charge is accumulated in the photodiodes 96. At this time, control is given so that a charge accumulation time will be different between odd lines ODD1, ODD2, ODD3, etc. and even lines EVEN1, EVEN2, etc. In other words, for example, a high shutter speed of $1/240$ sec is set as the charge accumulation time for the odd lines. A low shutter speed of $1/60$ sec (=$4/240$ sec) is set as the charge accumulation time for the even lines. Charge is swept away from the odd lines during $3/240$ sec within the charge accumulation time $1/60$ sec within which charge is accumulated on the even lines. Charge is accumulated on the odd lines during the remaining $1/240$ sec.

The charges thus accumulated in the photodiodes 96 are transferred all together to the vertical shift registers 97. Thereafter, the vertical shift registers 97 shift charges constituting two lines in the vertical direction. Consequently, the charges on the even line EVEN1 are transferred to the horizontal shift register 98b. The charges on the odd line ODD1 are transferred to the second horizontal shift register 98b. This causes the horizontal shift registers 98a and 98b to quickly shift data items constituting one line in the horizontal direction.

Thereafter, the vertical shift registers 97 shift charges constituting two lines in the vertical direction. The charges on the even line EVEN2 are then transferred to the first horizontal shift register 98a. The charges on the odd line ODD2 are transferred to the second horizontal shift register 98b. Similarly, the horizontal shift registers 98a and 98b shift charges in the horizontal direction. These operations are repeated.

When the charges in all the photodiodes 96 have been transferred, charge transfer for one field is completed. For this field, the first horizontal shift register 98a outputs an image signal produced at the low shutter speed to represent the even lines. The second horizontal shift register 98b outputs an image signal produced at the high shutter speed to represent the odd lines. Whether the field is regarded as an even field or odd field can be determined appropriately. Since the output of the first shift register 98a represents the even lines, the field shall be regarded as an even field.

Thereafter, for reading data that renders an odd field, a combination of lines from which charges are transferred to the horizontal shift registers 98a and 98b is changed.

First, charge is accumulated during a time that is different between the odd lines and even lines. At this time, the shutter speeds at which the odd lines and even lines are formed are opposite to those for rendering the even field. For example, the odd lines are formed at the low shutter speed of 1/60 sec and the even lines are formed at the high shutter speed of 1/240 sec.

Charges thus accumulated in the photodiodes 96 are transferred simultaneously to the vertical shift registers 97. Thereafter, the vertical shift registers 97 shift charges constituting one line in the vertical direction. Charges constituting the odd line ODD1 are then transferred to the first horizontal shift register 98a. The first horizontal shift register 98a shifts the charges in the horizontal direction quickly.

Thereafter, the vertical shift registers 97 transfer charges constituting two lines in the vertical direction. Charges constituting the odd line ODD2 are therefore transferred to the first horizontal shift register 98a. Charges constituting the even line EVEN1 are transferred to the second horizontal shift register 98b. The horizontal shift registers 98a and 98b each quickly transfer data items constituting one line in the horizontal direction. Thereafter, the vertical shift registers 97 transfer charges constituting two lines successively. The horizontal shift registers 98a and 98b output the charges in due course.

When the charges in all the photodiodes 96 have been transferred, transfer of charges for rendering the odd field is completed. For the odd field, an image signal produced at the low shutter speed to represent the odd lines is output from the first horizontal shift register 98a. An image signal produced at the high shutter speed to represent the even lines is output from the second horizontal shift register 98b.

The output of the first horizontal shift register 98a that is an image signal produced at the low shutter speed is the first CCD output 85a. The output of the second horizontal shift register 98b that is an image signal produced at the high shutter speed is the second CCD output 85b.

Figure 20:
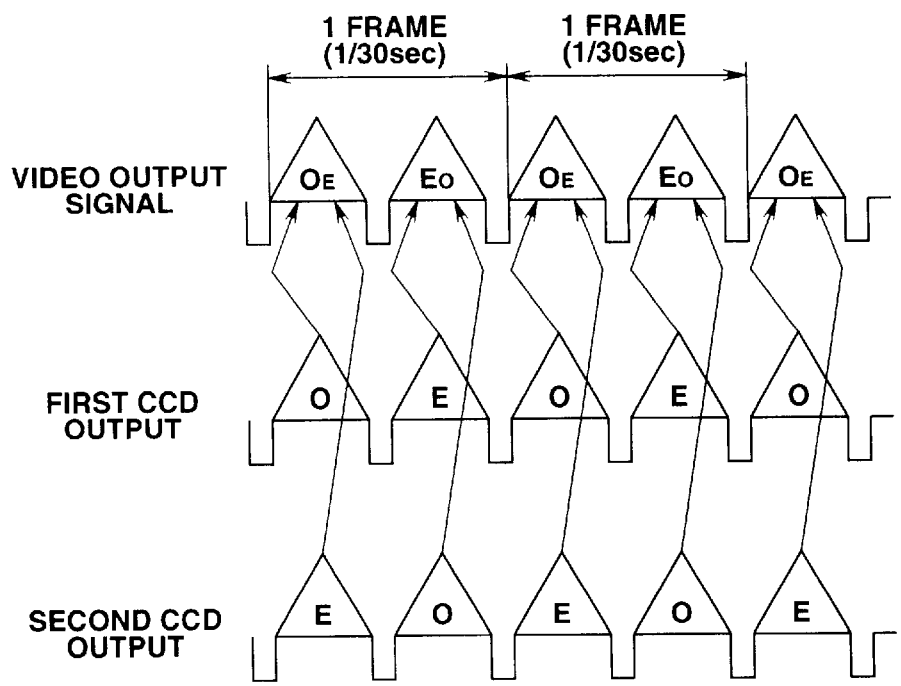

As shown in FIG. 20, during an odd field period within one frame period of 1/30 sec, the data representing the odd lines (ODD) is output as the first CCD output 85a. The data representing the even lines (EVEN) is also output as the second CCD output 85b. During a subsequent even field period, the data representing the even lines (EVEN) is output as the first CCD output 85a, and the data representing the odd lines (ODD) is output as the second CCD output 85b. Large dynamic range processing to be performed based on the data items will be described later.

Next, readout in the normal mode will be described.

In the normal mode, the charge accumulation time during which charge is accumulated in the photodiodes 96 is the same between the even lines and odd lines.

Charges thus accumulated are transferred simultaneously from the photodiodes 96 to the vertical shift registers 97. Thereafter, the vertical shift registers 97 shift charges constituting one line in the vertical direction. Charges constituting the odd line ODD1 are therefore transferred to the first horizontal shift register 98a. Thereafter, the vertical shift registers 97 shift charges constituting one line in the vertical direction. At this time, the potential at the second horizontal shift register 98b is, for example, high to prevent the charges from being transferred to the second horizontal shift register 98b. The data representing the odd line ODD1 and the data representing the even line EVEN1 are added up in the first horizontal shift register 98a. The horizontal shift register 98a then quickly shifts the resultant data in the horizontal direction.

Likewise, the vertical shift registers 97 shift charges constituting two lines in the vertical direction. The data representing the odd line ODD2 and the data representing the even line EVEN2 are added up in the horizontal shift register 98a. The similar operations are then repeated.

For reading data that renders a subsequent field, a combination of lines whose data items are to be added up is changed.

Specifically, as mentioned above, charge is accumulated during a time that is the same between the odd lines and even lines. Charges accumulated in the photodiodes 96 are then transferred simultaneously to the vertical shift registers 97. Thereafter, the vertical shift registers 97 transfer charges constituting one line (data of the odd line ODD1) in the vertical direction. The first horizontal shift register 98a quickly shifts the charges in the horizontal direction.

Thereafter, the vertical shift registers 97 shift charges constituting two lines in the vertical direction. The data of the even line EVEN1 and the data of the odd line ODD2 are added up in the horizontal shift register 98a. The horizontal shift register 98a then shifts the resultant data in the horizontal direction and thus outputs it. The addition and output will be carried out in the same manner thereafter.

Figure 21:
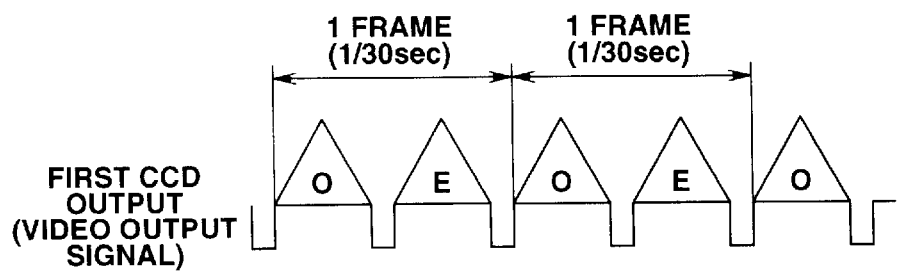

As mentioned above, the foregoing data items rendering two fields are, as shown in FIG. 21, output successively as odd-field (ODD) data and even-field (EVEN) data from the first CCD output unit 85a.

Now, how image data output from the progressive CCD is processed by the CCU 82 will be described below.

To begin with, processing in the wide dynamic range mode will be described. In this mode, the switching means 90 is changed over to the adder 89.

The first CCD output 85a and second CCD output 85b are amplified by the CDS/AGC circuits 86a and 86b respectively. Correlative double sampling and others are carried out. Outputs of the CDS/AGC circuits 86a and 86b are converted into digital signals by the A/D converting circuits 87a and 87b. The outputs are then converted by referencing the LUTs 88a and 88b. The converted outputs are then added up by the adder 89 on the succeeding stage, and then converted into given data items as outputs having undergone wide dynamic range processing.

The wide dynamic range processing will be described with reference to FIG. 22.

Figure 22:
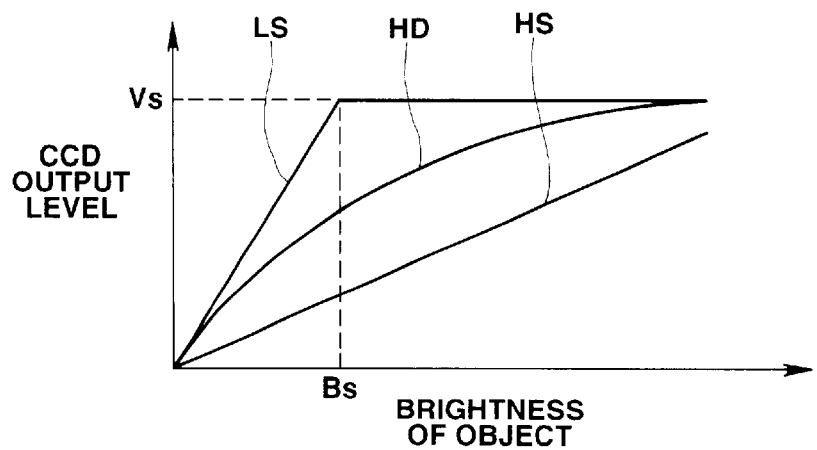

FIG. 22 shows relationships between the brightness level of an object and the levels of image signals produced at different shutter speeds (charge accumulation times).

When an object is imaged at a low shutter speed (LS), it means that a charge accumulation time is long. A dark portion of the object can be imaged more accurately. However, a portion of the object whose brightness level is so high as to exceed Bs in FIG. 22 cannot be imaged properly. This is because a corresponding signal component output from an imaging device has a saturation value as a level Vs.

On the other hand, when an object is imaged at a high shutter speed (HS), an amount of light accumulated in the photodiodes 96 in the progressive CCD 85 is reduced. The CCD output is therefore plotted as a straight line HS, which is inclined smoothly, in FIG. 22. Even when an object whose brightness level exceeds Bs is imaged, a produced image signal will not have the saturation value.

Thus, when an object is imaged at a low shutter speed, a portion of the object whose brightness level may be so high that the CCD is saturated. In this case, the corresponding portion of the object image is compensated using an image produced at a high shutter speed. This results in an image in which a dark portion of the object is not seen blackened and the high-brightness level portion is not seen streakily whitened. In other words, a picture signal (whose data is plotted as a curve HD in FIG. 22) proving a wide dynamic range can be produced.

Assume that the data of the first CCD output 85a produced at the low shutter speed is x and the data of the second CCD output 85b produced at the high shutter speed is y. Data processed to expand a dynamic range, z, is expressed by the following equation 1:

$$z = f(x, y) + g(x, y)$$

where functions f and g are defined in consideration of the output characteristic of the progressive CCD 85.

The dynamic range expansion processing is generally nonlinear processing. If an arithmetic operation were carried out at every imaging, the load of the arithmetic operation would increase and the processing time would extend.

Data to be involved in the arithmetic operation of the above equation is therefore stored in advance in tables, that is, the LUTs 88a and 88b. In practice, the LUTs are referenced to draw out a result.

Odd (even) line data and even (odd) line data, which render the same field, are converted into relevant data items by referencing the LUTs 88a and 88b. Herein, the odd line data is the first CCD output 85a produced at the low shutter speed, and the even line data is the second CCD output 85b produced at the high shutter speed. The data items are added up by the adder 89. Thus, a dynamic range is optimized.

A video output signal processed to optimize a dynamic range is plotted as shown in the uppermost row in FIG. 20. OE denotes data rendering an odd field, wherein data representing even lines is added to the data. EO denotes data rendering an even field, wherein data representing odd lines is added to the data.

As illustrated, data processed to optimize a dynamic range is an ordinary interlacing video output signal. A signal output via the DSP 91 and D/A converting circuit 92 can therefore be output to the ordinary TV monitor 83 as it is.

Next, the normal mode will be described. In this mode, the switching means 90 is changed over to the A/D converting circuit 87a.

As mentioned above, in the normal mode, the interlacing signal shown in FIG. 21 is produced based on the first CCD output 85a alone. The signal is output to the ordinary TV monitor 83 via the CDS/AGC circuit 86a, A/D converting circuit 87a, switching means 90, DSP 91, and D/A converting circuit 92 as it is.

According to this embodiment, a progressive CCD is employed. A first CCD output and second CCD output produced at different shutter speeds are processed nonlinearly and added up. Thus, data processed to realize a wide dynamic range can be produce during one field period (1/60 sec). A vertical resolution will therefore not deteriorate.

Moreover, the same progressive CCD may be read in different modes. A video output signal for a wide dynamic range mode or a video output signal for a normal mode can be produced merely by switching a switch.

Furthermore, a video output signal produced by realizing a wide dynamic range is conformable to the interlacing. A TV monitor can be used for display in common between the wide dynamic range mode and normal mode advantageously obviating the necessity of preparing any special monitor.

The present invention is not limited to the mode presented by this embodiment. Needless to say, various variations and applications can be constructed without a departure from the gist of the embodiment.

As described so far, according to this embodiment, an imaging apparatus whose vertical resolution will not be deteriorated can be realized.

Fifth Embodiment

Next, the fifth embodiment of the present invention will be described with reference to FIGS. 23 to 25. As shown in FIG. 23, an endoscopic imaging apparatus 101 of this embodiment consists of a camera head 102, a scope 103, a light source unit 104, a CCU 105, and a TV monitor 106. Specifically, the camera head 102 has an imaging means incorporated therein. The scope 103 is connected to the camera head 102. The light source unit 104 supplies illumination light to the scope 103. The CCU 105 processes a signal sent from the imaging means incorporated in the camera head 102. The TV monitor 106 displays an image according to a standard video signal processed by the CCU 105.

An objective 110 is located at the tip of the scope 103. A single system of relay lenses 111 extending from the back of the objective 110 to the camera head 102 is incorporated in the scope 103. An object image formed by the objective 110 is propagated by the system of relay lenses 111 and input to the imaging means in the camera head 102. Moreover, an illumination light guide 107 used to illuminate an object with illumination light is running through the scope 103.

When the endoscopic imaging apparatus 101 is in use, the light guide 107 running through the scope 103 is, as shown in FIG. 23, coupled to the light source unit 104. Illumination light emanating from a lamp 104 in the light source unit 104 then passes through an aperture stop 104b. The illumination light is then converged by a lens 104c, and routed to the end surface of the light guide 107 opposed to the lens 104c.

The illumination light is propagated to the scope 103 by way of the light guide 107, passed through the scope 103, and emitted forward through the distal side of the scope 103. An object such as a patient's body cavity is thus illuminated. Light reflected from the illuminated object is converged by the scope 103. An object image is then propagated by the objective 110 and system of relay lenses 111 in the scope 103, and projected by the imaging means in the camera head 102.

In the camera head 102, a pupil divider 112 is located behind the sole system of relay lenses 111. The object image propagated by the system of relay lenses 111 is divided into a plurality of images, or in this embodiment, two images. An image formation optical system 113 is located behind the pupil divider 112, thus facing two images provided by the pupil divider 112. First and second solid-state imaging devices 114 and 115 to be opposed to the two images are located behind the image formation optical system 113.

In this embodiment, a CCD is adopted as the solid-state imaging device. The first and second solid-state imaging devices 114 and 115 will therefore be referred to as the first and second CCDs 114 and 115. Object images produced by bisecting the object image by means of the pupil divider 112 are formed on the image planes of the first CCD 114 and second CCD 115 respectively. The object images are then photoelectrically converted.

CCD driving signals for driving the first CCD 114 and second CCD 115 are transmitted over two systems of CCD driving signal transmission lines. CCD output signals output from the CCDs are transmitted over two systems of CCD output signal transmission lines. The transmission lines are contained in a camera cable 108, and coupled to the CCU 105 via a camera connector 109. The output signals of the CCDs 114 and 115 are sent to the CCU 105 and subjected to various kinds of signal processing. A video signal output from the CCU 105 is sent to the TV monitor 106. A view image of an object is then displayed on the TV monitor 106.

In the CCU 105, a first CCD drive circuit 121 and second CCD drive circuit 129 are incorporated as circuits for driving the first CCD 114 and second CCD 115 respectively. The CCD drive circuits 121 and 129 supply CCD driving signals to the CCDs 114 and 115 respectively over the CCD driving signal transmission lines in the camera cable 108. Charges of signals accumulated in the CCDs 114 and 115 are then read out.

Moreover, two signal processing systems are installed in the CCU 105 in order to handle the output signals of the first CCD 114 and second CCD 115 respectively. To begin with, a processing system for handling the output signal of the first CCD 114 will be described.

A preamplifier 124 is installed on an initial stage of the CCU 105. The transmission line over which the output signal of the first CCD 114 is transmitted is coupled to the preamplifier 124. A CCD output signal read from the CCD 114 is transmitted to the CCU 105 over the CCD output transmission line in the camera cable 108. A loss occurring during cable transmission is amplified by the preamplifier 124, whereby given processing is carried out.

On the stage succeeding the preamplifier 124, a CDS circuit and sample-and-hold circuit that are not shown are installed. The CCD output signal amplified by the preamplifier 124 is pre-processed by the CDS (correlative double sampling) circuit and sample-and-hole circuit.

On the stage succeeding these circuits, there are an A/D converting circuit 125 and digital signal processing circuit (DSP) 126. After the CCD output signal undergoes the above given pre-processing, it is input to the A/D converting circuit 125 and then converted into a digital signal. Given digital signal processing is then performed on the digital signal by the digital signal processing circuit 126.

The digital signal processing circuit 126 has the capabilities of a color separating circuit, white balance circuit, and automatic gain control circuit. Herein, the color separating circuit separates three color signal components of red, green, and blue signals from a digitized signal. The white balance circuit adjusts a white balance detected in each of the color digital signals provided by the color separating circuit. The automatic gain control circuit controls a gain to be given to a digital signal that has a white balance thereof adjusted by the white balance circuit. The digital signal processing circuit 126 carries out given digital signal processing.

Moreover, on the stage succeeding the digital signal processing circuit 126, there is a knee and gamma circuit 127 for treating a knee detected by plotting each of the processed digital signals and for correcting a gamma indicated by each thereof. The knee and gamma circuit 127 is succeeded by a first arithmetic circuit 128. The first arithmetic circuit 128 expands dynamic ranges for the red, green, and blue digital signals each of which has been processed to treat a knee and correct a gamma by means of the knee and gamma circuit 127. The first arithmetic circuit 128 then enhances the resultant red, green, and blue digital signals.

On the other hand, a waveform detecting circuit 123 for determining a shutter speed for the first CCD 114 under the control of the digital signal processing circuit 126 is connected to the digital signal processing circuit 126. A timing generator (TG in the drawing) 122 is connected to the waveform detecting circuit 123. The first CCD drive circuit 121 and second CCD drive circuit 129 for driving the first CCD 114 and second CCD 115 respectively are connected to the timing generator 122.

The waveform detecting circuit 123 is connected to a digital signal processing circuit 132 that will be described later, and therefore controlled by the digital signal processing circuit 132.

The waveform detecting circuit 123 detects the waveforms of digital signals produced by the digital signal processing circuits 126 and 132, and thus determines the shutter speeds to be set for the first CCD 114 and second CCD 115. The timing generator 122 generates driving signals for use in driving the first CCD 114 and second CCD 115 according to an output signal of the waveform detecting circuit 123.

Moreover, the first CCD drive circuit 121 and second CCD drive circuit 129 transmit CCD driving signals used to drive the first CCD 114 and second CCD 115 in response to a driving signal sent from the timing generator 122. At this time, the first CCD drive circuit 121 and second CCD drive circuit 129 drive the first CCD 114 and second CCD 115 so that the first and second CCDs will image an object at mutually different shutter speeds. Specifically, the first CCD 114 is driven to image an object at a relatively low shutter speed, while the second CCD 115 is driven to image the object at a relatively high shutter speed. The driving control will be described later.

The CCU 105 has a preamplifier 130, an A/D converting circuit 131, a digital signal processing circuit 132, a knee and gamma circuit 133, and a second arithmetic circuit 134. These circuits fill the same roles as the preamplifier 124, A/D converting circuit 125, digital signal processing circuit 126, knee and gamma circuit 127, and first arithmetic circuit 128. This processing system inputs an output signal of the second CCD 115 and carries out the same processing as that mentioned above.

Moreover, the first arithmetic circuit 128 and second arithmetic circuit 134 are succeeded by an adder 135, a D/A converting circuit that is not shown, and a post-processing circuit 136.

The first arithmetic circuit 128 and second arithmetic circuit 134 perform given processing on image signals that are produced at mutually different shutter speeds by the first CCD 114 and second CCD 115 respectively. The given processing will be detailed later.

Output signals of the first arithmetic circuit 128 and second arithmetic circuit 134 are added up to be thus synthesized by the adder 135. A resultant signal is converted into an analog signal by the D/A converting circuit, and then input to the post-processing circuit 136. The post-processing circuit 136 converts the resultant signal into a standard video signal. The video signal is then output to the TV monitor 106.

Next, the operations of the endoscopic imaging apparatus 101 of this embodiment having the foregoing components will be described.

In this embodiment, an object image is propagated through the scope 103 by the system of relay lenses 111 that is a sole optical system. The object image is then bisected by the pupil divider 112 in the camera head 102. Based on a driving signal generated by the timing generator 122, the first CCD 114 and second CCD 115 project the two equal object images provided by the pupil divider 112 at mutually different shutter speeds. At this time, the shutter speeds are determined by the waveform detecting circuit 123 under the control of the digital signal processing circuit 126 and digital signal processing circuit 132. Namely, the first CCD 114 projects the image at a relatively low shutter speed, while the second CCD 115 projects the image at a relatively high shutter speed.

More particularly, the first CCD 114 is driven to project the object image at a relatively low shutter speed of, for example, 1/60 sec (first exposure time). The second CCD 115 is driven to project the object image at a relatively high shutter speed of 1/240 sec (second exposure time).

As mentioned above, the first CCD 114 and second CCD 115 project the two equal object images provided by the pupil divider 112 at mutually different shutter speeds. The first CCD 114 and second CCD 115 then transmit corresponding photoelectrically-converted signals to the preamplifiers 124 and 130. CCD output signals amplified by the preamplifiers 124 and 130 are subjected to given processing by means of the aforesaid two systems of circuits. The first arithmetic circuit 128 and second arithmetic circuit 135 apply given weights to image signals produced by the first CCD 114 and second CCD 115 respectively.

The image signals produced by the first CCD 114 and second CCD 115 are thus processed properly by the first arithmetic circuit 128 and second arithmetic circuit 135. Thereafter, the image signals are added up by the adding circuit 135, and then output to the succeeding stage.

Weighting of the image signals by the first arithmetic circuit 128 and second arithmetic circuit 134, and synthesizing thereof by the adding circuit 135 will be described with reference to FIGS. 24 and 25.

FIG. 24 is a timing chart showing the relationships among a vertical sync signal, image signals, and a synthetic picture signal. Herein, the vertical sync signal is output from the timing generator 122. The image signals are actually produced by the first CCD 114 (driven at a low shutter speed) and second CCD 115 (driven at a high shutter speed). The synthetic picture signal is produced by the adding circuit 135. FIG. 25 graphically shows the output levels of image signals and the output level of a synthetic picture signal in relation to an amount of incident light. Herein, the image signals have been output from the first CCD 114 (driven at the low shutter speed) and second CCD 115 (driven at the high shutter speed), and weighted with different weights. The synthetic picture signal is produced by the adding circuit 135.

As shown in FIG. 24, the image signal produced by the first CCD 114 during a first exposure time equivalent to the low shutter speed (1/60 sec) shall be x. Moreover, the image signal produced by the second CCD 115 during a second exposure time equivalent to the high shutter speed (1/240 sec) shall be u. The synthetic picture signal produced by the adding circuit 135 shall be M.

In this embodiment, the image signal produced by the first CCD 114 is weighted by $\cos^2(px)$ by means of the first arithmetic circuit 128. In other words, when a luminance level is low, the image signal produced by the first CCD 114 during the first exposure time (1/60 sec) is weighted. Incidentally, p denotes a correction coefficient. Assuming that a brightness level at which the image signal produced by the second CCD 115 during the second exposure time (1/240 sec) has a saturation value is s, the correction coefficient p is approximately $p \approx (s \cdot \pi/2)$. For example, $p = \pi/8$.

Moreover, the second arithmetic circuit 134 applies a weight of $\sin^2(px)$ to the image signal produced by the second CCD 115. In other words, when a luminance level is high, the image signal produced during the second exposure time (1/240 sec) by the second CCD 115 is weighted.

On the other hand, the adding circuit 135 adds up the image signals produced by the first CCD 114 and second CCD 115 and processed as mentioned above by the first arithmetic circuit 128 and second arithmetic circuit 134. A thus produced synthetic picture signal M is expressed as follows:

$$M = x \cos^2(px) + u \sin^2(px)$$

Figure 25:
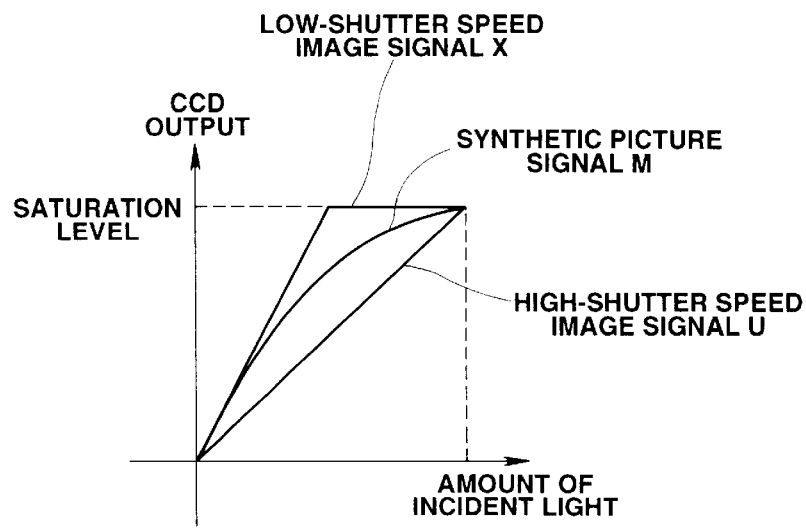

The synthetic picture signal M exhibits the characteristic graphically shown in FIG. 25. Thus, a dynamic range can be expanded without any deterioration of a signal-to-noise ratio of a signal component indicating a low luminance level.

Moreover, the correction coefficient p should merely be set properly relative to x. The synthetic picture signal M varies as a function that increases monotonously within a range of brightness levels up to a brightness level at which the signal produced during the second exposure time has the saturation value. Consequently, a constructed image appears uniform but gives no sense of incongruity.

In this embodiment, the correction coefficient p is approximately $\pi/8$. Alternatively, the correction coefficient p may be set to any value according to the characteristics of the first CCD 114 and second CCD 115. In this case, the synthetic picture signal M varies with x as a function that increases monotonously.

Moreover, the synthetic picture signal M need not vary as the above function, that is:

$$x \cos^2(px) + u \sin^2(px)$$

Alternatively, the synthetic picture signal M may vary as a function that has a value dominated by a signal, which is produced at the low shutter speed, relative to a low luminance level, and that has a value dominated by the signal, which is produced at the high shutter speed, relative to a high luminance level.

As described above, according to this embodiment, there is provided an endoscopic imaging apparatus that offers an expandable dynamic range for an image signal without any deterioration of a signal-to-noise ratio of a signal component indicating a low luminance level. Moreover, the endoscopic imaging apparatus can construct a smooth image giving no sense of incongruity.

Sixth Embodiment

Figure 26:
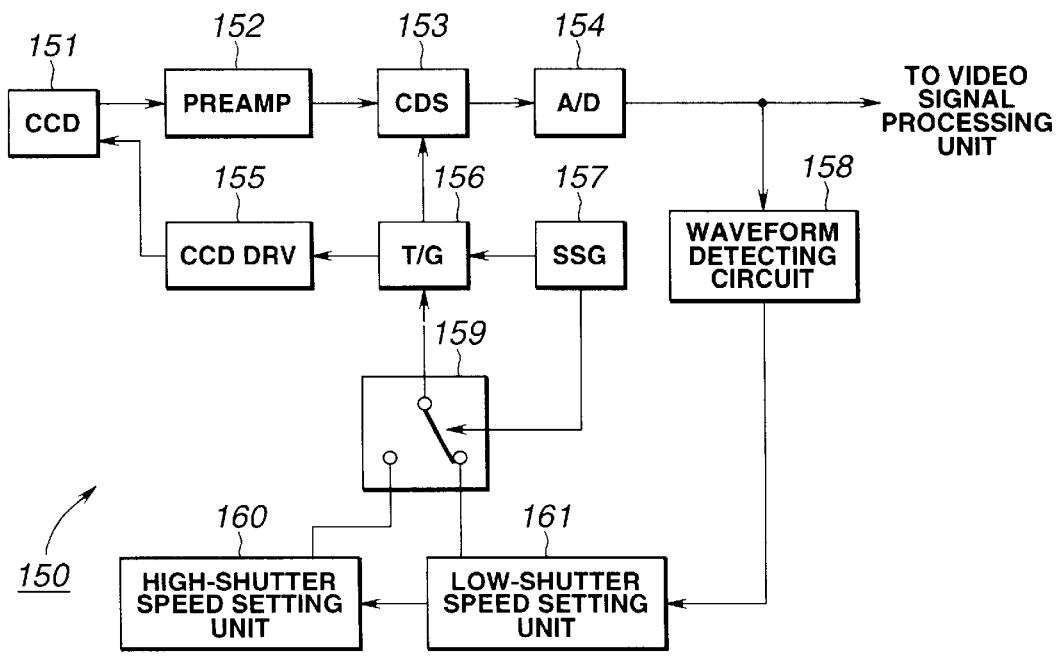
FIGS. 26 and 27 relate to the sixth embodiment of the present invention.
Figure 27:
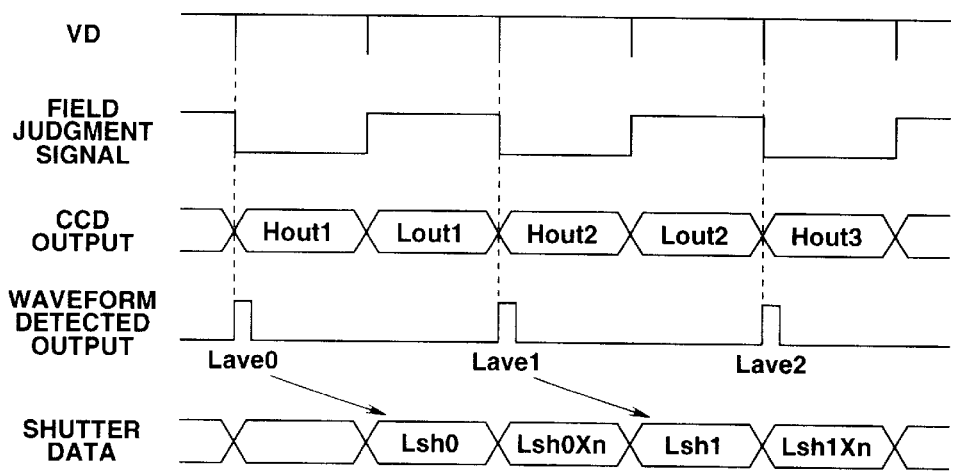

The sixth embodiment of the present invention will be described with reference to FIGS. 26 and 27. As shown in FIG. 26, an imaging apparatus 150 of the sixth embodiment consists of a CCD 151, a sync signal generating circuit (hereinafter, SSG) 157, a timing generator (T/G in the drawing) 156, and a CCD driver (CCD DRV in the drawing) 155. The CCd 151 is a single-plate color imaging device for imaging an object. The sync signal generating circuit 157 generates a reference signal. The timing generator 156 inputs the reference signal from the SSG 157 and produces a driving signal for use in driving the CCD 151. The CCD driver 155 drives the CCD 151 in response to the driving signal sent from the timing generator 156.

The imaging apparatus 150 further consists of a preamplifier 152, a correlative double sampling (abbreviated to CDS) circuit 153, and an A/D converter 154. Specifically, the preamplifier 512 amplifies an image signal produced by the CCD 151. The CDS circuit 153 carries out correlative double sampling according to sampling pulses sent from the timing generator 156. The A/D converter 154 digitizes an output of the CDS circuit 153. An image signal output from the CCD 151 is amplified by the preamplifier 152. Thereafter, the frequency of the resultant signal is lowered to fall within the baseband by the CDS circuit 153. The signal is then digitized by the A/D converter 154.

Moreover, the imaging apparatus 150 includes a low-shutter speed setting unit 161 and a high-shutter speed setting unit 160. The low-shutter speed setting unit 161 sets the shutter speed for the CCD 151 to a low shutter speed, for example, about 1/60 sec. The high-shutter speed setting unit 160 sets the shutter speed for the CCD 151 to a shutter speed equivalent to a submultiple of n of the shutter speed set by the low-shutter speed setting unit 161. Note that the shutter speed is equivalent to an exposure time.

Thus, the data of shutter speeds is output from the low-shutter speed setting unit 161 and high-shutter speed setting unit 160. Either of the shutter speed is selected by a shutter speed selection switch 159 that is changed over to a different circuit for each field period according to a reference signal sent from the SSG 157.

On the other hand, an output of the A/D converter 154 is sent to a video signal processing unit that is not shown. A waveform detecting circuit 158 is connected to the output terminal of the A/D converter 154. The waveform detecting circuit 158 detects the waveform of only an image signal produced by the CCD 151 at the low shutter speed according to a field judgment signal sent from the timing generator 156. The result of waveform detection is output to the low-shutter speed setting unit 161.

The low-shutter speed setting unit 161 sets a shutter speed according to the result of waveform detection performed by the waveform detecting circuit 158, thus optimizing the level of the image signal produced by the CCD 151.

Next, the operations of the imaging apparatus of this embodiment having the foregoing components will be described with reference to FIG. 27.

With a driving signal generated by the timing generator 156 according to the reference signal VD sent from the SSG 157, the CCD driver 155 drives the CCD 151. At this time, control is given to set a shutter speed for the CCD 151. Namely, the low shutter speed set by the low-shutter speed setting unit 161 and the high shutter speed set by the high-shutter speed setting unit 160 are switched for each field period.

Moreover, the waveform detecting circuit 158 detects the waveform of only an image signal produced at the low shutter speed set by the low-shutter speed setting unit 161. The low-shutter speed setting unit 161 sets a shutter speed according to a result provided by the waveform detecting circuit 158, thus optimizing the level of the image signal produced by the CCD 151.

On the other hand, a high shutter speed to be set by the high-shutter speed setting unit 160 is a submultiple of n of the shutter speed set by the low-shutter speed setting unit 161. For example, a quarter of the shutter speed is adopted.

A photoelectrically converted signal representing an object image projected by the CCD 151 is amplified by the preamplifier 152. The frequency of the resultant signal is then lowered to fall within the baseband by means of the CDS circuit 153. The signal is then converted into a digital signal by the A/D converter 154, and output to the video signal processing unit that is not shown.

As mentioned above, according to this embodiment, the imaging apparatus 150 has the waveform detecting circuit 158 that detects the waveform of only an image signal produced at the low shutter speed set by the low-shutter speed setting unit 161. Based on the result of waveform detection performed by the waveform detecting circuit 158, the low-shutter speed setting unit 161 controls the shutter speed for the CCD 151. At this time, the shutter speed for the CCD 151 is controlled in order to optimize the level of an image signal produced by the CCD 151. The high-shutter speed setting unit 160 autonomously sets a higher shutter speed than the shutter speed set by the low-shutter speed setting unit 161. Consequently, an iris diaphragm can be realized for the CCD. Despite the relatively simple circuitry, the imaging apparatus can offer a wide dynamic range for an image signal.

In this embodiment, a shutter speed set by the high-shutter speed setting unit 160 is automatically set to a quarter of a shutter speed set by the low-shutter speed setting unit 161. Needless to say, the submultiple of n of the shutter speed set by the low-shutter speed setting unit 161 is not limited to the quarter thereof.

Seventh Embodiment

Next, the seventh embodiment of the present invention will be described with reference to FIGS. 28 and 29.

The basic configuration of an imaging apparatus 150' of the seventh embodiment is identical to that of the sixth embodiment.

However, according to the sixth embodiment, the waveform detecting circuit 158 detects the waveform of only an image signal produced by a low-shutter speed. The low-shutter speed setting unit 161 controls a shutter speed according to the result of waveform detection performed by the waveform detecting circuit 158. The high-shutter speed setting unit 160 autonomously sets a shutter speed according to the shutter speed set by the low-shutter speed setting unit 161. According to this embodiment, unlike the sixth embodiment, the waveform detecting circuit 158 detects the waveform of only an image signal produced at a high shutter speed set by the high-shutter speed setting unit 160. Based on the result of waveform detection performed by the waveform detecting circuit 158, the high-shutter speed setting unit 160 controls a shutter speed so as to optimize the level of an image signal produced by the CCD 151. The low-shutter speed setting unit 161 sets a shutter speed according to the shutter speed set by the high-shutter speed setting unit 160.

Herein, a mention will therefore be made of only a difference from the sixth embodiment. The description of duplicate portions will be omitted.

Figure 28:
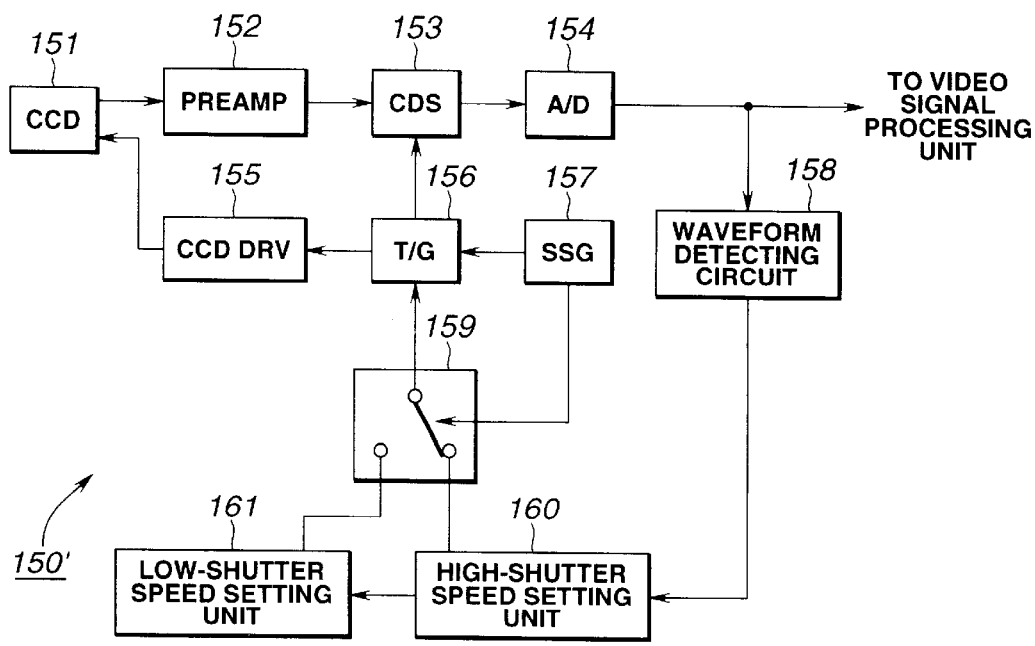
FIGS. 28 and 29 relate to the seventh embodiment of the present invention.
Figure 29:
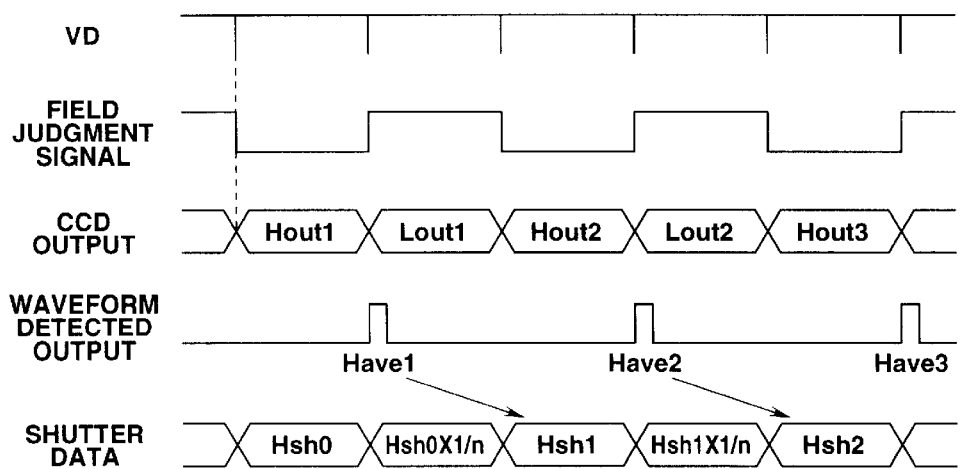

An imaging apparatus 150' of this embodiment shown in FIG. 28 consists of a high-shutter speed setting unit 160 and a low-shutter speed setting unit 161. Specifically, the high-shutter speed setting unit 160 sets the shutter speed for the CCD 151 to a high shutter speed, for example, about 1/240 sec. The low-shutter speed setting unit 161 sets the shutter speed for the CCD 151 to a submultiple of n of the shutter speed set by the high-shutter speed setting unit 160. Note that the shutter speed is equivalent to an exposure time.

Thus, the data of shutter speeds is output from the low-shutter speed setting unit 161 and high-shutter speed setting unit 160. Either of the shutter speeds is selected by a shutter speed selection switch 159 that is changed over to a different circuit for each field period according to a reference signal sent from the SSG 157. A selected shutter speed is output to the timing generator 156.

The waveform detecting circuit 158 of this embodiment detects the waveform of only an image signal, which is produced at a high shutter speed by the CCD 151, according to a field judgment signal sent from the timing generator 156. The result of waveform detection is output to the high-shutter speed setting unit 160.

Based on the result of waveform detection performed by the waveform detecting circuit 158, the high-shutter speed setting unit 160 sets a shutter speed so as to optimize the level of an image signal produced by the CCD 151.

Next, the operations of the imaging apparatus of this embodiment having the foregoing components will be described with reference to FIG. 29.

The timing generator 156 generates a driving signal according to a reference signal VD sent from the SSG 157. With the driving signal, the CCD driver 155 drives the CCD 151. The shutter speed for the CCD 151 is controlled by switching for each field period a high shutter speed set by the high-shutter speed setting unit 160 and a low shutter speed set by the low-shutter speed setting unit 161.

The waveform detecting circuit 158 detects the waveform of only an image signal produced at the high shutter speed set by the high-shutter speed setting unit 160. Based on the result of waveform detection performed by the waveform detecting circuit 158, the high-shutter speed setting unit 160 sets a shutter speed so as to optimize the level of an image signal produced by the CCD 151.

The low shutter speed set by the low-shutter speed setting unit 161 is automatically set to a multiple of n of a shutter speed set by the high-shutter speed setting unit 160, for example, a quadruple thereof.

A photoelectrically converted signal representing an object image produced by the CCD 151 is amplified by a preamplifier 152. Thereafter, the frequency of the resultant signal is lowered to fall within the baseband by means of a CDS circuit 153. The signal is then converted into a digital signal by an A/D converter 154, and then output to a video signal processing unit that is not shown.

As mentioned above, even in the imaging apparatus 150' of this embodiment, like that of the sixth embodiment, an iris diaphragm can be realized for the CCD. Despite the relatively simple circuitry, the imaging apparatus can offer a wide dynamic range for an image signal.

Even in this embodiment, a shutter speed set by the low-shutter speed setting unit 161 is a quadruple of a shutter speed set by the high-shutter speed setting unit 160. Naturally, the multiple of the shutter speed set by the high-shutter speed setting unit is not limited to the quadruple thereof.

Eighth Embodiment

Next, the eighth embodiment of the present invention will be described with reference to FIGS. 30 and 31.

The same reference numerals will be assigned to components identical to those of the sixth and seventh embodiments. The description of the components will be omitted.

In the imaging apparatuses 150 and 150' of the sixth and seventh embodiment, the waveform of either an image signal produced at a low shutter speed or an image signal produced at a high shutter speed is detected. Either the low shutter speed or high shutter speed is set based on the result of waveform detection. The other shutter speed is set to a certain ratio of the set shutter speed.

Unlike the imaging apparatuses of the embodiments, an imaging apparatus 150" of this embodiment detects the waveform of an image signal produced at a low shutter speed and that of an image signal produced at a high shutter speed. The high-shutter speed setting unit 160 and low-shutter speed setting unit 161 each set a shutter speed.

Figure 30:
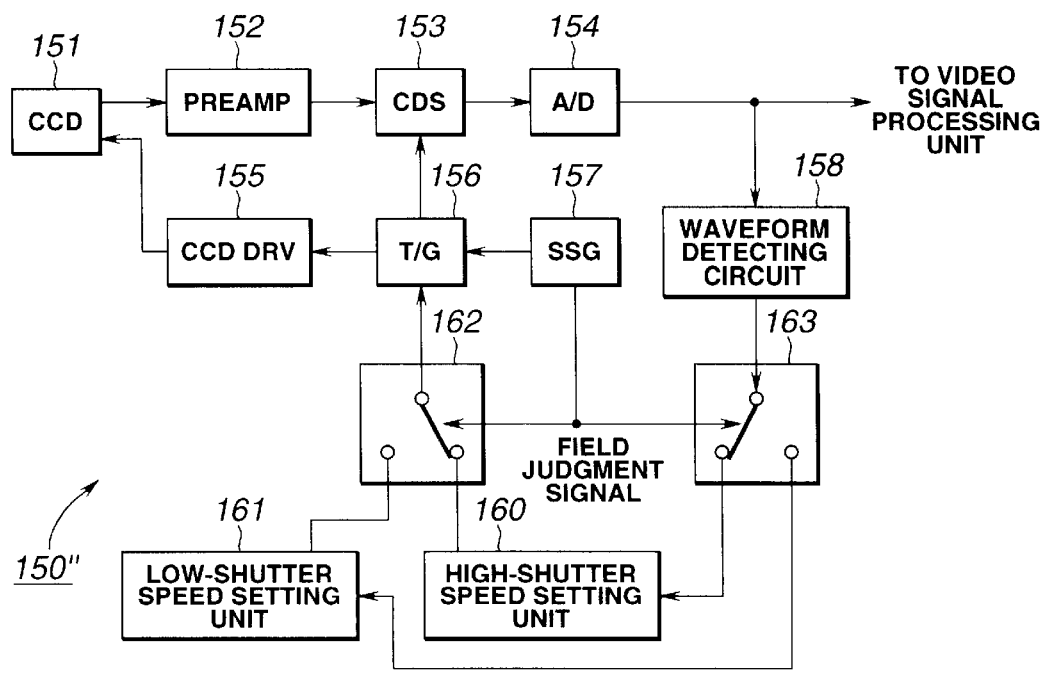
FIGS. 30 and 31 relate to the eighth embodiment of the present invention.
Figure 31:
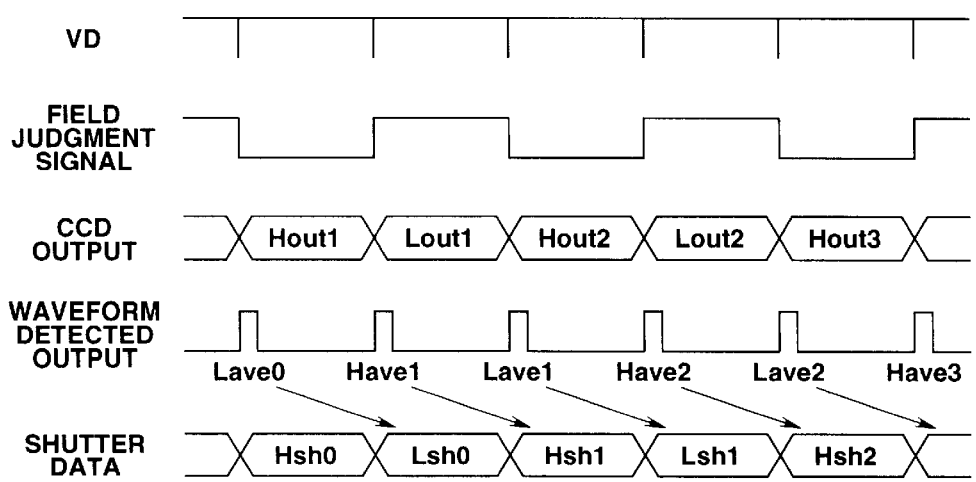

As shown in FIG. 30, the imaging apparatus 150" of this embodiment includes a high-shutter speed setting unit 160 and a low-shutter speed setting unit 161. The high-shutter speed setting unit 160 sets the shutter speed for the CCD 151 to a high shutter speed, for example, about 1/240 sec. The low-shutter speed setting unit 161 sets the shutter speed for the CCD 151 to a low shutter speed, for example, about 1/60 sec.

Thus, the data of shutter speeds is output from the low-shutter speed setting unit 161 and high-shutter speed setting unit 160. Either of the shutter speeds is, like those in the sixth and seventh embodiments, selected by a shutter speed selection switch 162 that is changed over for each field period according to a reference signal sent from the SSG 157. The data of the selected shutter speed is then output to the timing generator 156.

On the other hand, the waveform detecting circuit 158 of this embodiment detects the waveforms of image signals produced by the CCD 151 according to a field judgment signal sent from the timing generator 156. Herein, one of the image signals has been produced at a high shutter speed, and the other image signal has been produced at a low shutter speed. The results of waveform detection are output to either the high-shutter speed setting unit 160 or low-shutter speed setting unit 161. Either the high-shutter speed setting unit 160 or low-shutter speed setting unit 161 is selected by a shutter setting unit selection switch 163 that is changed over for each field period according to the reference signal sent from the SSG 157.

The high-shutter speed setting unit 160 or low-shutter speed setting unit 161 is selected by the shutter setting unit selection switch 163. At this time, based on the results of waveform detection performed by the waveform detecting circuit 158, a shutter speed is determined in order to optimize the level of an image signal produced by the CCD 151.

Figure 32:
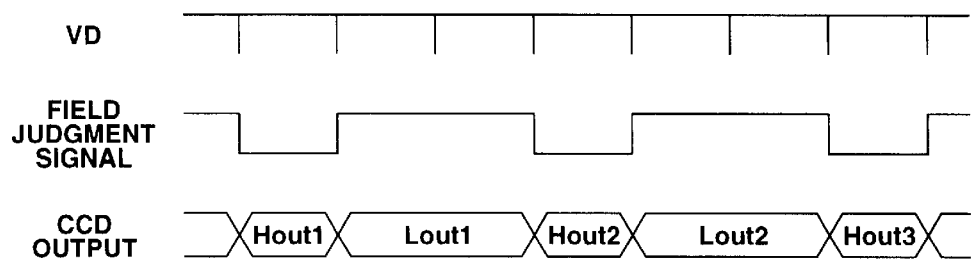
FIG. 32 is a timing chart indicating an output of a charge-coupled device for each field in a variant of the eighth embodiment.

Next, the operations of the imaging apparatus 150" of this embodiment having the foregoing components will be described with reference to FIG. 32.

The timing generator 156 generates a driving signal according to a reference signal VD sent from the SSG 157.

With the driving signal, the CCD driver 155 drives the CCD 151. At this time, the shutter speed for the CCD 151 is controlled so that a high shutter speed set by the high-shutter speed setting unit 160 and a low shutter speed set by the low-shutter speed setting unit 161 will be switched for each field period.

Moreover, the waveform detecting circuit 158 detects the waveforms of both an image signal produced at the high shutter speed and an image signal produced at the low shutter speed. The results of waveform detection are output to either the high-shutter speed setting unit 160 or low-shutter speed setting unit 161 selected by the shutter setting unit selection switch 163.

A shutter setting unit selected by the shutter setting unit selection switch 163 determines a shutter speed according to results provided by the waveform detecting circuit 158. In other words, a shutter speed is determined in order to optimize the level of an image signal produced by the CCD 151.

A photoelectrically converted signal representing an object image produced by the CCD 151 is amplified by the preamplifier 152. Thereafter, the frequency of the signal is lowered to fall within the baseband by means of the CDS circuit 153. The resultant signal is converted into a digital signal by the A/D converter 154. The digital signal is then output to the video signal processing unit that is not shown.

As mentioned above, according to this embodiment, the imaging apparatus 150'' can offer an optimal dynamic range for an image signal according to the brightness levels of an object. Even an object that may be visualized with a quite bright portion and quite dark portion thereof coexistent on the same screen can be imaged without occurrence of any drawback such as streaky whitening or blackening.

In the sixth to eighth embodiments, imaging at a low shutter speed and imaging at a high shutter speed are switched for each field period that is defined by the timing generator 156. The present invention is not limited to this mode. Alternatively, as shown in FIG. 32, imaging at the low shutter speed may be repeated over a plurality of field periods.

When imaging at the low shutter speed is carried out in a long exposure mode, a proper dynamic range can be offered even for a very dark object. In this example, the waveform detecting circuit 158 can be excluded.

As mentioned above, according to the sixth to eighth embodiments, there is provided an endoscopic imaging apparatus capable of constructing an appropriate image even when the brightness level of an object varies widely.

Ninth Embodiment

Next, the ninth embodiment of the present invention will be described with reference to FIGS. 33 to 40. An endoscopic imaging apparatus 201 of the ninth embodiment of the present invention will be described in conjunction with a schematic configuration shown in FIG. 33.

In the endoscopic imaging apparatus 201, light reflected from an object of observation 202 falls upon an imaging unit 204 through an optical path 203. An exposure value control means 205 in the imaging unit 202 controls an amount of incident light reflected from the object of observation 202. For constructing one frame image, the amount of incident light is controlled so that an exposure value will be different between two field periods. Thus, an exposure value for the imaging surface of an imaging device 206 is controlled.

The exposure value control means 205 sets the exposure value for the imaging surface so that an image prone to streaky whitening (halation) will be formed during a first field, and an image prone to slight blackening (blacking out) will be formed during a second field period.

An image processing unit 207 includes a signal generator 298 for generating a timing signal used to switch the actions of the exposure value control means 205 according to given timing. Herein, a timing signal used to change exposure values for each field rendered by a video signal is sent to the exposure value control means 205.

In the image processing unit 207, an amplifier 209 amplifies an image signal that has been photoelectrically converted by the imaging device 206 and input to the image processing unit. Thereafter, an image processing circuit 210 synthesizes signals, which render a first field and second field, according to a given algorithm, thus producing a video signal.

In synthesis for producing a video signal, a timing signal sent from the signal generator 208 is used to lock the timing of an image signal produced by the imaging device 206 onto the timing of a reference signal. A video signal produced is output to an image display 212 such as a CRT monitor via a video output circuit 211. An image of the object of observation 202 is then displayed.

Owing to the foregoing components, a relatively dark portion of a view image is displayed based on an image signal that renders a first field and is prone to streaky whitening. Moreover, a relatively bright portion thereof is displayed based on an image signal that renders a second field and is prone to blackening. Consequently, the view image is seen clearly proving a wide dynamic range. In other words, it will not take place that blackening stems from an insufficient amount of light and streaky whitening stems from an excess amount of light.

FIG. 34 shows a configuration of an endoscopic imaging unit 204A as a practical example of the imaging unit 204. The endoscopic imaging unit 204A consists of an optical endoscope 215, and a camera head 216 or TV camera mounted on the optical endoscope 215. The optical endoscope 215 has an elongated insertion unit 217 that is inserted into a body cavity or the like.

A light guide 218 for propagating illumination light is running through the insertion unit 217. The proximal end of the light guide 218 is coupled to a light source unit 220 through a light guide cable 219. Thus, illumination light emanating from a lamp 222 that glows with power supplied from a lamp power supply circuit 221 is converged by a lens and then supplied. The illumination light is propagated and emitted through the distal end of the light guide 218. Consequently, an object 223 that is the object of observation 202 is illuminated.

Light reflected from the object 223 illuminated by the illumination light is passed through an objective optical system 224 located at the distal end of the insertion unit 217. An optical image of the object is formed on the distal surface of an image guide 225, and propagated to the back surface of the image guide 225 by means of the image guide 225. The optical image propagated to the back surface is projected on a CCD 228 placed as the imaging device 206 on the image plane of an image formation lens 227.

A mosaic filter 229 for separating color components is attached to the imaging surface of the CCD 228. When a CCD driving signal generated by the signal generator 208 is applied to the CCD 228, a photoelectrically converted picture signal is output.

Figure 35A:
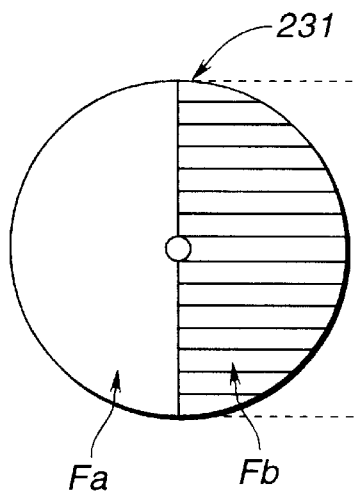
FIGS. 35A and 35B are diagrams showing a filter member.

According to this embodiment, a disk-like filter member 231 is placed as the exposure value control means 205 on an optical path linking the image formation lens 227 and CCD 228. The filter member 231 is driven to rotate by means of a motor 232 that rotates with a driving signal sent from a motor control circuit 233. A field judgment signal whose level differs between a first field and second field is input to the motor control circuit 233. The motor control circuit 233 controls rotation of the motor so that two filters 234a and 234b of the filter member 231, which are shown in FIG. 35A, will be placed on the optical path alternately for each field. Thus, an amount of imaging light to be projected on the CCD 228 is controlled field by field.

Figure 35B:
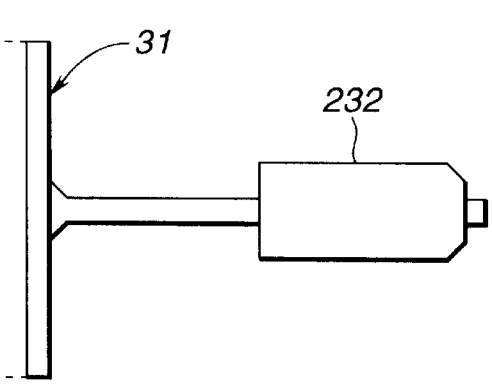
Figure 36:
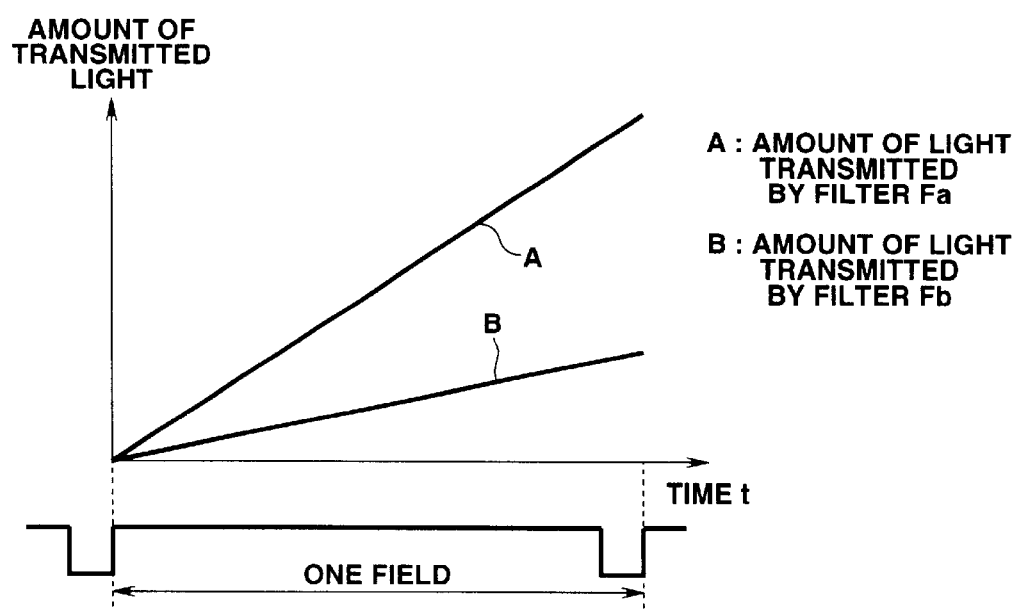
Figure 37:
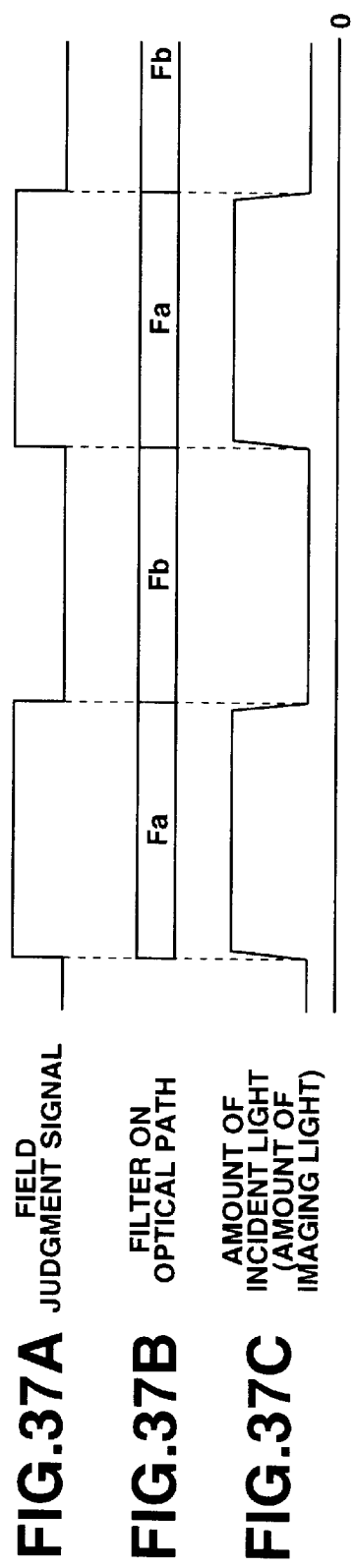

In other words, as shown in FIGS. 35A and 35B, the filter member 231 is composed of two kinds of filters Fa and Fb shaped semi-circularly and mutually different in transmittance. An axial member is extended from the center of the filter member 231 in a normal direction. The other end of the axial member is fitted in the motor 232. The filter member 231 is therefore rotated together with rotation of the motor 232.

A description will proceed on the assumption that one of the two kinds of filters Fa and Fb of the filter member 231 exhibiting different characteristics, that is, the filter Fa offers a higher transmittance than the filter Fb.

In this case, as mentioned above, an image signal rendering a first field is produced to be prone to streaky whitening. An image signal rendering a second field is produced to be prone to blackening. The motor 232 is driven so that the filter Fa will face the imaging surface of the CCD 228 during a first field period, and the filter Fb will face it during a second field period.

In other words, the motor 232 makes one turn during one frame period. The filter Fa faces the imaging surface during a first half of the frame period, that is, a first field period. The filter Fb faces the imaging surface during a second field period.

The transmission characteristics of the two kinds of filters Fa and Fb vary depending on the state of an object to be imaged. Assume that an amount of light reflected from an object of observation remains constant. In this case, the amount of light reflected from the object of observation is all projected on a portion of the imaging surface of the CCD 228 used to render a first field. For example, a several submultiple of the light reflected from the object of observation, or a several tens submultiple thereof is projected on the other portion thereof used to render a second field. For the same object 23, two images rendering the first field and second field are projected with different amounts of light.

In this embodiment, normally adopted conditions for imaging (for example, one frame imaging period is 1/30 sec, and each field period is 1/60 sec) are satisfied. The relative transmission characteristics of the filters Fa and Fb are differentiated from each other. Nevertheless, images can be projected with an exposure value made greatly different between them. For projecting images with an exposure value made greatly different between them, the transmission characteristics of the filters Fa and Fb should merely be differentiated from each other.

Imaging is thus controlled. Consequently, when the filter Fa exists on the optical path, an amount of light passing through the filter member 31 (that is, an amount of light incident on the CCD 228) varies according to a characteristic curve A in FIG. 36. When the filter Fb exists on the optical path, an amount of light passing through the filter member 231 varies according to a characteristic curve B in FIG. 36.

Since imaging is thus controlled, a field judgment signal (See FIG. 37A) output from the signal generator 208 incorporated in the image processing unit 7 is input to the motor control circuit 233. As shown in FIG. 37B, control is given so that the filter Fa will be located on the optical path during a first field period and the filter Fb will be located thereon during a second field period. As shown in FIG. 37C, when the filter Fa is located on the optical path, an amount of incident light is large. When the filter Fb is located on the optical path, an amount of incident light is smaller.

Consequently, different images are projected with different amounts of light during the first and second field periods.

A signal processing system for displaying a constructed image on the image display 212 such as a typical TV monitor will be described below.

Figure 38:
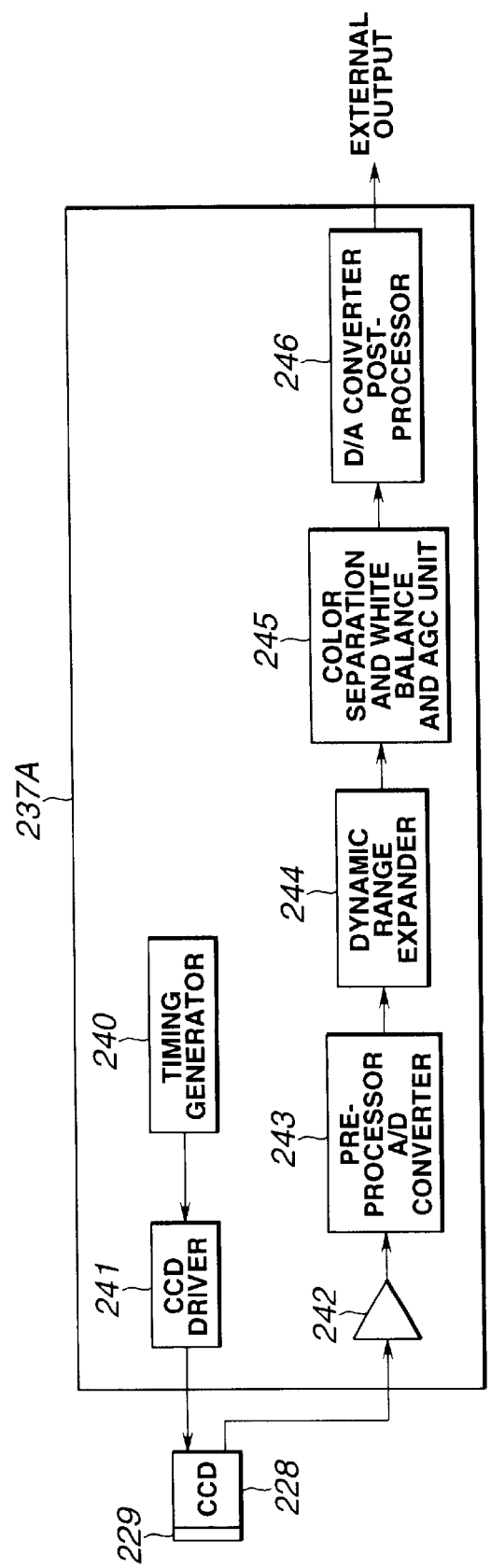

Image signals produced as mentioned above to render fields are processed by the image processing unit 207. FIG. 38 shows a configuration of a video processor 237A as a practical example of the image processing unit 207.

A CCD driver 241 operates synchronously with a timing signal generated by the timing generator 240. The CCD driver 241 applies a CCD driving signal to the CCD 228 at the start of each field period. An optical image projected on the imaging surface of the CCD 228 during each field period is photoelectrically converted. Charges accumulated during one field period to serve as a signal are read from the CCD 228. An output signal is amplified by an amplifier 242, and then passed through a pre-processor A/D converter 243. Pre-processing such as correlative double sampling is carried out in order to extract signal components. The resultant signal is then digitized.

Thereafter, the signal is input to a dynamic range expander 244 that carries out wide dynamic range processing. After the wide dynamic range processing is completed, a color separation and white balance and AGC unit 245 carries out color separation, white balance adjustment, and AGC. Thereafter, a resultant signal is output to an external monitor or the like via a D/A converter post-processor 246.

The color separation and white balance and AGC unit 245 has a frame memory. A field signal is read from the frame memory according to, for example, the interlacing. On a stage succeeding the unit 245, the signal is converted into an analog signal and output as a composite video signal conformable to the NTSC. Alternatively, the signal may not be output as a composite video signal conformable to the NTSC but may be output as red, green, and blue signals.

Figure 39:
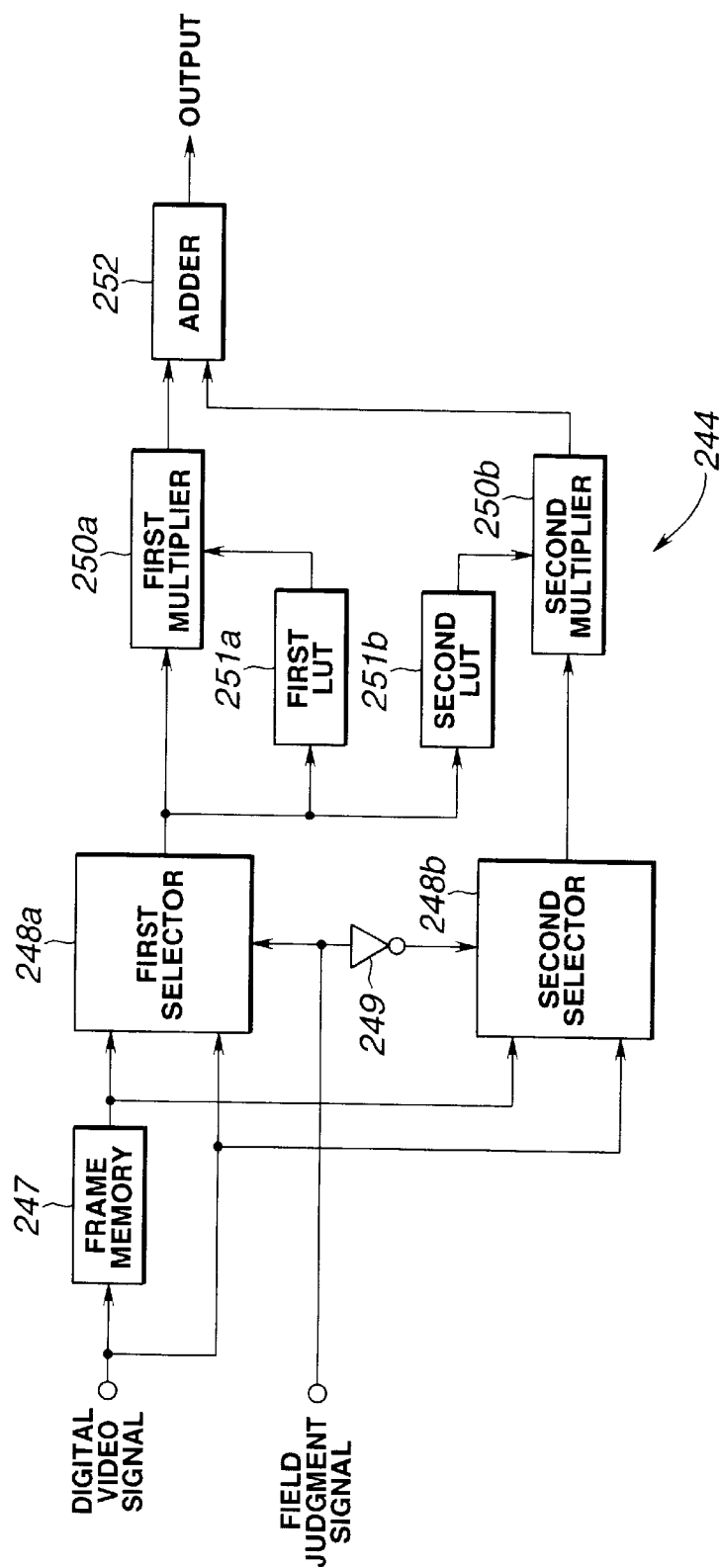
Figure 40:
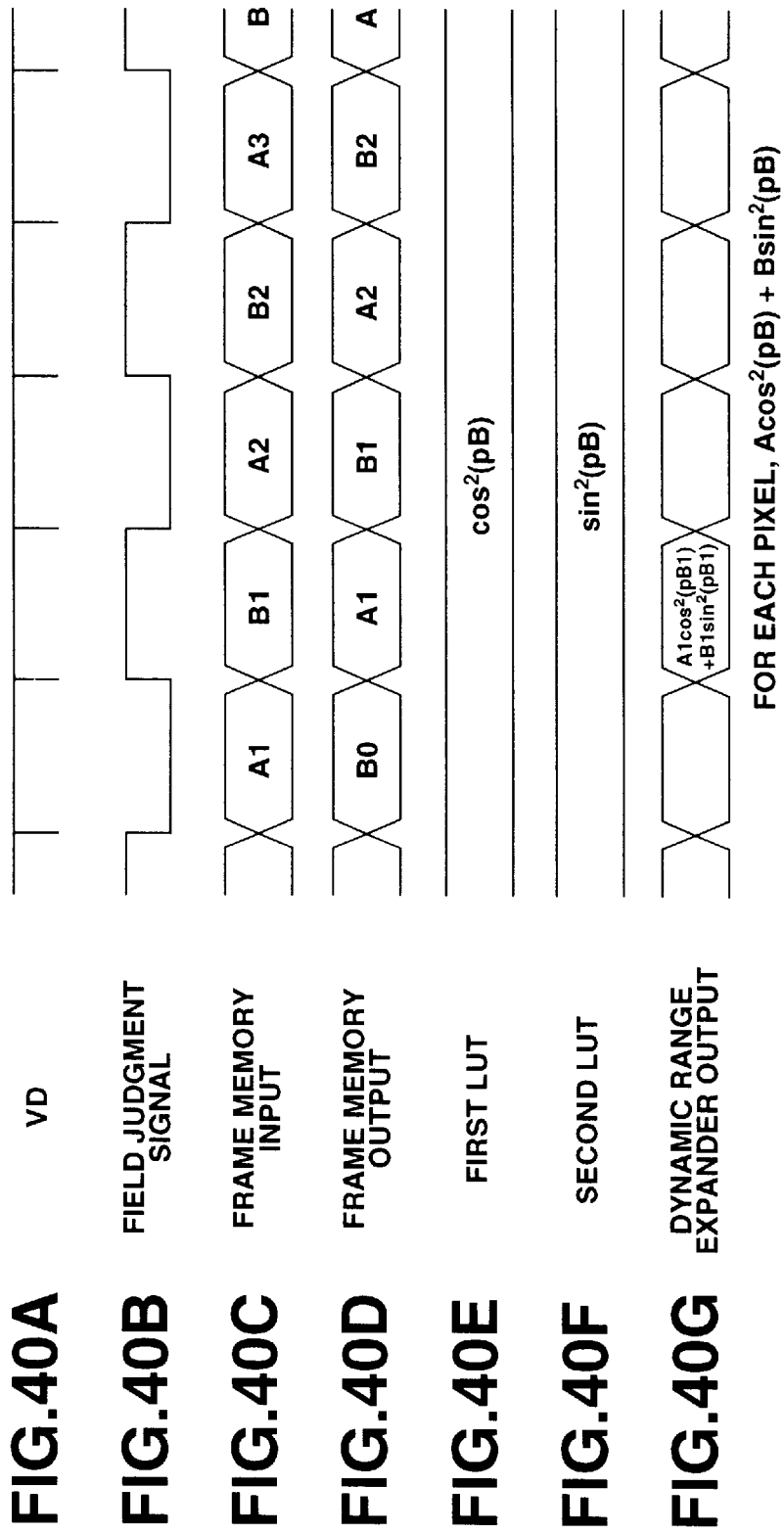

FIG. 39 shows a practical example of the dynamic range expander 244 shown in FIG. 38. FIGS. 40A to 40G are timing charts for explaining the actions of the dynamic range expander 244 shown in FIG. 39. VD in FIG. 40 denotes a vertical sync signal.

A digitized video signal input to the dynamic range expander 244 shown in FIG. 39 is input to a frame memory 247. (In FIGS. 40C and 40D, An and Bn denote signals produced during first and second field periods of the n-th frame period.) The video signal is also input to first and second selectors 248a and 248b.

The video signal input to the frame memory 247 is input to the first and second selectors 248a and 248b on a first-in first-out (FIFO) basis. Namely, input of the signal to the second selector lags behind by one field period (See FIGS. 40C and 40D). In other words, output of the signal from the second selector lags behind by one field period. The signal is therefore output synchronously with a signal rendering a subsequent field.

A field judgment signal shown in FIG. 40B is input directly to the first selector 248a but input to the second selector 248b via a reversing circuit 249. With the field judgment signal as a reference, either of signals rendering first and second fields and existing in the selectors is fetched.

A signal input to the first selector 248a is output to a first multiplier 250a. First and second look-up tables (LUTs) 251a and 251b are referenced based on the signal. The signal is then weighted with appropriate functions.

The functions are, for example, as shown in FIGS. 40E and 40F, $\cos^2(pB)$ residing in the first LUT 251a and $\sin^2(pB)$ residing in the second LUT 251b. The variable pB in the function cos or sin varies with a brightness level B of an object ranging from 0 to $\pi/2$, though it depends on the parameter p for converting one scale to another. Herein, the brightness level B is equivalent to a luminance level of a pixel to be produced with a limited amount of incident light. An image signal produced under the condition that an amount of incident light is limited is employed. This is because when an image signal produced under any other condition is employed, the image signal may have a saturation value. Thus, the image signal produced with a limited amount of incident light is employed in order to avoid use of such an image signal having a saturation value.

$\cos(pB)$ is a function that decreases monotonously relative to a brightness level of an object. $\sin(pB)$ is a function that increases monotonously. Squares of the functions exhibit similar characteristics. In this case, the sum of the squared functions is 1.

Signals weighted by referencing the first and second LUTs 251a and 251b are output to the first and second multipliers 250a and 250b. The signals are then multiplied by outputs of the first and second selectors 248a and 248b. Thereafter, outputs of the first and second multipliers 250a and 250b are added up by an adder 252. A resultant signal is output from the dynamic range expander 244 as shown in FIG. 40G.

As mentioned above, two images constituting one frame and projected with different amounts of light during two field periods are synthesized with each other in order to construct one image rendering the one frame. A signal proving a wide dynamic range is thus produced, and output to an external monitor or the like via a processing system on a succeeding stage.

As mentioned above, two images are projected on the imaging surfaces of the CCD 228 with different amounts of light, which are defined by the filters Fa and Fb, during two field periods that are mutually identical imaging periods. Signals representing the images produced with the different amounts of light are weighted and synthesized into one picture signal proving a wide dynamic range by means of a signal processing system including the video processor 237A. The picture signal is then recomposed into a standard video signal. Eventually, an image is displayed on the image display means.

According to this embodiment, an imaging means having a filtering means is used in combination with an image processing unit. Consequently, an endoscopic imaging apparatus for constructing an image of good quality, which proves a wide dynamic range, despite the simple configuration can be realized.

In other words, according to a prior art, for constructing a synthetic picture signal proving a wide dynamic range, two imaging periods must be mutually greatly differentiated. According to this embodiment, the two imaging periods have the same length. Despite the simple signal processing system, the synthetic picture signal can be produced to be unsusceptible to noises or a motion of an object. In other words, a view image of good quality can be displayed according to the synthetic picture signal proving a wide dynamic range.

According to this embodiment, a synthetic picture signal proves a wide dynamic range. Besides, the synthetic picture signal exhibits a characteristic that a luminance level or tone detected therein varies smoothly while reflecting a change in brightness of an object. An image reflecting a delicate color change of the object can therefore be seen. Consequently, an image helpful in locating an initial-stage lesion or diagnosing the lesion properly can be presented.

Tenth Embodiment

In the ninth embodiment, a simultaneous type illuminating means and imaging means are employed in color imaging under illumination of white light. Imaging using a field-sequential type illuminating means and imaging means will be described below.

Figure 41:
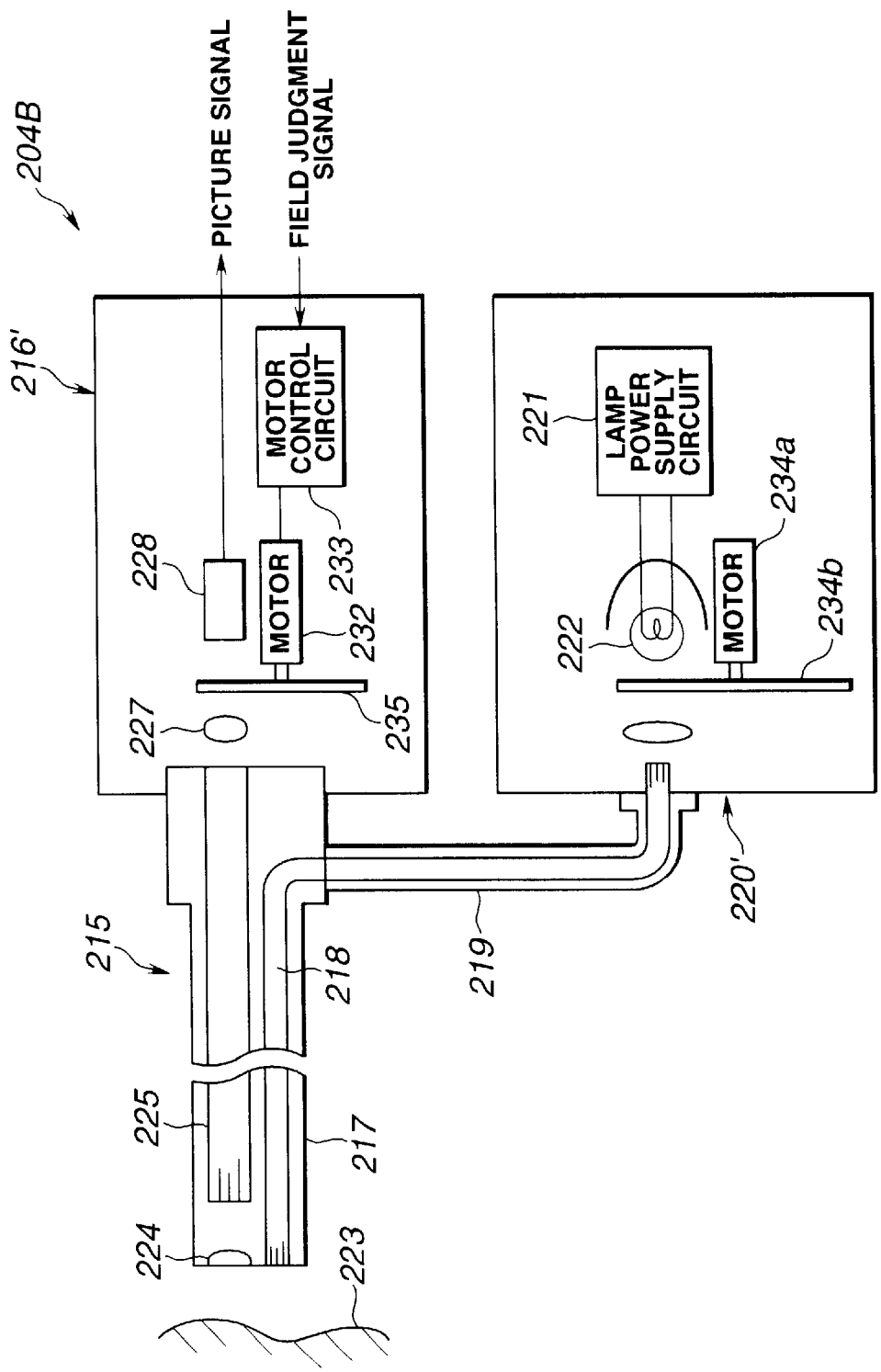

An endoscopic imaging unit 204B shown in FIG. 41 is different from the one shown in FIG. 34 in a point described below. Namely, a light source unit 220' shown in FIG. 41 is configured by placing an RGB rotary filter 234b to be rotated by a motor 234a on an optical path of illumination light in the light source unit 220 shown in FIG. 34.

Figure 42:
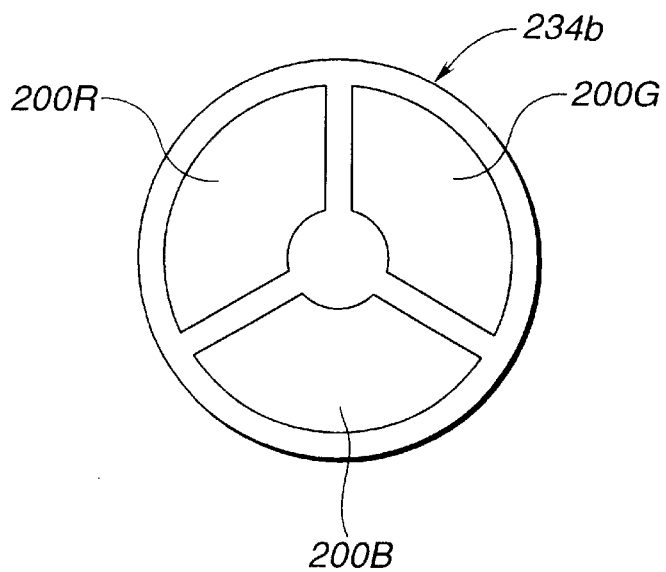

As shown in FIG. 42, the RGB rotary filter 234b has three sector windows bored in a disk. The windows are covered with red, green, and blue filters 200R, 200G, and 200B that transmit rays with the wavelengths of red, green, and blue. The RGB rotary filter 234b is rotated by the motor 234a. Illumination light rays of red, green, and blue are supplied successively to the light guide 218, and then propagated by the light guide. Consequently, the object 223 is illuminated with the field-sequential light rays of red, green, and blue.

Moreover, a camera head 216' shown in FIG. 41 employs a monochrome CCD 228. The monochrome CCD 228 does not have the mosaic filter 229 for separating color signal components which is attached to the imaging surface of the CCD 228 in the camera head 216 shown in FIG. 34. A filter member 235 shown in FIG. 43 is substituted for the filter member 231.

Specifically, the wheel-shaped filter member 235 is attached to the front surface of the CCD 228. The filter member 235 is composed of a total of six filters Ra, Ga, Ba, Rb, Gb, and Bb, or three pairs of two kinds of filters offering different transmittances. The three pairs are provided for three colors of red, green, and blue.

Figure 44:
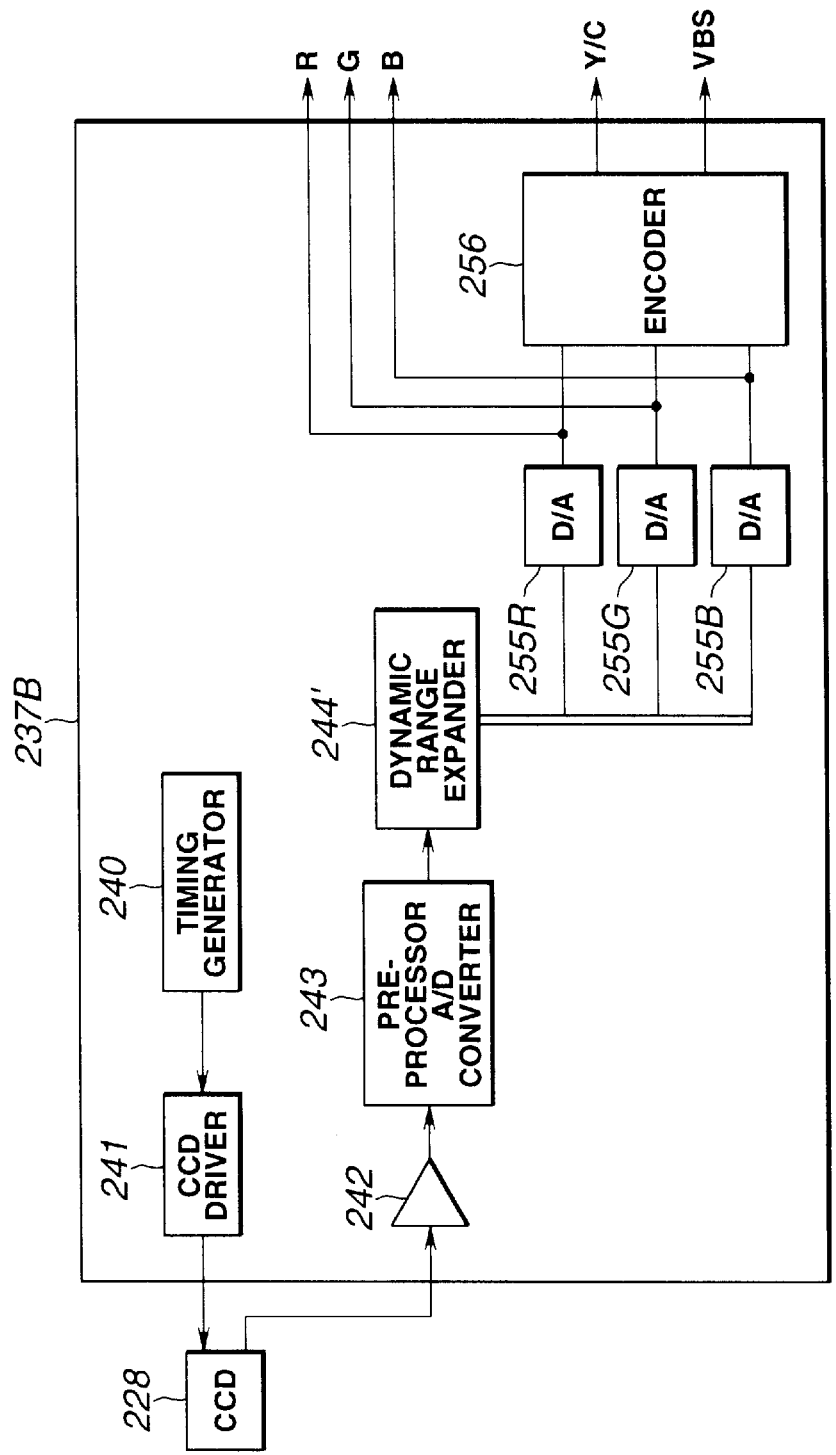

FIG. 44 shows a configuration of a video processor 237 adopting the foregoing field-sequential method. Processing to be carried out on stages preceding a dynamic range expander 244' is nearly identical to the processing to be carried out on the stages shown in FIG. 38. An output signal of the dynamic range expander 244' is output as red, green, and blue color signals via D/A converting circuits 255R, 255G, and 255B. Consequently, signals Y/C and VBS are output via an encoder 256.

Figure 43:
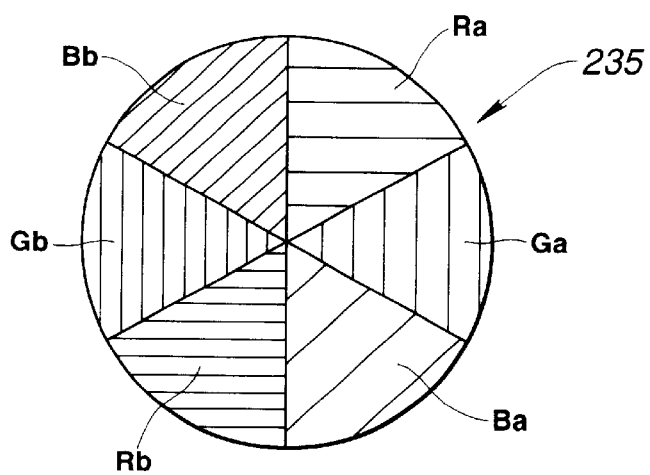

In this case, as shown in FIG. 43, the red filter Ra, green filter Ga, blue filter Ba, red filter Rb, green filter Gb, and blue filter Bb are arranged in that order. Herein, the red filter Ra, green filter Ga, and blue filter Ba offer high transmittances. The red filter Rb, green filter Gb, and blue filter Bb offer low transmittances.

In other words, as shown in FIG. 43, the Ra transmittance is higher than the Rb transmittance, the Ga transmittance is higher than the Gb transmittance, and the Ba transmittance is higher than the Bb transmittance.

Figure 45:
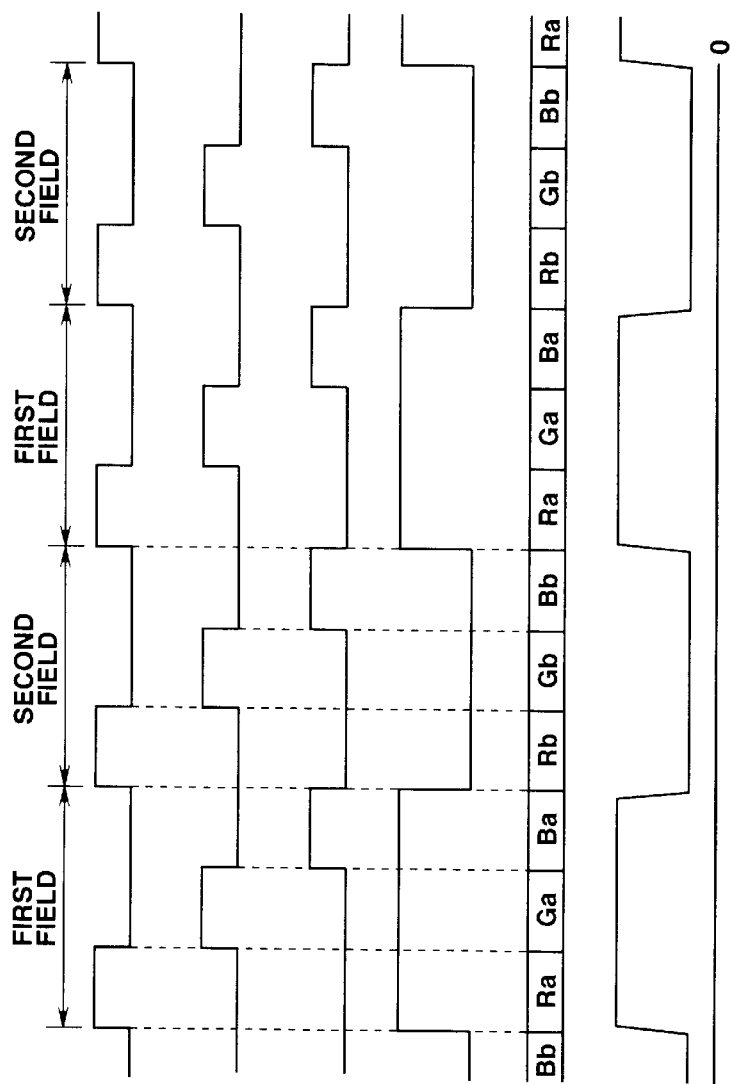

FIGS. 45A to 45F are explanatory diagrams indicating the actions of the imaging means. In this case, field-sequential rays of red, green, and blue are fetched sequentially. Red, green, and blue judgment signals shown in FIGS. 45A, 45B, and 45C are therefore employed in imaging. A field-sequential field judgment signal shown in FIG. 45D is also employed.

As shown in FIG. 45E, the filters Ra, Ga, and Ba are placed sequentially on the optical path during a first field period during which the field-sequential field judgment signal is high. The filters Rb, Gb, and Bb are placed sequentially on the optical path during a second field during which the field-sequential field judgment signal is low. An exposure value is controlled so that an amount of incident light will, as shown in FIG. 45F, be different between the first and second field periods.

For example, for fetching a red signal, the red judgment signal is driven high and the field-sequential field judgment signal (hereinafter, field signal) is driven high. At this time, the filter Ra is placed in front of the CCD 228. When the red judgment signal is driven high and the field signal is driven low, the filter Rb is placed in front of the CCD 228.

During the first field period, a larger amount of light can be routed to the CCD 228 than during the second field period.

Image signals produced during the first and second field periods are input to the video processor 237B serving as an image processing unit. Given image processing for expanding a dynamic range is then performed on the signals. This results in a red signal proving a wide dynamic range. Moreover, the ratio of the transmittance offered by the filter Ra to that offered by the filter Rb depends on a purpose of use. Any ratio is conceivable in the range from, for example, a ratio of 3 to 1 to a ratio of several tens to 1.

The same applies to green and blue signals. Green and blue signals proving wide dynamic ranges can be constructed. When the red, green, and blue signals are encoded according to a known method, a video signal proving a wide dynamic range can be produced.

As apparent from FIGS. 45A to 45F, the filter member 235 makes one turn during one frame period.

Even in this embodiment, the filter member 235 is used for imaging. In principle, image signals can be produced with an exposure value differentiated between them without any change between imaging periods.

Figure 46:
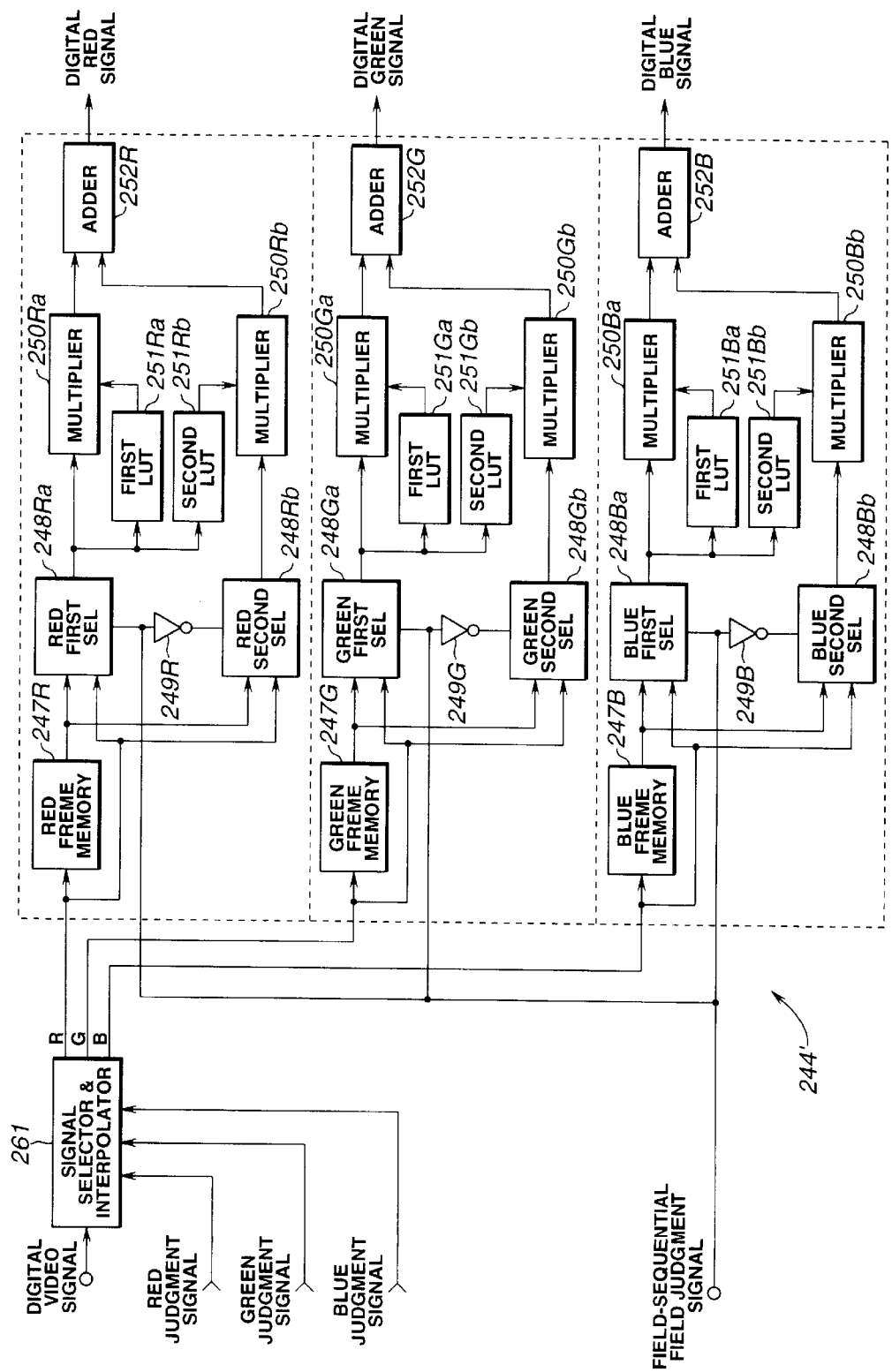
Figure 47:
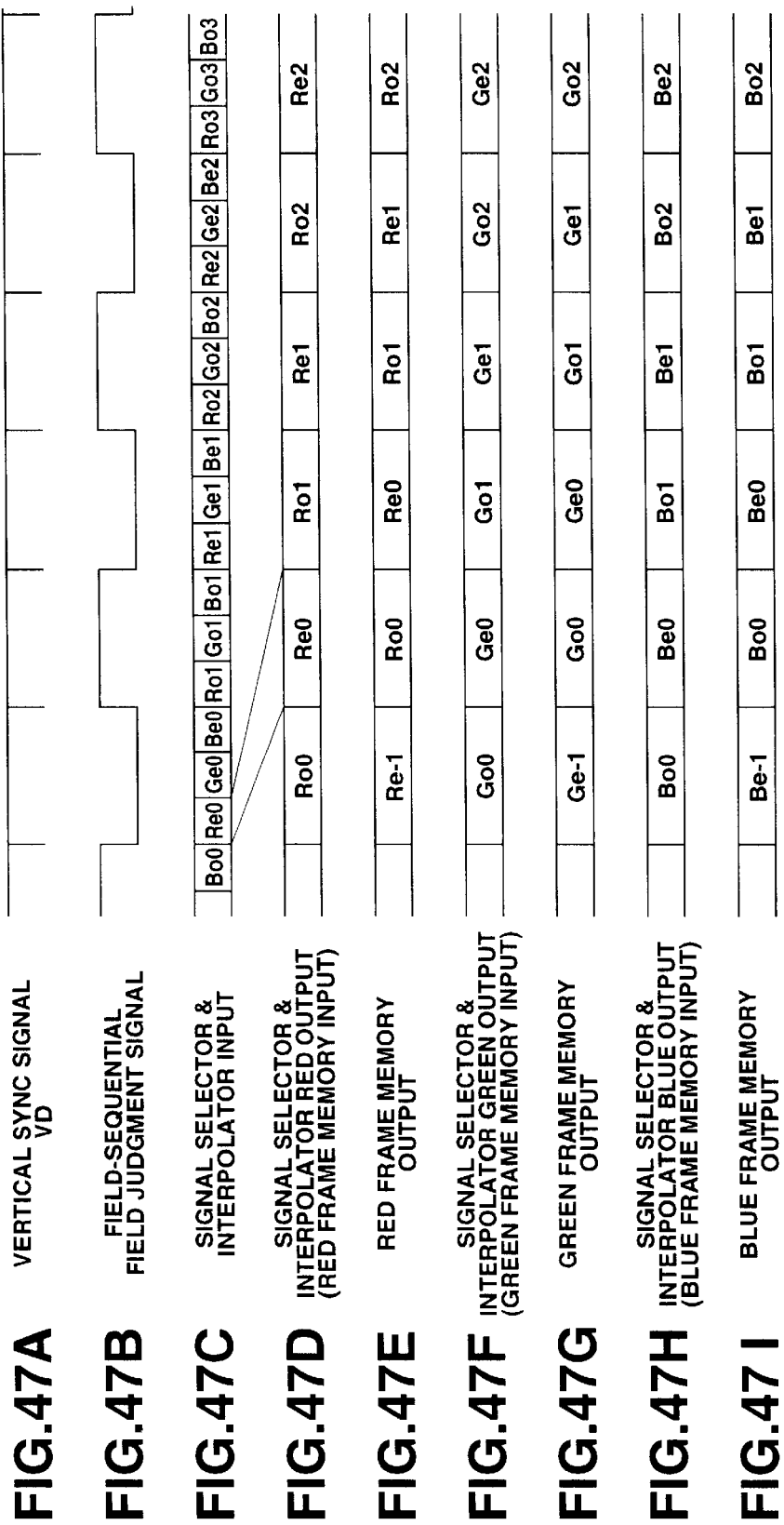

In this embodiment, the configuration and actions of the dynamic range expander 244' shown in FIG. 44 are different from those of the one shown in FIG. 38. This is because an input signal of the dynamic range expander 244' is divided into red, green, and blue signal components. FIG. 46 shows the configuration of the dynamic range expander 244'.

A digital video signal input to the dynamic range expander 244' contains signal components of red, green, and blue signals rendering a first field and those rendering a second field. The red, green, and blue signals are input during a period coincident with one cycle of the field-sequential field judgment signal.

Assume that the cycle of the field-sequential field judgment signal agrees with that of the field judgment signal shown in FIG. 40B. In this case, for separating the red, green, and blue signal components from the input signal of the dynamic range expander 244', only a one-third of a field period is utilized for separating each signal component.

A digital video signal input to the dynamic range expander 244' is first input to a signal selector interpolator 261 in the dynamic range expander 244'. Each color signal component of the video signal is decoded and interpolated in order to stretch the cycle of each color signal component to a triple. Resultant color signals are output from the signal selector interpolator 261.

Thereafter, signal processing indicated in FIGS. 39 and 40A to 40G is carried out in order to produce red, green, and blue digital signals. FIG. 46 shows a practical configuration of the dynamic range expander 244' for carrying out the processing. FIGS. 47A to 47I are explanatory diagrams schematically showing inputs and outputs of the signal selector interpolator 261.

Referring to FIG. 46, for example, a red signal output from the signal selector interpolator 261 is input to a red frame memory 247R. The red signal is also input to first and second selectors for red (red first SEL and red second SEL in FIG. 46) 248R$a$ and 248R$b$. Moreover, an output of the red frame memory 247R is input to the first and second selectors for red 248R$a$ and 248R$b$.

A field judgment signal is input to the first and second selectors for red 248R$a$ and 248R$b$ directly and via a reversing circuit 249R. Output signals of the first and second selectors for red 248R$a$ and 248R$b$ are input to multipliers 250R$a$ and 250R$b$.

Moreover, an output signal of the first selector for red 248R$a$ is input to first and second LUTs 251R$a$ and 251R$b$. Output signals of the first and second LUTs 251R$a$ and 251R$b$ are multiplied by output signals of the first and second selectors for red 248R$a$ and 248R$b$ by means of the multipliers 250R$a$ and 250R$b$. Resultant signals are added up by an adder 252R. Consequently, a digital red signal is output to a succeeding stage.

The same circuit elements as those mentioned above are provided for the other color signals of green and blue. The alphabet R appended to the reference numerals denoting the circuit elements should merely be replaced with G or B. The description of the circuit elements bearing the letters G and B will be omitted.

The circuit elements succeeding the signal selector interpolator 261 in the dynamic range expander 244' are realized by triplicating the dynamic range expander 244 in FIG. 39 in relation to the color signal components.

Moreover, the signal selector interpolator 261 separates color signal components that will be input sequentially during three sub-periods within each period within which the field-sequential field judgment signal is high or low. The signal selector interpolator 261 then stretches the cycles of the color signal components into triples, and then outputs resultant signals to the red, green, and blue frame memories through red, green, and blue output terminals thereof.

The dynamic range for each color signal is then expanded as indicated in FIGS. 40A to 40G in the same manner as that performed by the configuration shown in FIG. 39. (In this case, for producing a red color signal, the frame memory input shown in FIG. 40C is regarded as an input of the red frame memory.)

In this embodiment, as shown in FIGS. 45A to 45C, independent judgment signals are used for red, green, and blue signals. However, the employment of the three color signals alone makes it possible to discriminate among the red, green, and blue signals or between first and second fields. FIGS. 48A to 48E are timing charts indicating the discrimination.

In this case, two kinds of color judgment signals and a field-sequential field judgment signal are used in combination to judge an amount of light incident on an imaging device and discriminate among red, green, and blue signals.

Specifically, referring to FIGS. 48A to 48E, when first and second color judgment signals C1 and C2 are high and low respectively, a red signal is identified. When the first and second color judgment signals C1 and C2 are low and high respectively, a green signal is identified. When the first and second color judgment signals C1 and C2 are both high, a blue signal is identified. The first and second color judgment signals are used in combination with the field-sequential field judgment signal, thus providing the same effect as the practical example described in conjunction with FIGS. 45A to 45F.

Moreover, the two color judgment signals may be substituted for the red, green, and blue judgment signals shown in FIG. 46. Nevertheless, the signal selector interpolator 261 can separate color signal components and stretch the cycles of the color signal components. The dynamic ranges for the color signals can be expanded on a succeeding stage.

In this case, a wheel-shaped filter member employed will be identical to the filter member 235 shown in FIG. 43. Moreover, a second variant of this embodiment is conceivable. In the second variant, the filters are not arranged in the order of the filters Ra, Ga, Ba, Rb, Gb, and Bb but may be arranged in the order of the filters Ra, Rb, Ga, Gb, Ba, and Bb. A wheel-shaped filter member having the filters thus arranged will be described below.

Figure 49:
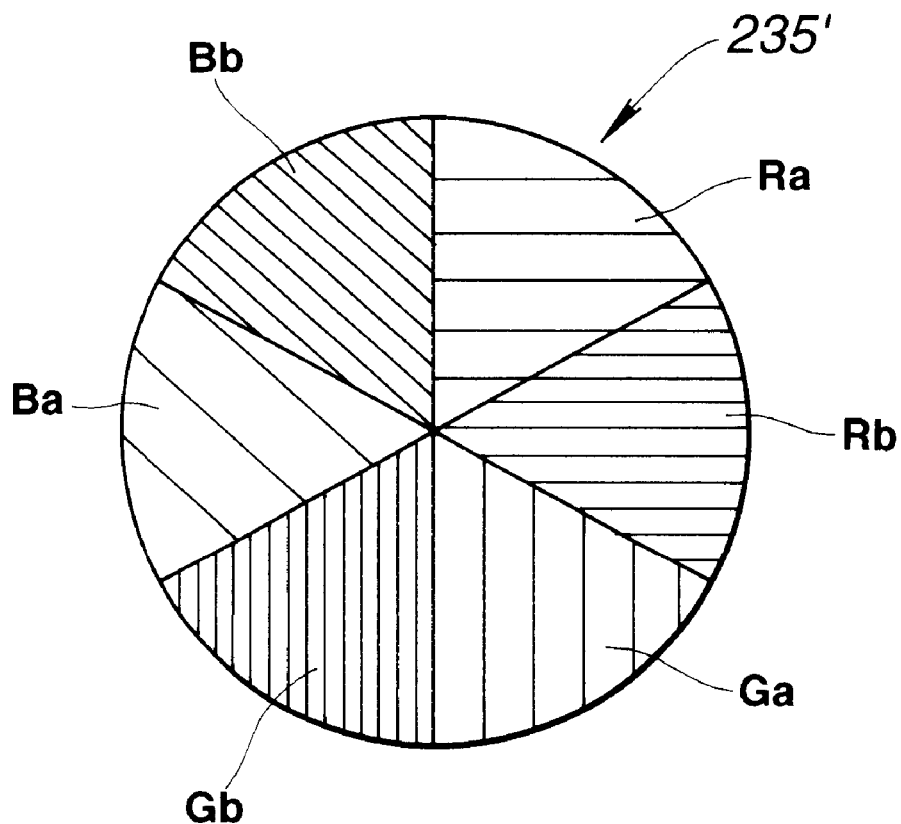

FIG. 49 shows a wheel-shaped filter member 235'.

FIGS. 50A to 50F are timing charts indicating the actions of an imaging means having the filter member. Since the filter member 235' has filters arranged as shown in FIG. 49, unlike the timing charts of FIGS. 45A to 45F, two color signals of red, green, or blue rendering first and second fields are produced consecutively. Two color signals are produced in the order of red, green, and blue. Thereafter, a color signal of red rendering the first field is produced. This sequence is repeated.

Except for the arrangement of filters and the timing of signals, imaging control is fundamentally identical to that indicated in FIGS. 45A to 45F. The details of imaging control will therefore be omitted. The basic idea is to produce an image rendering a first field with a large amount of light incident on the imaging surface, and an image rendering a second field with a small amount of incident light. An image proving a wide dynamic range is thus constructed.

Figure 48:
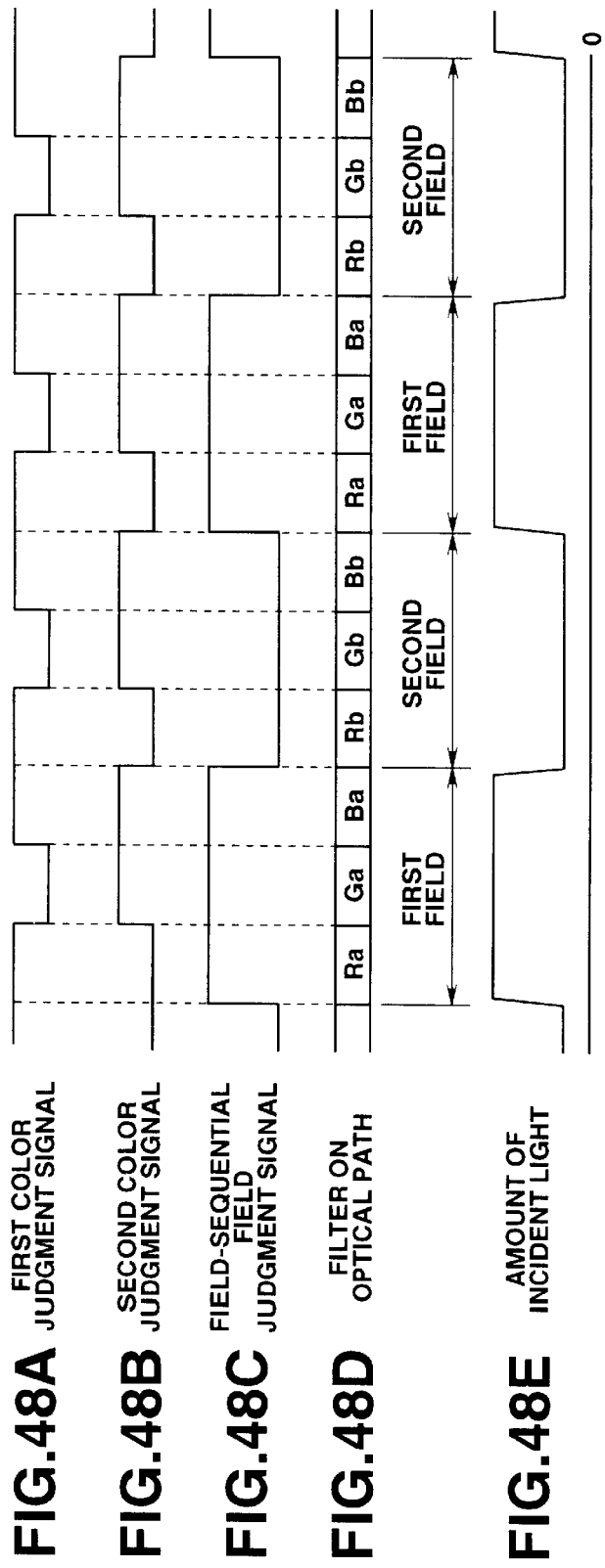

For a better understanding of the second variant, FIGS. 50G to 50I that are timing charts present an example of imaging control that exerts the same effect as imaging control presented by FIGS. 45A to 45D. In this example, the three judgment signals shown in FIGS. 48A to 48C are utilized, and the filter member 235' shown in FIG. 49 is employed.

A block diagram showing a basic configuration for processing a signal using the filter member 235' is nearly identical to that of FIG. 44 or 46. Only a difference in signal processing lies in that images rendering a first field and second field are projected successively on the imaging surface in a single color. FIGS. 51A to 51I are timing charts indicating the timing for the image signals.

In FIGS. 51A to 51I, Ron (where o stands for odd, and n is 0, 1, 2, 3, etc.) denotes a component of each of red, green, and blue signals rendering a first field (odd field). Ren (where e stands for even, and n is 0, 1, 2, 3, etc.) denotes a component thereof rendering a second field (even field).

In this case, a dynamic range expander has a configuration including a signal selector interpolator 261' shown in FIG. 52 in place of the signal selector interpolator 261 shown in FIG. 46.

A video signal is input to a decoder 263 via a buffer 262. An output signal of the decoder 263 is input to red, green, and blue signal stretching circuits 264R, 264G, and 264B. Based on an externally input control signal, a decoder stretch control circuit 265 applies a control signal for controlling the decoder 263 and red, green, and blue stretching circuits.

In response to the control signal, the input video signal is decoded by the decoder 263. After decoded, each of red, green, and blue color signals is stretched by interpolating signal components occurring during a period defined by a field signal. Resultant red, green, and blue signals whose cycles have been stretched are stored temporarily in frame memories 266R, 266G, and 266B, and output to a succeeding stage successively on a FIFO basis. The signal selector interpolator 261' is used to expand dynamic ranges as shown in FIG. 46.

Specifically, red, green, and blue signal components are, as mentioned above, extracted from a digital video signal input to the signal selector interpolator 261'. Thereafter, the red, green, and blue signals have the cycles thereof stretched to triples as indicated in FIGS. 51A to 51I. Resultant signals are then stored in the red, green, and blue frame memories 247R, 247G, and 247B.

The red, green, and blue signals output from the frame memories are processed to expand dynamic ranges, and then output to an external monitor or the like via a D/A converter.

According to this embodiment and its variants, an imaging device whose operating speed is low is used to expand a dynamic range in substantially the same manner as when a simultaneous type imaging device is used. An imaging device whose operating speed is high need not be procured.

Eleventh Embodiment

Next, the eleventh embodiment of the present invention will be described. This embodiment uses a liquid crystal device as an exposure value control device. The liquid crystal device of this embodiment is not a device having the capability of a shutter for switching transmission and non-transmission by turning on or off a control signal. An employed device is characteristic of restricting an amount of light incident on an imaging device by scattering the incident light when the control signal is on.

Figure 53:
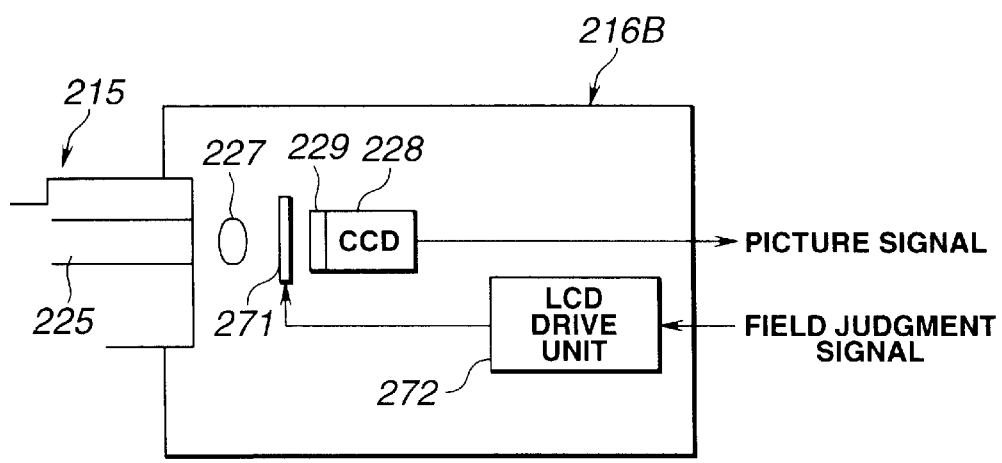

FIG. 53 shows a configuration of a major portion of an imaging unit. A camera head 216B has a liquid crystal device (LCD) 271 interposed between the lens 227 and CCD 228 shown in FIG. 34. The LCD 271 is controlled by a liquid crystal device drive unit (LCD drive) 272.

A field judgment signal is input to the LCD drive unit 272. For example, as shown in FIG. 54A, the field judgment signal is high during a first field period (odd field period). At this time, an LCD driving signal is low as shown in FIG. 54B. During a second field period (even field period) during which the field judgment signal is low, the LCD driving signal is driven high.

When the LCD driving signal is driven high, the transmittance of the LCD is lowered as shown in FIG. 54C. Incident light is routed to the CCD 228. An image is formed with an exposure value decreased. When the LCD driving signal is driven low, the transmittance is raised. Incident light is thus routed to the CCD 228. An image is formed with the exposure value increased.

The LCD drive unit 272 is incorporated in the camera head 216B in FIG. 53. For compactly designing the camera head 216B that is an imaging unit, the LCD drive unit may be incorporated in the image processing unit 207. In either case, the LCD drive unit 272 has the ability to control the actions of the LCD 271.

Based on an input field judgment signal, the LCD drive unit 272 generates an LCD driving signal of a proper voltage for driving a liquid crystal in the LCD 271. The signal is applied to the liquid crystal in order to control the orientation of liquid crystalline molecules, whereby an amount of light transmitted by the LCD 271 is controlled.

More particularly, for forming an image prone to streaky whitening, a low voltage is applied to the LCD 271 so that the liquid crystalline molecules will be aligned in a direction in which incident light propagates. For forming an image prone to blackening, a high voltage is applied to the LCD 271 so that the liquid crystalline molecules will be orthogonal to the direction in which incident light propagates.

In this configuration, a signal processing system identical to that of the ninth embodiment can be employed.

As mentioned above, both images prone to streaky whitening and blackening can be formed. Consequently, an image of good quality proving a wide dynamic range can be constructed by setting appropriate algorithms in the image processing unit 7.

According to this embodiment, the mechanically movable feature employed in the ninth embodiment is unnecessary. Nevertheless, substantially the same operations and advantages as those of the ninth embodiment can be provided.

Moreover, a liquid crystal device (LCD) may function as an almost perfect shutter according to the on or off state of an input control signal.

A variant using an LCD functioning as a shutter will be described. In this variant, the layout of the LCD 271 and others in an imaging unit is identical to that shown in FIG. 53.

When signals are driven as indicated in the timing charts of FIGS. 54A to 54C, no light falls on the CCD 228 during an even field period. A completely blackened image alone is formed.

During only a proper sub-period within the even field period, the LCD 271 is broken. During the other time, the LCD 271 is made. In this way, for example, unlike during an odd field period, an amount of light incident on the imaging surface of the CCD 228 is limited during the even field period. Consequently, the same advantages as those provided by the imaging unit, which is shown in FIG. 53 and whose actions are indicated in FIGS. 54A to 54C, can be provided.

FIGS. 55A to 55C are timing charts in accordance with the variant. In this variant, an amount of light falling on the CCD 228 during an even field period is set to a half of an amount of light falling thereon during an odd field period. A non-transmission period (during which the shutter is closed) is a half ta of the even field period tb. Alternatively, the non-transmission period may be set arbitrarily according to the state of an object to be imaged or a purpose of use. For example, the non-transmission period may be set to a several submultiple of the even field period or a several hundreds submultiple thereof.

Even in this variant, the CCD driving signal for driving the CCD 228 is driven once during each field period, that is, twice during one frame period as it is in the first embodiment.

This variant provides almost the same advantages as the tenth embodiment. For example, the sub-period within the even field period during which the LCD driving signal is driven high may be variable. In this case, the CCD driving signal may not be varied. Nevertheless, images can be formed by arbitrarily changing the ratio of an exposure value for one image to that for another image.

For example, a brightness level of an object is detected. If the brightness level is high, the sub-period within the even field period during which the LCD driving signal is driven high is shortened in order to form an image with an exposure value decreased.

The image formed with the decreased exposure value and another image are synthesized with each other. A resultant image is processed to expand a dynamic range. Thus, even when an object exhibits a high brightness level, a view image whose high-luminance level portion will not have a saturation value can be constructed.

Twelfth Embodiment

Next, an endoscopic imaging apparatus of the twelfth embodiment of the present invention will be described.

As presented in the ninth to eleventh embodiments, for constructing an image that proves a wide dynamic range, an amount of light incident on the imaging device 206 is controlled. Thus, an image prone to streaky whitening and an image prone to blackening are formed to render two fields.

In general, when extraneous natural light is insufficient, if an imaging apparatus is used in combination with, for example, an endoscope, a light source unit must be prepared additionally in order to ensure a necessary amount of light. In this case, an amount of light reflected from an object of observation is limited by an amount of light emanating from the light source unit. If the amount of light emanating from the light source unit can be controlled, an exposure value (an amount of incident light) may be controlled according to a technique different from the one adopted in the ninth embodiment to thirteenth embodiment. By properly controlling timing, an image prone to streaky whitening and an image prone to blackening can be formed. This embodiment adopts this idea.

The ninth embodiment to eleventh embodiment can be adapted to an imaging apparatus not including a light source unit. In other words, the ninth to eleventh embodiments can be adapted to an imaging apparatus that does not always requires a light source unit, such as, a video camera.

Figure 56:
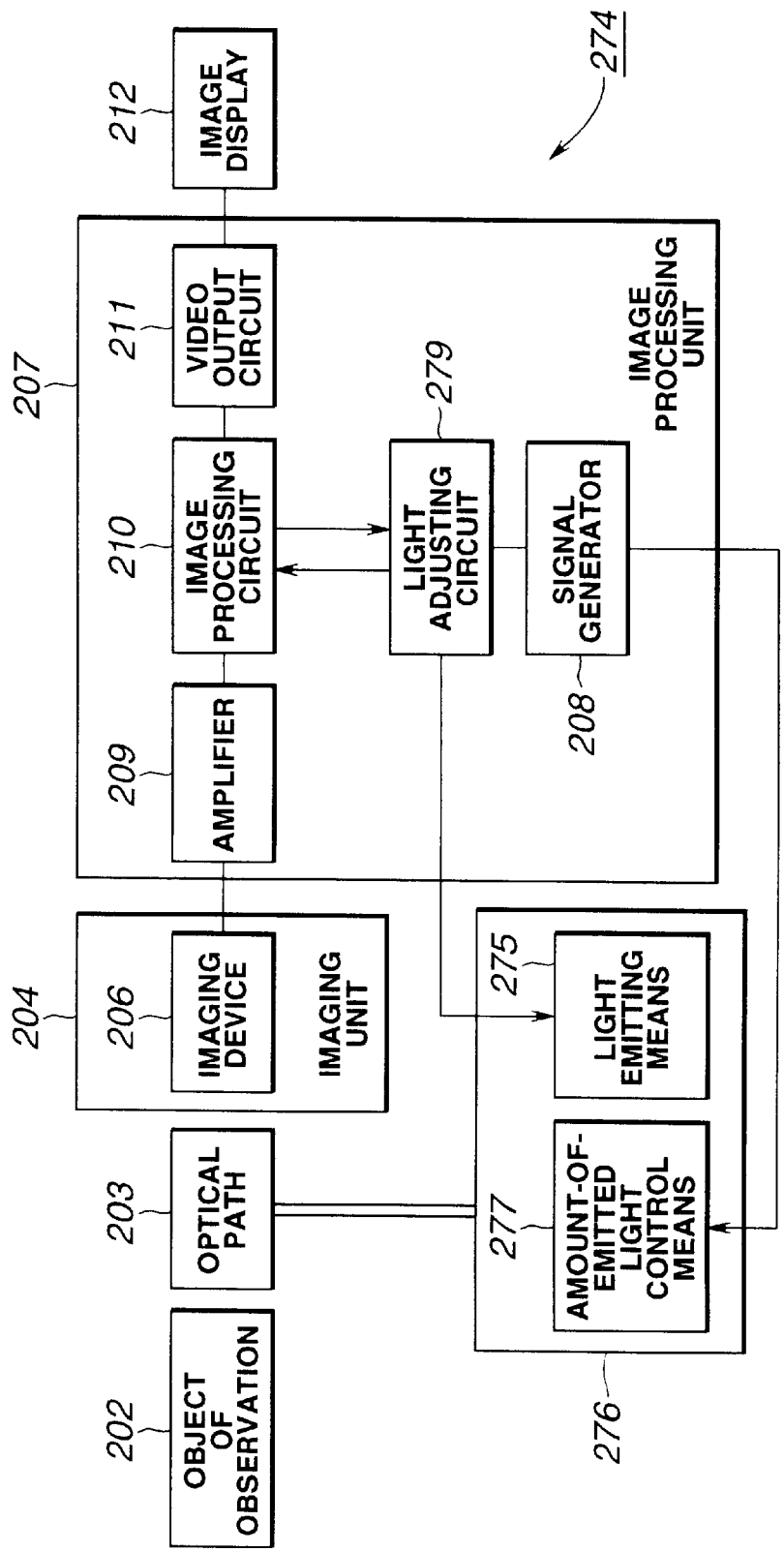

FIG. 56 schematically shows a configuration of an endoscopic imaging apparatus 274 of the twelfth embodiment. The endoscopic imaging apparatus 274 has an imaging unit 204' not including the exposure value control means 205 that is included in the imaging unit 204 shown in FIG. 33. Instead, an amount-of-emitted light control means 277 is included in a light source unit 276 having a light emitting means 275 incorporated therein. An amount of emitted light propagated over the optical path 203 by way of a light guide 278 in order to illuminate the object of observation 202 is then controlled.

Figure 33:
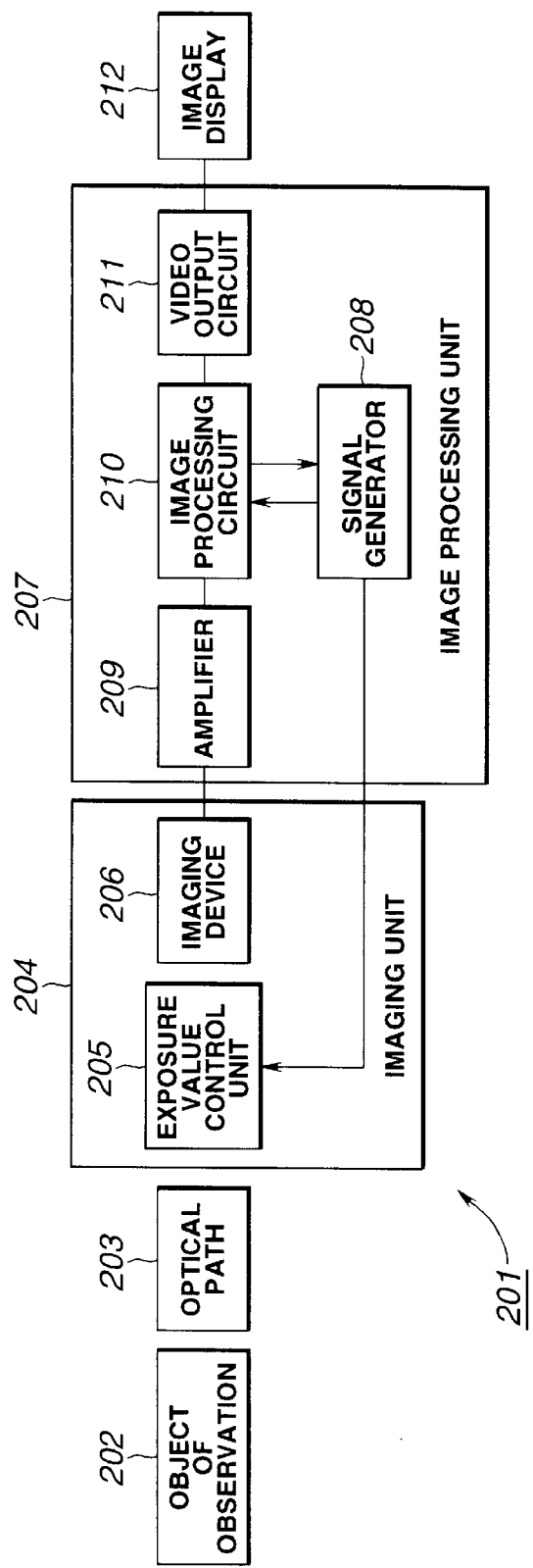

Moreover, an image processing unit 207' has a light adjusting circuit 279 interposed between the image processing circuit 210 and signal generator 208 that are included in the image processing unit 207 shown in FIG. 33. A signal sent from the image processing circuit 210, which processes an image signal output from the imaging device 206, is input to the light adjusting circuit 279. A control signal is then produced to control the light emitting means 275. Moreover, according to this embodiment, a field judgment signal generated by the signal generator 208 is input to the amount-of-emitted light control means 277.

Figure 57A:
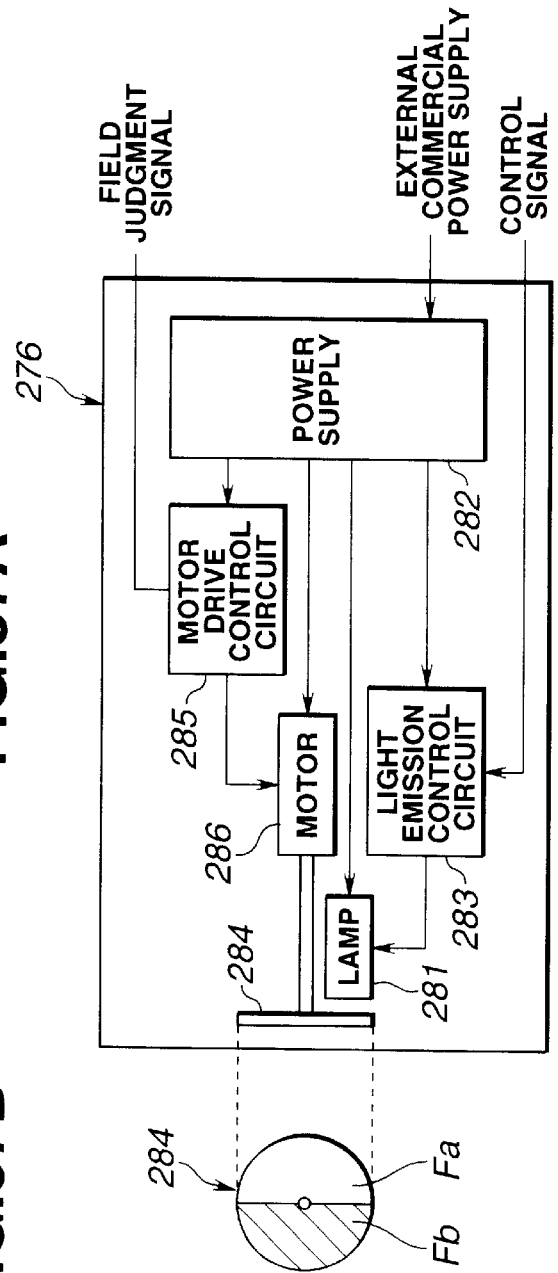
FIGS. 57A and 57B are diagrams showing a configuration of a light source unit and a filter member.

FIG. 57A shows a configuration of the light source unit 276. A lamp 281 is connected to a power supply 282 and light emission control circuit 283. The lamp 281 is thus controlled to emit a given amount of light. A disk-like filter member 284 is located on an optical path of illumination light in front of the lamp 281. The filter member 284 has an axial member attached to the center thereof. The axial member is coupled to an axis of rotation of a motor 286 that rotates with a motor driving signal sent from a motor drive control circuit 285. The filter member 284 is therefore driven to rotate together with the motor 286.

The motor drive control circuit 285 is powered by the power supply 282. A field judgment signal is sent from the image processing unit 207', and then input to the motor drive control circuit 285. The motor drive control circuit 285 drives the motor 286 to rotate synchronously with the signal. Moreover, the power supply 282 is plugged into the mains or an external power source. Moreover, a control signal sent from the light adjusting circuit 279 in the image processing unit 207' is input to the light emission control circuit 283.

Figure 57B:
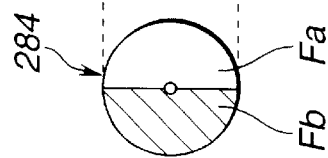

The filter member 284 is, as shown in FIG. 57B, composed of filters Fa and Fb offering different transmittances. For example, the transmittance of the filter Fb is set to a one-third of the transmittance of the filter Fa.

The other components are nearly identical to those of the ninth embodiment.

In this embodiment, the motor 286 is rotated synchronously with a field judgment signal shown in FIG. 58A. The filters Fa and Fb are, as shown in FIG. 58B, alternately inserted into the optical path of illumination light in front of the lamp 281 during respective field periods.

When the filter Fa is placed on the optical path, an amount of light emitted from the lamp 281 in the light source unit 276 increases as shown in FIG. 58C (the amount of emitted light is large). When the filter Fb is placed on the optical path, the amount of light emitted from the lamp 281 in the light source unit 276 decreases (the amount of emitted light is small).

The amount of emitted light is thus set to be different between two field periods. The object of observation 202 is therefore illuminated with an amount of light that is different between the two field periods. An amount of light reflecting from the object of observation 202 and falling on the imaging device 206 becomes different between the two field periods.

According to this embodiment, an amount of illumination light is controlled in order to control an amount of light incident on the imaging device 206.

Moreover, according to this embodiment, the light adjusting circuit 279 integrates components of a luminance signal which are sent from the image processing unit 210 during, for example, one frame period, and thus detects an average luminance level. The average luminance level is compared with a standard luminance level. An error signal indicating an error from the standard luminance level is output as a control signal, which is used to adjust light, to the light emission control circuit 283. The light emission control circuit 283 then controls, for example, an amount of light emitted from the lamp 281.

For example, the average luminance level calculated by integrating the components of the luminance signal sent during one frame period may be lower than the standard luminance level. In this case, a control signal proportional to an error from the standard luminance level is input to the light emission control circuit 83. Control is thus given in order to increase a glow current to be supplied from the light emission control circuit 283 to the lamp 281.

Owing to the control, the average luminance level is approached to the standard value. Consequently, a view image suitable for observation can be constructed.

Moreover, the light adjusting circuit 279 controls an AGC circuit in the image processing circuit 210 in terms of gain control. For example, the AGC circuit may be allowed to control a gain in order to attain a luminance level suitable for observation transiently (quickly). Thereafter, control is given to emit light slowly in order to attain an amount of light suitable for observation. Accordingly, the AGC circuit returns a gain to a steady-state value.

Figure 59:
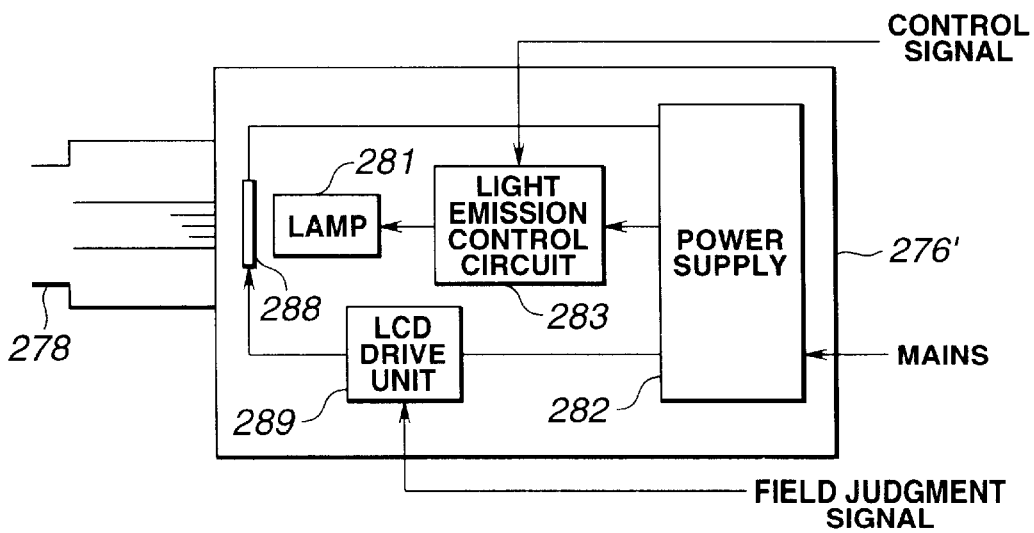

FIG. 59 shows a configuration of a light source unit 276' of a variant. The light source unit 276' has a liquid crystal device (LCD) 288 stationed in front of the lamp 281 shown in FIG. 57A. The LCD 288 is controlled by a LCD drive unit 289. The other components are identical to those shown in FIG. 57A.

The LCD 288 is driven according to the timing indicated in FIGS. 54A to 54C or FIGS. 55A to 55C.

Moreover, the operations and advantages of this variant are almost the same as those of the twelfth embodiment.

Thirteenth Embodiment

Next, the thirteenth embodiment of the present invention will be described.

In the twelfth embodiment, the amount-of-emitted light control means 277 is located in front of the light emitting means in the light source unit 276. As another method of controlling an amount of emitted light, a method of controlling an amount of emitted light by controlling an amount of light emanating from the light emitting means is conceivable.

In this method, an amount of light emanating from a light emitter is controlled according to arbitrary timing. For forming an image prone to streaky whitening, the light emitter is allowed to glow fully. For forming an image prone to blackening, the light emitter is controlled to glow minimally. The timing of switching amounts of emitted light is synchronized with the timing of switching fields that constitute a display image. Consequently, an image prone to streaky whitening and an image prone to blackening can be formed to render the fields. When an algorithm set in the image processing unit is optimized, an image proving a wide dynamic range can be provided.

Moreover, a motion picture is not always required for image observation. For example, when photography is carried out, a still image may be needed. In the case of the still image, an image proving a wide dynamic range is often not necessary. A region to be photographed should merely be illuminated to attain a brightness level suitable for photography. Even if the other region becomes hard to see, no problem occurs. On such an occasion, an image not proving a wide dynamic range will do. Another mode is therefore set so that an image can be displayed in the mode (within ongoing normal screen levels) instead of a wide dynamic range mode. When the modes can thus be switched, whichever of a motion picture and still image that is suitable for observation can be presented to a viewer.

Figure 60:
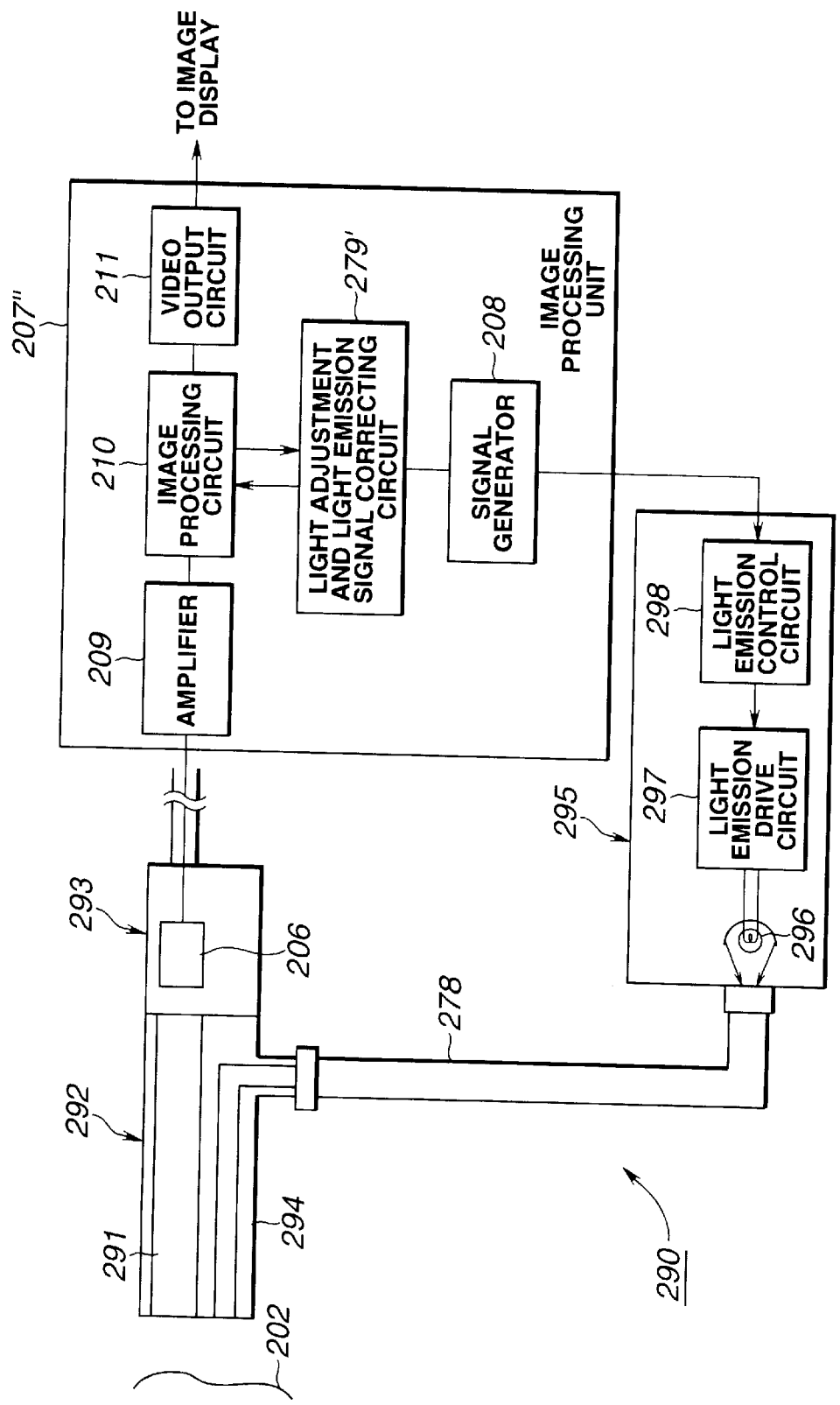

According to this embodiment, the light emitting means 275 in the light source unit 276 in the twelfth embodiment is caused to emit pulsed light. An amount of light is thus varied depending on a field. Imaging is carried out in this state. FIG. 60 shows a configuration of an endoscopic imaging apparatus 290 of the thirteenth embodiment.

A camera head 293 serving as an imaging unit is mounted on an optical endoscope 292 including an observation optical system 291. An output signal of the imaging device 206 in the camera head 293 is input to an image processing unit

207". The image processing unit 207" has a light adjustment and light emission signal correcting circuit 279' that substitutes for the light adjusting circuit 279 in the image processing unit 207' shown in FIG. 56.

The light adjustment and light emission signal correcting circuit 279' has not only the capability of the light adjusting circuit 279 but also the ability to correct a glow signal as mentioned later.

A light guide 294 in the optical endoscope 292 is coupled to a light source unit 295 by way of a light guide cable 278. A lamp 296 serves as a light emitting means and is included in the light source unit 295. The lamp 296 is driven to glow by a light emission drive unit 297. The light emission drive unit 297 is controlled by a light emission control circuit 298.

The light emission control circuit 298 uses the light emission drive unit 297 to control light emission of the lamp 296 according to a field judgment signal sent from the signal generator 208 and a light emission timing control signal. The other components are identical to those shown in FIG. 22. The description of the components will be omitted.

Next, the actions of this embodiment will be described with reference to the timing charts of FIGS. 61A to 61D. The lamp serving as a light emitting means in this embodiment glows to emit one kind of pulsed light.

A practical example of this embodiment will be described on the assumption that the frequency of causing the lamp 296 to glow during a field period is varied.

The signal generator 208 in the image processing unit 207' produces a pulsating light emission timing control signal shown in FIG. 61B according to a field judgment signal shown in FIG. 61A. The light emission timing control signal generated by the signal generator 208 is output to the light emission control circuit 298 in the light source unit 295.

The light emission control circuit 298 in the light source unit 295 outputs a light emitter control signal. The light emitter control signal causes the lamp, which is a light source, to glow instantaneously at the leading edge of the light emission timing control signal. With the light emitter control signal, the lamp 296 is driven to glow by means of the light emission drive unit 297.

In the practical example shown in FIG. 61C, three pulses of the light emission timing control signal are generated during a first field period (odd field period). One pulse thereof is generated during a second field period.

When the glow characteristic of the lamp 296 is utilized, an amount of emitted light varies as shown in FIG. 61C. When the amount of emitted light varying from field to field is averaged, it varies as shown in FIG. 61D. An amount of illumination light to be irradiated to the object of observation 202 differs in average amount of light from field to field. In this state, an object image is formed by the imaging device during each field period. Consequently, an image prone to streaky whitening is formed during a first field period and an image prone to blacking is formed during a second field period.

Two thus formed images are synthesized with each other by the dynamic range expander 244 shown in FIG. 7. This results in an image proving a wide dynamic range. Depending on the characteristic of a lamp, there may be a time lag after a signal prompting the lamp to glow is output from the light emission control circuit until the lamp comes to glow fully. In this case, a proper amount of light will not be irradiated to an object of observation during the time interval until the lamp comes to glow fully.

In the practical example, a proper amount of light cannot be irradiated to an object of observation for some time after horizontal scanning for rendering a first field is started. During the time interval, an upper portion of a display area on a typical TV monitor beyond an upper quarter of the display area thereon is scanned to draw 31 to 71 horizontal scanning lines. However, a proper amount of light cannot be irradiated to an object of observation during the time interval. An image proving a wide dynamic range cannot therefore be displayed in the portion of the display are on the typical TV monitor.

For coping with the foregoing drawback, a field judgment signal and image signal are input to the light adjustment and light emission signal correcting circuit 279' in the image processing unit 207". For each horizontal scanning line, a luminance level is compared with a luminance level indicated by a signal component rendering the previous horizontal scanning line. If there is a marked difference between the luminance levels, a light emission timing control signal that will slightly lead the field judgment signal is generated in order to absorb the foregoing time lag. Namely, the time lag occurs due to the characteristic of a lamp when the lamp is driven.

Moreover, when the amount-of-emitted light control means in the light source unit 295 is merely driven according to a field judgment signal, a proper amount of light may not be irradiated entirely to an object of observation. Depending on the characteristic of a light emitting means, it may take too much time until the light emitting means, for example, a lamp comes to glow fully after it is driven. On such an occasion, a sufficient amount of light required for observation may not be preserved.

An amount of light emitted by the light source unit 295 must be sufficient and proper for observation. For this purpose, a glow signal correcting circuit is incorporated in the image processing unit 107". The glow signal correcting circuit corrects a control signal, which is output from the image processing unit 207" to the light source unit 295, according to image information output from the imaging device 206. Imaging can thus be performed by the imaging device 206 so that the timing of the imaging will always be matched with an amount of light emitted from the light source unit 295.

A method of producing a picture signal to be output to a TV monitor or the like is identical to that employed in the ninth embodiment.

Moreover, according to this embodiment, a freeze switch that is not shown may be included. The freeze switch is used to send a write disabling signal to a frame memory in the color separation and white balance and AGC circuit 245 shown in, for example, FIG. 38. An image whose data has been written immediately previously is output repeatedly. The image is then displayed on an image display means such as a TV monitor.

Moreover, this embodiment has been described that the light emission control circuit 298 allows the lamp to glow in response to a light emission timing control signal generated by the signal generator 208. Alternatively, the number of pulsed light rays to be emitted may be able to be set manually. In this case, the number of pulsed light rays to be emitted should be able to be set for each of two field periods. In a special example or mode, the numbers of pulsed light rays to be emitted during the two field periods may be set to the same value. In other words, the amounts of light to be emitted during the two field periods may be set to the same value. A dynamic range is not expanded in this mode.

For example, a DIP switch composed of a plurality of switching elements may be used to input a plurality of digital signals as a pulsed light instruction signal to the signal generator 208. The signal generator 208 then outputs a light emission timing control signal to the light emission control circuit 298 according to the timing defined by the number of pulses of the pulsed light instruction signal.

For example, when a noteworthy portion of an object to be observed in a still image must be set to a brightness value permitting easy observation, it can be observed in a wide dynamic range mode. However, if a change in brightness level of the portion is suppressed in the wide dynamic range mode, a viewer may manually set an amount of emitted light suitable for observation. A proper view image may thus be constructed.

Moreover, the method of manually instructing the number of pulsed light rays to be emitted may not be adopted. Instead, an instruction signal instructing increase or decrease of a current number of pulsed light rays may be manually input to the signal generator 208. A light emission timing control signal may then be output to the light emission control circuit 298 according to the instruction signal.

According to this embodiment, the same advantages as those of the twelfth embodiment can be provided. Moreover, whether a motion picture or still image is requested, an image formed with a proper exposure value can be provided to a viewer.

According to the imaging method employed in this embodiment, similarly to that employed in the tenth embodiment, a wheel-shaped (disk-like) color filter may be attached to the front surface of the imaging device.

An exposure value is controlled according to a technique of discriminating among the transmittances of filters of three primary colors constituting the wheel-shaped color filter. Otherwise, a technique of differentiating the transmittance of one filter from the transmittances of the other two filters may be adopted for controlling an exposure value. Thus, an image proving a wide dynamic range can be provided.

Moreover, the number of color filters constituting a filter is three. Alternatively, two kinds of color filters offering different transmittances may be provided for each color of three primary colors. Red, green, and blue color filters offering high transmittances, and red, green, and blue color filters offering low transmittances may then be arranged equidistantly on a wheel-shaped member. An image prone to streaky whitening and an image prone to blacking are formed for each of the three primary colors by the imaging device. Thereafter, the aforesaid procedure is followed and an image proving a wide dynamic range is constructed.

Owing to the aforesaid configuration, an image proving a wide dynamic range can be provided for a user. This means that an image helpful in observing an object can be displayed over a whole screen. Consequently, treatment or the like can be carried out appropriately.

Moreover, imaging modes may be changed according to an image to be displayed on an image display. Thus, an image helpful in observing an object may be provided for a viewer.

As described above, according to the ninth to thirteenth embodiments, there is provided an endoscopic imaging apparatus consisting of: an imaging unit having an imaging device, which receives light reflected from an object of observation and forms an image of the object of observation during first and second imaging periods, incorporated in an endoscope; an image processing unit for processing signals representing first and second images formed during the first and second imaging periods, and constructing one synthetic image proving an expanded dynamic range by synthesizing the first and second images; and a display means for displaying the synthetic image.

An amount-of-incident light control means is included for controlling an amount of light incident on the imaging device during at least one of the first and second imaging periods. The amount of incident light is controlled so that it will be different from one imaging period to the other. The imaging periods need therefore not be set to mutually greatly different lengths. Merely by controlling the amount of light incident on the imaging device, a view image proving a wide dynamic range can be constructed using images formed with different amounts of light. Moreover, the view image is unsusceptible to noises, and enjoys good image quality.

Of course the aforesaid embodiments may be partly combined to construct embodiments that also belong to the present invention.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. An imaging apparatus comprising:
   an imaging device for successively outputting a first image signal produced by imaging an object during a first exposure time and a second image signal produced by imaging said object during a time shorted than said first exposure time;
   an image signal producing circuit composed of:
      first and second weighting circuits for applying a first weight, which decreases monotonously with an increase in light level from a light level of substantially no luminance up to a light level causing said first and second image signals to have a saturation value, and a second weight, which increases monotonously from said light level of substantially no luminance up to said light level causing said first and second image signals to have said saturation value, to said first and second image signals under the condition that the sum of said first and second weights is 1; and
      an adding circuit for adding together first and second picture signals produced by applying said first and second weights to said first and second image signals by means of said first and second weighting circuits; and
   a signal processing circuit for processing a picture signal output from said adding circuit and producing a video signal according to which an image can be displayed on a display device.

2. An imaging apparatus according to claim 1, further comprising an exposure time setting facility for varying at least one of said first and second exposure times.

3. An imaging apparatus according to claim 2, wherein said exposure time setting facility uses a waveform-detected signal produced by detecting the waveform of said first or second image signal.

4. An imaging apparatus comprising:
   an imaging device for successively outputting a first image signal produced by imaging an object during a first exposure time, and a second image signal that has a saturation value relative to a higher light level than said first image signal;
   a picture signal producing device composed of:
      first and second weighting circuits for applying a first weight, which decreases monotonously with an increase in light level from a light level of substantially no luminance up to a light level causing said first and second image signals to have the saturation value, and a second weight, which increases monotonously from said light level of substantially no luminance up to said light level causing said first and second image signals to have said saturation value, to said first and second image signals under the condition that the sum of said first and second weights is 1; and an adding circuit for adding together first and second picture signals produced by applying said first and second weights to said first and second image signals by means of said first and second weighting circuits; and a signal processing circuit for processing a picture signal output from said adding circuit and producing a video signal according to which an image can be displayed on a display.

5. An imaging apparatus according to claim 4, wherein said imaging device images an object during a second exposure time that is shorter than said first exposure time, and thus outputs said second image signal that has the saturation value relative to a higher light level than said first image signal.

6. An imaging apparatus according to claim 4, wherein during a second exposure time during which said second image signal is produced, an amount of light coming from said object and falling on said imaging device through an imaging window is restricted by an amount-of-light restricting device, and said imaging device outputs said second image signal that has the saturation value relative to a higher light level than said first image signal.

7. An imaging apparatus according to claim 4, wherein said weights applied by said picture signal producing device are such that: when a light level is much lower than the light level causing said first image signal to have the saturation value, said first weight is larger than said second weight; and when the light level is higher than the light level causing said first image signal to have the saturation value, said second weight is larger than said first weight.

8. An imaging apparatus comprising:
an imaging device for successively outputting a first image signal produced by imaging an object during a first exposure time, and a second image signal that has a saturation value relative to a higher light level than said first image signal;

a picture signal producing device composed of:
first and second weighting circuits for applying a first weight, which decreases monotonously with an increase in light level up to a light level causing said first and second image signals to have a saturation value, and a second weight, which increases monotonously therewith, to said first and second image signals under the condition that the sum of said first and second weights is 1; and an adding circuit for adding together first and second picture signals produced by applying said first and second weights to said first and second image signals by means of said first and second weighting circuits; and a signal processing circuit for processing a picture signal output from said adding circuit and producing a video signal according to which an image can be displayed on a display; wherein said first weight function F1(x) is $\cos^2(px)$ where x is a light level and p is a coefficient, and said second weight function F2(x) is $\sin^2(px)$.

9. An imaging apparatus according to claim 8, wherein said coefficient p satisfies $p \approx \pi/(2s)$ where s is a light level of light incident on said imaging device.

10. An imaging apparatus according to claim 4, wherein said imaging device includes a progressive imaging device having two systems of horizontal transfer output circuits.

11. An imaging apparatus according to claim 10, wherein said signal processing means produces a video signal conformable to the interlacing.

12. An imaging apparatus according to claim 4, wherein said image signal producing circuit includes a weight data storage that stores data of said first weight to be applied to said first image signal and data of said second weight to be applied to said second image signal.

13. An imaging apparatus according to claim 12, wherein said weight data storage stores data of a weight to be applied to said first image signal and data of a weight to be applied to said second image signal, and the weights exhibit different characteristics.

14. An imaging apparatus according to claim 13, further comprising a brightness detector for detecting brightness information of an object in an output signal of said imaging device, wherein a weight to be applied to said first image signal and a weight to be applied to said second image signal are selected based on the brightness information of an object, and thus read from said weight data storage.

15. An imaging apparatus according to claim 5, wherein said imaging device images said object during said first exposure time, and produces said first image signal and second image signal.

16. An imaging apparatus according to claim 4, wherein said picture signal producing device produces a synthetic picture signal exhibiting such a characteristic that a differential coefficient thereof relative to a light level varies continuously with an increase in light level up to a light level causing said second image signal to have the saturation value.

17. An imaging apparatus according to claim 16, wherein the differential coefficient decreases monotonously relative to the light level.

18. An endoscopic imaging apparatus, comprising:
an endoscope having an elongated insertion unit, irradiating illumination light to an object through an illumination window located at the distal end of said insertion unit, and including an imaging device for successively outputting a first image signal produced by imaging said object illuminated with said illumination light during a first exposure time, and a second image signal that has a saturation value relative to a higher light level than said first image signal;

an image signal producing circuit composed of:
first and second weighting circuits for applying a first weight, which decreases monotonously with an increase in light level from a light level of substantially no luminance up to a light level causing said first and second image signals to have the saturation value, and a second weight, which increases monotonously from said light level of substantially no luminance up to said light level causing said first and second image signals to have said saturation value, to said first and second image signals under the condition that the sum of said first and second weights is 1; and an adding circuit for adding together first and second picture signals produced by applying said first and second weights to said first and second image signals by means of said first and second weighting circuits;

a signal processing circuit for processing a picture signal output from said adding circuit and producing a video signal which can be displayed; and a display for displaying a synthetic image represented by said picture signal when inputting said video signal.

19. An endoscopic imaging apparatus according to claim 18, wherein said imaging device images said object during a second exposure time that is shorter than said first exposure time, and thus outputs said second image signal that has the saturation level relative to a higher light value than said first image signal.

20. An endoscopic apparatus according to claim 18, wherein during a second exposure time during which said second image signal is produced, an amount of light coming from said object and falling on said imaging device through an imaging window is restricted by a light restricting device, and said imaging device outputs said second image signal that has the saturation value relative to a higher light level than said first image signal.

21. An endoscopic imaging apparatus according to claim 18, further comprising a light source unit for supplying illumination light to a light guide that runs through said insertion unit of said endoscope, propagates illumination light, and emits the illumination light through said illumination window.

22. An endoscopic imaging apparatus according to claim 21, wherein during a second exposure time during which said imaging device produces a second image signal, said light source unit allows a light restricting device to restrict illumination light to be supplied to said light guide, and said imaging device outputs said second image signal that has the saturation value relative to a higher light level than said first image signal.

23. An endoscopic imaging apparatus according to claim 22, wherein said light restricting device is a light restriction filter for restricting illumination light generated by a lamp and supplying resultant light to said light guide.

24. An endoscopic imaging apparatus according to claim 22, wherein said light restricting device restricts an amount of illumination light generated by a lamp.

25. An endoscopic imaging apparatus according to claim 18, wherein said endoscope is an electronic endoscope and said imaging device being provided with the ability to photoelectrically convert a signal, placed on the image plane of an objective optical system located at the distal end of said elongated insertion unit.

26. An endoscopic imaging apparatus according to claim 18, wherein said endoscope is a TV camera-mounted endoscope composed of an optical endoscope having an image propagating device for propagating an object image formed by an objective optical system located at the distal end of said elongated insertion unit to an optical system, and a TV camera that is mounted on an eyepiece of said optical endoscope and has an imaging device, which is included in said imaging device and provided with the ability to photoelectrically convert a signal, incorporated therein.

27. An endoscopic imaging apparatus according to claim 18, wherein said endoscope includes a common image formation optical system, and said imaging device is composed of a plurality of imaging devices located at positions respectively at which a plurality of images are formed through a plurality of apertures by said image formation optical system.

28. An endoscopic imaging apparatus according to claim 19, wherein said imaging device images said object during said first exposure time so as to produce said first image signal and second image signal.

29. An endoscopic imaging apparatus according to claim 18, wherein said imaging device has a color separation filter used to achieve color imaging under white illuminating light.

30. An endoscopic imaging apparatus according to claim 18, wherein said imaging device is a field-sequential imaging device that includes a monochrome imager not having a color separation filter, and that carries out color imaging under illumination of field-sequential light having a plurality of wavelengths.

31. An imaging apparatus, comprising:
an imaging device for successively outputting a first image signal produced by imaging an object during a first exposure time, and a second image signal that is produced by imaging said object during a second exposure time shorter than said first exposure time and that has a saturation value relative to a higher light level than said first image signal;
a picture signal producing circuit composed of:
first and second weighting circuits for applying a first weight, which decreases monotonously with an increase in light level from a light level of substantially no luminance up to a light level causing said first and second image signals to have the saturation value, and a second weight, which increases monotonously from said light level of substantially no luminance up to said light level causing said first and second image signals to have said saturation value, to said first and second image signals under the condition that the sum of said first and second weights is 1; and
an adding circuit for adding together first and second picture signals produced by applying said first and second weights to said first and second image signals by means of said first and second weighting circuits; and
a signal processing circuit for processing a picture signal output from said adding circuit and producing a video signal according to which an image can be displayed on a display.

32. An imaging apparatus, comprising:
an imaging device for successively outputting a first image signal produced by imaging an object during a first exposure time, and a second image signal that has a saturation value relative to a higher light level than said first image signal;
a picture signal producing circuit composed of:
first and second weighting circuits for applying a first weight, which decreases monotonously with an increase in light level from a light level of substantially no luminance up to a light level causing said first and second image signals to have the saturation value, and a second weight, which increases monotonously from said light level of substantially no luminance up to said light level causing said first and second image signals to have said saturation value, to said first and second image signals under the condition that the sum of said first and second weights is 1; and
an adding circuit for adding together first and second picture signals produced by applying said first and second weights to said first and second image signals by means of said first and second weighting circuits; and
a signal processing circuit for processing a picture signal output from said adding circuit and producing a video signal according to which an image can be displayed on a display.

33. An imaging apparatus, comprising:

an imaging device for successively outputting a first image signal produced by imaging an object during a first exposure time, and a second image signal that has a saturation value relative to a higher light level than said first image signal;

a picture signal producing circuit composed of:

first and second weighting circuits for applying a first weight, which decreases monotonously with an increase in light level from a light level of substantially no luminance up to a light level causing said first and second image signals to have the saturation value, and a second weight, which increases monotonously from said light level of substantially no luminance up to said light level causing said first and second image signals to have said saturation value, to said first and second image signals under the condition that the sum of said first and second weights is 1; and an adding circuit for adding together picture signals produced by applying said first and second weights to said first and second image signals by means of said first and second weighting circuits; and a signal processing circuit for processing a picture signal output from said adding circuit and producing a video signal according to which an image can be displayed on a display.

34. An imaging apparatus according to claim 33, wherein when a light level is higher than the light level causing said first image signal to have the saturation value, said first weighting circuit outputs a weight coefficient of 0.

35. An imaging apparatus according to claim 33, wherein when a light level is higher than the light level causing said first image signal to have the saturation value, said picture signal is determined substantially with a weight coefficient that is applied to said second image signal by said second weighting circuit.

* * * * *